United States Patent
Isogai et al.

(10) Patent No.: US 6,418,370 B1
(45) Date of Patent: *Jul. 9, 2002

(54) APPARATUS AND METHOD FOR CONTROLLING A TARGET DISTANCE AND A WARNING DISTANCE BETWEEN TRAVELING VEHICLES AND A RECORDING MEDIUM FOR STORING THE CONTROL METHOD

(75) Inventors: Akira Isogai, Anjo; Eiji Teramura, Okazaki; Takao Nishimura, Nagoya, all of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,790

(22) Filed: Aug. 4, 1999

(30) Foreign Application Priority Data

| Aug. 4, 1998 | (JP) | 10-220600 |
|---|---|---|
| Aug. 4, 1998 | (JP) | 10-220601 |
| May 31, 1999 | (JP) | 11-151990 |
| May 31, 1999 | (JP) | 11-151991 |

(51) Int. Cl.$^7$ ............................................. G06F 15/50
(52) U.S. Cl. ......................... 701/96; 701/98; 340/438; 340/904; 340/902; 342/29; 73/517; 180/170; 180/179
(58) Field of Search ...................... 701/96, 97; 342/455, 342/29; 340/436, 903, 437, 438; 180/169, 167, 179; 434/236, 238

(56) References Cited

U.S. PATENT DOCUMENTS 4,706,195 A * 11/1987 Yoshino et al. ............. 180/169
5,053,979 A * 10/1991 Etoh ............................ 701/301
5,230,400 A * 7/1993 Kakinami et al. ........... 180/169
5,357,438 A * 10/1994 Davidian ..................... 701/301
5,485,155 A 1/1996 Hibino ......................... 342/70
5,574,463 A 11/1996 Shirai et al. .................. 342/70
5,627,511 A 5/1997 Takagi et al. ................ 340/435
5,631,639 A * 5/1997 Hibino et al. ................ 340/903
5,684,473 A 11/1997 Hibino et al. ................ 340/903
5,710,565 A 1/1998 Shirai et al. .................. 342/70
5,751,211 A 5/1998 Shirai et al. ................ 340/435

(List continued on next page.)

FOREIGN PATENT DOCUMENTS

| JP | 58-80798 | 5/1983 |
|---|---|---|
| JP | 4-238741 | 8/1992 |
| JP | 4-314638 | 11/1992 |
| JP | 5-156975 | 6/1993 |
| JP | 5-159198 | 6/1993 |
| JP | 7-132785 | 5/1995 |
| JP | 7-172211 | 7/1995 |
| JP | 9-193689 | 7/1997 |
| JP | 10-114237 | 5/1998 |
| JP | 10-194008 | 7/1998 |

Primary Examiner—William A. Cuchlinski, Jr.
Assistant Examiner—Tran C To
(74) Attorney, Agent, or Firm—Pillsbury Winthrop

(57) ABSTRACT

A distance control is performed to maintain a target distance between two traveling vehicles by controlling an acceleration/deceleration actuator based on a physical quantity representing an actual distance between the two traveling vehicles. A temporary distance control is performed to suppress a deceleration degree of a succeeding vehicle to a smaller value compared with a deceleration degree attainable during an ordinary distance control, when the two traveling vehicles are departing from each other under a condition where the actual distance between the two traveling vehicles is already shorter or will soon become shorter than a standard target distance.

85 Claims, 50 Drawing Sheets

U.S. PATENT DOCUMENTS

| | | | | |
|---|---|---|---|---|
| 5,754,099 A | * | 5/1998 | Nishimura et al. | 340/435 |
| 5,798,727 A | | 8/1998 | Shirai et al. | 342/70 |
| 5,805,527 A | | 9/1998 | Hoashi et al. | 367/99 |
| 5,818,355 A | | 10/1998 | Shirai et al. | 340/903 |
| 5,864,391 A | | 1/1999 | Hosokawa et al. | 356/4.01 |
| 5,955,941 A | * | 9/1999 | Pruksch et al. | 340/435 |
| 5,992,551 A | | 11/1999 | Frey et al. | 180/179 |
| 6,018,308 A | * | 1/2000 | Shirai | 342/70 |
| 6,044,321 A | * | 3/2000 | Nakamura et al. | 701/96 |
| 6,097,311 A | * | 8/2000 | Iwasaki et al. | 340/903 |
| 6,119,068 A | * | 9/2000 | Kannonji | 701/301 |
| 6,147,637 A | * | 11/2000 | Morikawa et al. | 342/70 |

* cited by examiner

ACCELERATION/DECELERATION CONTROL SUBROUTINE

THROTTLE CONTROL SUBROUTINE

FIG. 19
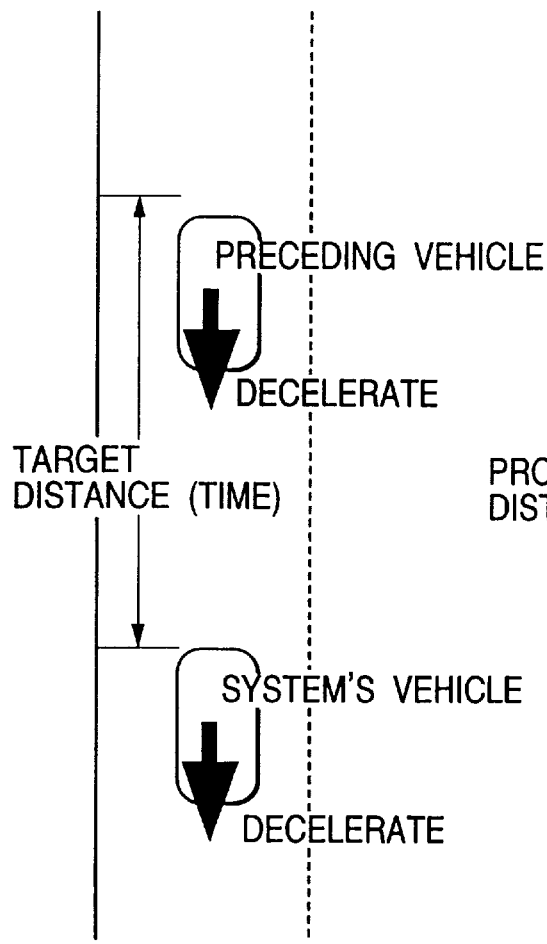
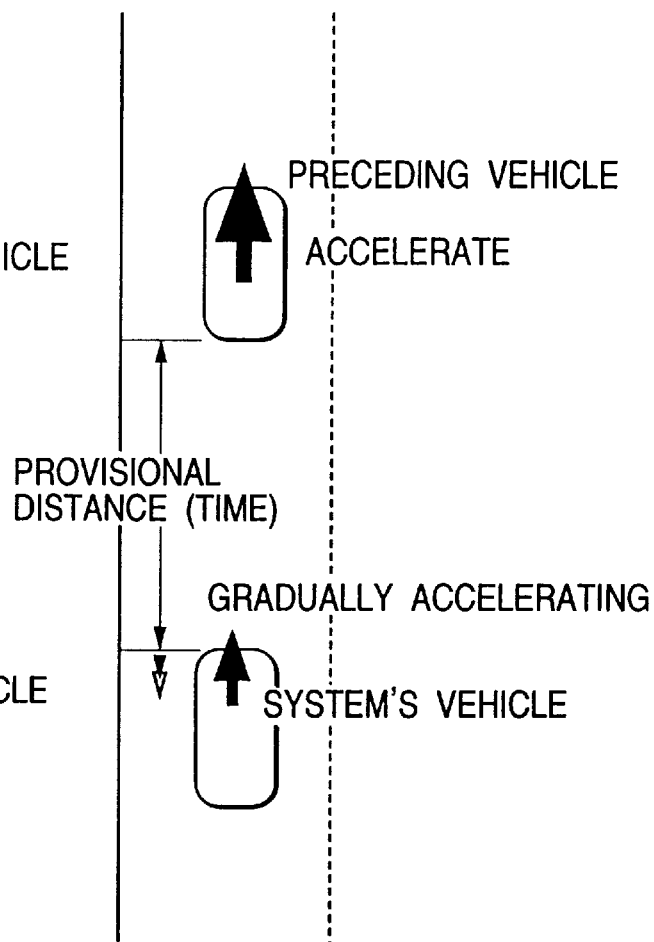

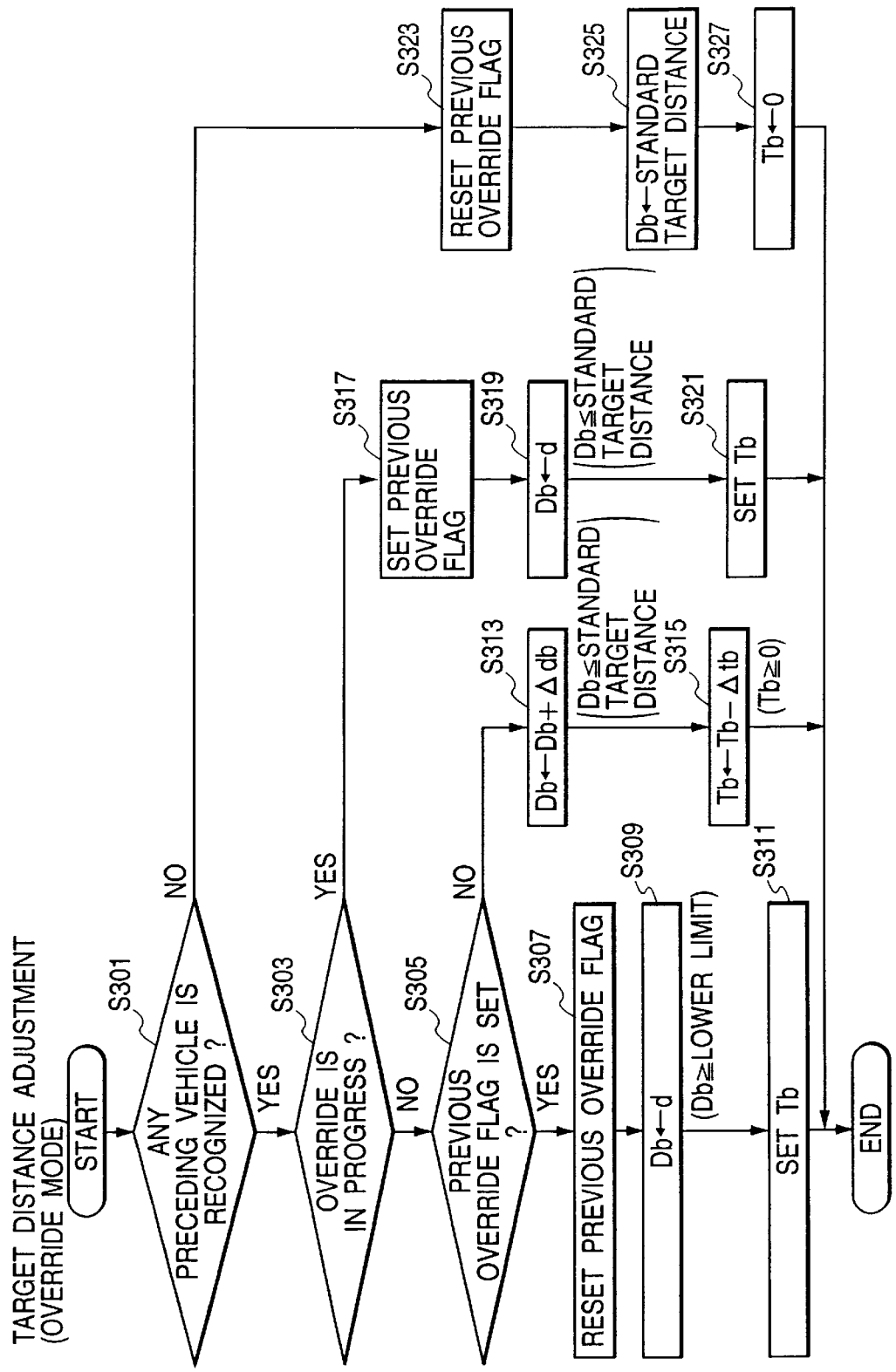

IMPROVED CONTROL LOGIC
(LANE CHANGE MODE)

TIME SEQUENTIAL VEHICLE BEHAVIOR

RESTORATION OF LOWER LIMIT OF TARGET ACCELERATION

APPARATUS AND METHOD FOR CONTROLLING A TARGET DISTANCE AND A WARNING DISTANCE BETWEEN TRAVELING VEHICLES AND A RECORDING MEDIUM FOR STORING THE CONTROL METHOD

BACKGROUND OF THE INVENTION

The present invention relates to an apparatus and a method for controlling a target distance and a warning distance between two traveling vehicles and a recording medium for storing the control method.

To improve the safety in a vehicle driving operation and reduce the driver's burden, an apparatus for automatically controlling a distance between two traveling vehicles is conventionally proposed. According to the conventional automatic distance control, the vehicle speed is controlled so as to equalize an actual distance between two traveling vehicles with a target distance. The target distance is usually constant. It may be possible to set the target distance to be variable in accordance with the present vehicle speed. In such a case, the target distance remains constant whenever the vehicle speed is constant.

The automatic distance control is performed by controlling a physical quantity directly representing a distance itself or indirectly representing the distance, such as a time interval between two vehicles. The time interval is obtained by dividing the distance between two vehicles by the vehicle speed of the system's vehicle.

When the target distance is fixed to a constant value, the drive feeding is worsened in various conditions.

SUMMARY OF THE INVENTION

An object of the present invention is to provide an apparatus and a method for controlling a distance between two traveling vehicles which is capable of adjusting a target distance between the two traveling vehicles in accordance with the driving conditions.

An object of the present invention is to provide an apparatus and a method for judging and generating a warning in accordance with the driving conditions.

An object of the present invention is to provide a recording medium for storing a computer program relating to the distance control and warning control realized by the present invention.

According to an aspect of the present invention, a physical quantity is detected as a value directly or indirectly representing an actual distance between the two traveling vehicles. A distance control is performed so as to maintain a target distance between the two traveling vehicles based on the detected physical quantity. A temporary distance control is performed to suppress a deceleration degree of a succeeding vehicle to a smaller value compared with a deceleration degree attainable during an ordinary distance control when the two traveling vehicles are departing from each other under a condition where the actual distance between the two traveling vehicles is already shorter or will soon become shorter than a standard target distance.

According to a preferable embodiment of the present invention, a control value is obtained based on a first physical quantity and a second physical quantity. The first physical quantity represents a distance deviation between an actual distance and a target distance between two traveling vehicles. The second physical quantity represents a relative speed between the two traveling vehicles. The succeeding vehicle is accelerated and/or decelerated based on the obtained control value to adjust the actual distance between the two traveling vehicles. The temporary distance control is performed to suppress the deceleration degree of the succeeding vehicle when the two traveling vehicles are departing from each other under a condition where the actual distance between two traveling vehicles is shorter than the standard target distance.

Preferably, the automatic distance control of the present invention is performed by a microcomputer. It is judged whether an objective in a present control cycle is identical with an objective in a previous control cycle of the distance control. And, the temporary distance control for suppressing the deceleration degree of the succeeding vehicle is performed only when the preceding vehicle is judged to be the same objective in the present and previous control cycles of the distance control.

Preferably, the target distance is temporarily changed to a provisional target distance to realize the temporary distance control for suppressing the deceleration degree of the succeeding vehicle. The provisional target distance has an initial value substantially equal to the actual distance between the two traveling vehicles and a transitional value gradually restoring to the standard target distance.

According to another preferable embodiment of the present invention, the control value is obtained based on the first physical quantity and the second physical quantity to accelerate or decelerate the succeeding vehicle based on the obtained control value in the same manner. The temporary distance control is performed when the actual distance between two traveling vehicles is shorter than the standard target distance.

Preferably, the target distance is changed to a provisional target distance which has an initial value determined in accordance with the relative speed between the two traveling vehicles and a transitional value gradually restoring to the standard target distance.

Preferably, the initial value of the provisional target distance is expressed by a decreasing function of the relative speed in a region between a predetermined negative value and a predetermined positive value of the relative speed. The initial value is equal or closer to the standard target distance when the relative speed is smaller than the predetermined negative value, and is equal or closer to the actual distance between the two traveling vehicles when the relative speed is larger than the predetermined positive value.

Alternatively, the initial value of the provisional target distance is expressed by a decreasing function of the relative speed in a region between a first positive value and a second positive value of the relative speed, where the second positive value is larger than the first positive value. The initial value is equal or closer to the standard target distance when the relative speed is smaller than the first positive value, and is equal or closer to the actual distance between the two traveling vehicles when the relative speed is larger than the second positive value. In both cases, the relative speed is a positive value when the two traveling vehicles are departing from each other and is a negative value when approaching to each other.

According to another preferable embodiment, the control value is obtained based on the first physical quantity and the second physical quantity to accelerate or decelerate the succeeding vehicle based on the obtained control value in the same manner. The temporary distance control is performed when the actual distance between the two traveling vehicles is already shorter or will soon become shorter than the standard target distance due to an intentional driver's operation of the succeeding vehicle performed to reduce the actual distance between the two traveling vehicles.

Preferably, the intentional driver's operation of the succeeding vehicle is a lane change operation of the succeeding vehicle performed to follow up a new objective traveling on another traffic lane which is faster than the succeeding vehicle.

Preferably, the intentional driver's operation of the succeeding vehicle is an override operation performed to manually accelerate the succeeding vehicle so as to approach the preceding vehicle.

Preferably, the intentional driver's operation of the succeeding vehicle is a control startup operation performed to start the distance control.

The temporary distance control may be performed only when the relative speed between two traveling vehicles is larger than a predetermined value.

Preferably, the target distance is temporarily changed to a provisional target distance which has an initial value substantially equal to the actual distance between the two traveling vehicles and a transitional value gradually restoring to the standard target distance.

Alternatively, the target distance has an initial value determined in accordance with the relative speed between the two traveling vehicles and a transitional value gradually restoring to the standard target distance. In this case, the initial value of the provisional target distance is expressed by a decreasing function of the relative speed in a region from a negative lower value to an upper value equal to or closer to 0. The initial value is equal or closer to the standard target distance when the relative speed is smaller than the negative lower value, and is equal or closer to the actual distance between the two traveling vehicles when the relative speed is larger than the upper value.

For example, when the intentional driver's operation of the succeeding vehicle is the lane change operation, it is preferable to set the upper value to be a positive value closer to 0.

When the intentional driver's operation of the succeeding vehicle is the override operation, it is preferable to set the upper value to be a negative value closer to 0.

When the intentional driver's operation of the succeeding vehicle is the control startup operation, it is preferable to set the upper value to be a negative value closer to 0.

According to the present invention, the control variable is not limited to the distance between the two traveling vehicles. In this respect, it is preferable to use a target acceleration.

According to another preferable embodiment of the present invention, the temporary distance control is performed by setting a target acceleration of the succeeding vehicle. The deceleration degree of the succeeding vehicle can be temporarily suppressed to the smaller value by changing a lower limit of the target acceleration to a provisional level. The provisional level has an initial value higher than an ordinary level and a transitional value gradually restoring to the ordinary level.

According to another preferable embodiment of the present invention, a warning operation is performed when the actual distance between the two traveling vehicles becomes shorter than a predetermined warning distance. And, a temporary warning control is performed for setting a provisional warning distance shorter than an ordinary warning distance when the actual distance between the two traveling vehicles is already shorter or will soon become shorter than the ordinary warning distance due to the intentional driver's operation of the succeeding vehicle performed to reduce the actual distance between the two traveling vehicles.

Preferably, the provisional warning distance has an initial value substantially equal to the actual distance between the two traveling vehicles and a transitional value gradually restoring to the ordinary warning distance.

Preferably, the succeeding vehicle has a plurality of deceleration devices being independently operable and different from each other in degree of attainable deceleration. And, at least one of the plurality of deceleration devices is selected to decelerate the succeeding vehicle. Furthermore, the warning operating is prohibited when a deceleration level attainable by the selected one or plurality of deceleration devices is lower than a predetermined maximum level even if the actual distance between the two traveling vehicles is shorter than the ordinary warning distance.

In this case, the deceleration level of the succeeding vehicle is judged to be higher than the predetermined maximum level when a deceleration device capable of generating a largest deceleration is selected to decelerate the succeeding vehicle, or when a predetermined combination of deceleration devices capable of generating a largest deceleration is selected to decelerate the succeeding vehicle, or when the control value is equivalent to an available maximum deceleration.

For example, the temporary warning control is performed when the intentional driver's operation of the succeeding vehicle is the lane change operation, the override operation, or the control startup operation. The temporary warning control may be canceled when the succeeding vehicle is approaching the new objective.

It is preferable to perform the distance control and the warning control of the present invention by the microcomputer. The control program for executing the distance control and the warning control is stored in a recording medium which is installable in a computer system.

BRIEF DESCRIPTION OF THE DRAWINGS

The above and other objects, features and advantages of the present invention will become more apparent from the following detailed description which is to be read in conjunction with the accompanying drawings, in which:

FIG. 19 is a time sequential view showing vehicle behavior in accordance with an automatic distance control in accordance with the first embodiment of the present invention;

FIG. 26 is a flowchart showing a target distance adjustment subroutine (override mode) constituting part of the main processing procedure of the distance control apparatus shown in FIGS. 22 and 23;

DESCRIPTION OF THE PREFERRED EMBODIMENTS

Preferred embodiments of the present invention will be explained with reference to attached drawings.

First Embodiment

Figure 1:
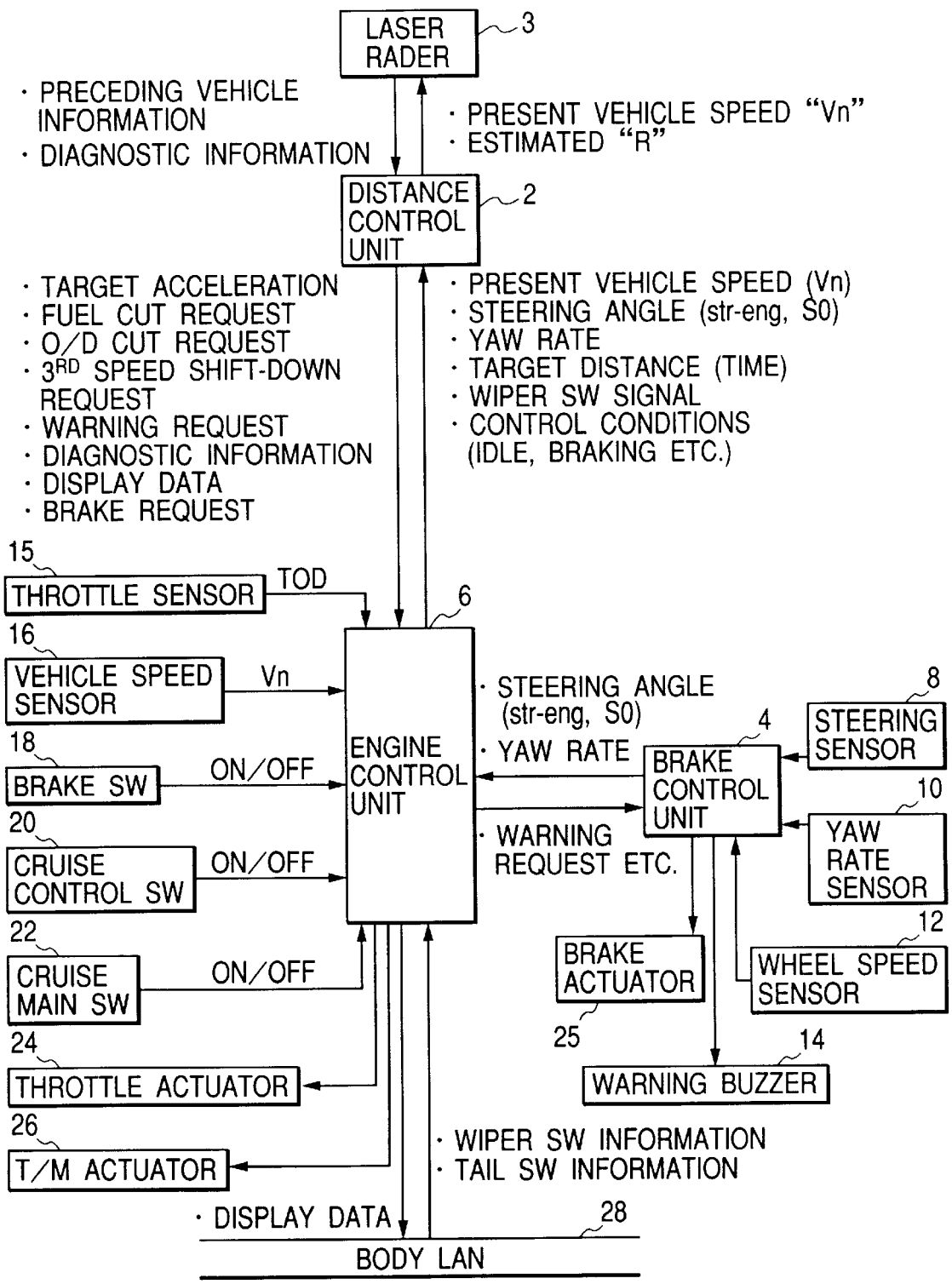
FIG. 1 is a block diagram showing a schematic system arrangement of a distance control apparatus for controlling the space between two traveling vehicles in accordance with the present invention.

FIG. 1 shows an integrated control system of an automotive vehicle, comprising a distance control unit 2 for electronically controlling a space or distance between two traveling vehicles, a brake control unit 4 for electronically controlling the braking device for applying a braking force to wheels of the automotive vehicle, and an engine control unit 6 for controlling an internal combustion engine of the automotive vehicle.

The distance control unit 2 is an electronic circuit including a microcomputer connected to the engine control unit 6 and installed in an automotive vehicle (hereinafter referred to as a system's vehicle). The distance control unit 2 receives a present vehicle speed (Vn) signal, a steering angle (str-eng, SO) signal, a yaw rate signal, a target distance signal, a wiper switch signal, and various control condition signals, such as engine idling control and brake control signals, from the engine control unit 6. The distance control unit 2 estimates a curvature radius "R" of the road to travel and calculates a distance or interval from the system's vehicle to a preceding vehicle.

A laser radar 3 is an electronic circuit including a laser distance scanner and a microcomputer. The laser distance scanner detects an angle of the preceding vehicle as well as a distance and/or a relative speed of the system's vehicle with respective to the preceding vehicle. The laser radar 3 functions as part of the distance control unit 2. For example, the laser radar 3 calculates the probability of both the preceding vehicle and the system's vehicle traveling on the same traffic lane or zone of the traveling road based on the present vehicle speed (Vn) signal and the estimated curvature radius "R" of the traveling road.

The calculated result is sent as the preceding vehicle information to the distance control unit 2. The preceding vehicle information includes the detected distance and the relative speed between the system's vehicle and the preceding vehicle as well as the same lane probability. Furthermore, the laser radar 3 performs diagnosis and sends a resultant diagnosis signal to the distance control unit 2.

The laser distance scanner irradiates a laser beam directed to the traveling direction of the system's vehicle as a transmission radio wave with a predetermined scanning angle and receives the laser beam reflected from a detected object. The laser distance scanner calculates the distance between the system's vehicle and the preceding vehicle in relation to the scanning angle.

The distance control unit 2 identifies a preceding vehicle to be recognized as an objective based on the preceding vehicle information received from the laser radar 3. The distance control unit 2 sends various control commands to the engine control unit 6 for adequately adjusting the distance or space between the system's vehicle and the preceding vehicle. The control commands, generated from the distance control unit 2, comprise a target acceleration signal, a fuel cut request signal, an O/D cut request signal, a third-speed shift down request signal, and a brake request signal. Furthermore, the distance control unit 2 performs the judgement for issuing a warning. A warning request signal or a warning cancel signal is sent to the engine control unit 6. A diagnosis signal and a display signal are also sent from the distance control unit 2 to the engine control unit 6.

The brake control unit 4 is an electronic circuit including a microcomputer associated with a steering sensor 8 detecting a steering angle of the system's vehicle, a yaw rate sensor 10 detecting a yaw rate of the system's vehicle, and a wheel speed sensor 12 detecting a rotational speed of each wheel. The brake control unit 4 sends the obtained data, such as the steering angle and the yaw rate of the system's vehicle, to the distance control unit 2 via the engine control unit 6. The brake control unit 4 receives the control commands, such as the target acceleration signal and the brake request signal, from the distance control unit 2 via the engine control unit 6 to control a brake actuator 25. The brake actuator 25 performs the duty control for opening and closing the pressurizing and depressurizing control valves equipped in a hydraulic braking pressure control circuit. Furthermore, the brake control unit 4 further receives the warning request signal from the distance control unit 2 via the engine control unit 6. The brake control unit 4 actuates a warning buzzer 14 in response to the warning request signal.

The engine control unit 6 is an electronic circuit including a microcomputer associated with a throttle opening sensor 15 detecting a throttle opening degree (TOD) of the internal combustion engine, a vehicle speed sensor 16 detecting a present vehicle speed (Vn), a brake switch 18 detecting the depression of a braking pedal, a cruise control switch 20, and a cruise main switch 22. The engine control unit 6 further receives various detecting signals obtained from other sensors and switches. A body LAN 28 is connected to the engine control unit 6 to transmit a wiper switch signal and a tail switch signal to the engine control unit 6. The engine control unit 6 is connected to the brake control unit 4 to receive the steering angle (str-eng, SO) signal and the yaw rate signal. The engine control unit 6 is connected to the distance control unit 2 to receive the target acceleration signal, the fuel cut request signal, the O/D cut request signal, the third-speed shift down request signal, the brake request signal, the warning request signal, the diagnosis signal, and the display data signal.

The engine control unit 6 controls a throttle actuator 24 and a transmission actuator 26 in accordance with the received signals representing the driving conditions. The throttle actuator 24 adjusts the throttle opening degree (TOD) of the internal combustion engine to control the output power of the internal combustion engine. The transmission actuator 26 performs the gear shift change as well as the lock-up control of the torque converter.

The transmission (not shown) is a five-speed automatic transmission with a fourth-speed stage of a reduction ratio=1 and a fifth-speed stage of a reduction ratio=0.7, which is generally referred to as a "4 speeds+overdrive (O/D)" transmission. In this case, the reduction ratio is defined by a ratio of the rotational speed of the gear to the output speed of the engine.

Accordingly, when the engine control unit 6 receives the O/D cut request signal from the distance control unit 2, the transmission actuator 26 causes the transmission to shift down from the fifth-speed stage to the fourth-speed stage in response to this O/D cut request signal. When the engine control unit 6 receives the third-speed shift down request signal from the distance control unit 2, the transmission actuator 26 causes the transmission to shift down from the fourth-speed stage to the third-speed stage in response to this third-speed shift down signal. In general, the shift-down operation of the transmission causes a large engine brake force. The system's vehicle decelerates in accordance with the generated braking force.

The engine control unit 6 transmits display information to a display unit (not show), such as an LCD located on an instrument panel or a dashboard in the passenger compartment, through the body LAN 28. Furthermore, the engine control unit 6 transmits the present vehicle speed (Vn) signal, the steering angle (str-eng, SO) signal, the yaw rate signal, the target distance signal, the wiper switch signal, and various control condition signals, such as engine idling signal and braking signal, to the distance control unit 2.

The detailed operation of the distance control unit 2 is explained with reference to flowcharts shown in FIGS. 2 to 17.

Figure 2:
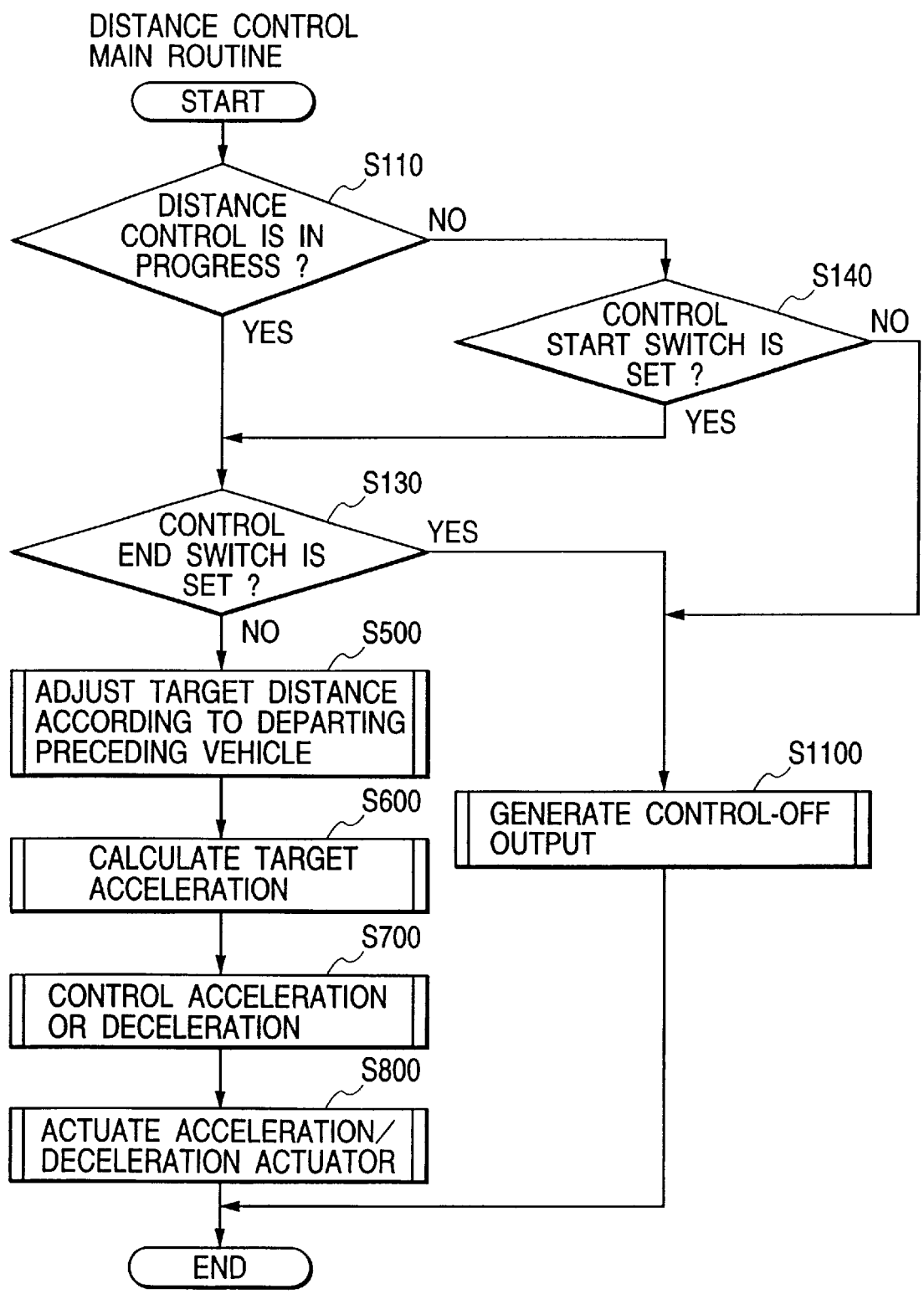
FIG. 2 is a flowchart showing a main processing procedure of the distance control apparatus in accordance with a first embodiment of the present invention.

FIG. 2 is a flowchart showing the main processing procedure performed in the distance control unit 2 in accordance with the first embodiment of the present invention. First, in step S110, it is checked whether the distance control is in progress or not. When the control is not started yet (NO in the step S110), it is checked in step S140 whether a control start switch is set or not. In this embodiment, the cruise control switch 20 functions as the control start switch.

When the cruise control switch 20 is turned on, the judgement of the step 140 becomes YES. When the control start switch is not set yet (NO in the step S140), control-off output signals responsive to the deactivation of the acceleration/deceleration actuator are generated in step S1100. Then, the main processing procedure is terminated.

When the control start switch is already set (YES in the step S140), the control flow proceeds to step S130. Meanwhile, when the distance control is already started in the step S110, the control flow directly proceeds to the step S130.

In the step S130, it is checked whether a control end switch is set or not. In this embodiment, the cruise control switch 20 also functions as the control end switch. When the cruise control switch 20 is turned off, the judgement of the step 130 becomes YES. When the control end switch is already set (YES in the step S130), the control-off output signals are generated in the step S1100. Then, the main processing procedure is terminated.

When the control end switch is not set yet (NO in the step S130), the control flow proceeds to sequential steps of S500 (a subroutine for adjusting a target distance according to a departing preceding vehicle), S600 (a subroutine for calculating a target acceleration), S700 (a subroutine for controlling the acceleration and deceleration), and S800 (a subroutine for actuating the acceleration/ deceleration apparatus). Then, the main processing procedure is terminated.

Figure 3:
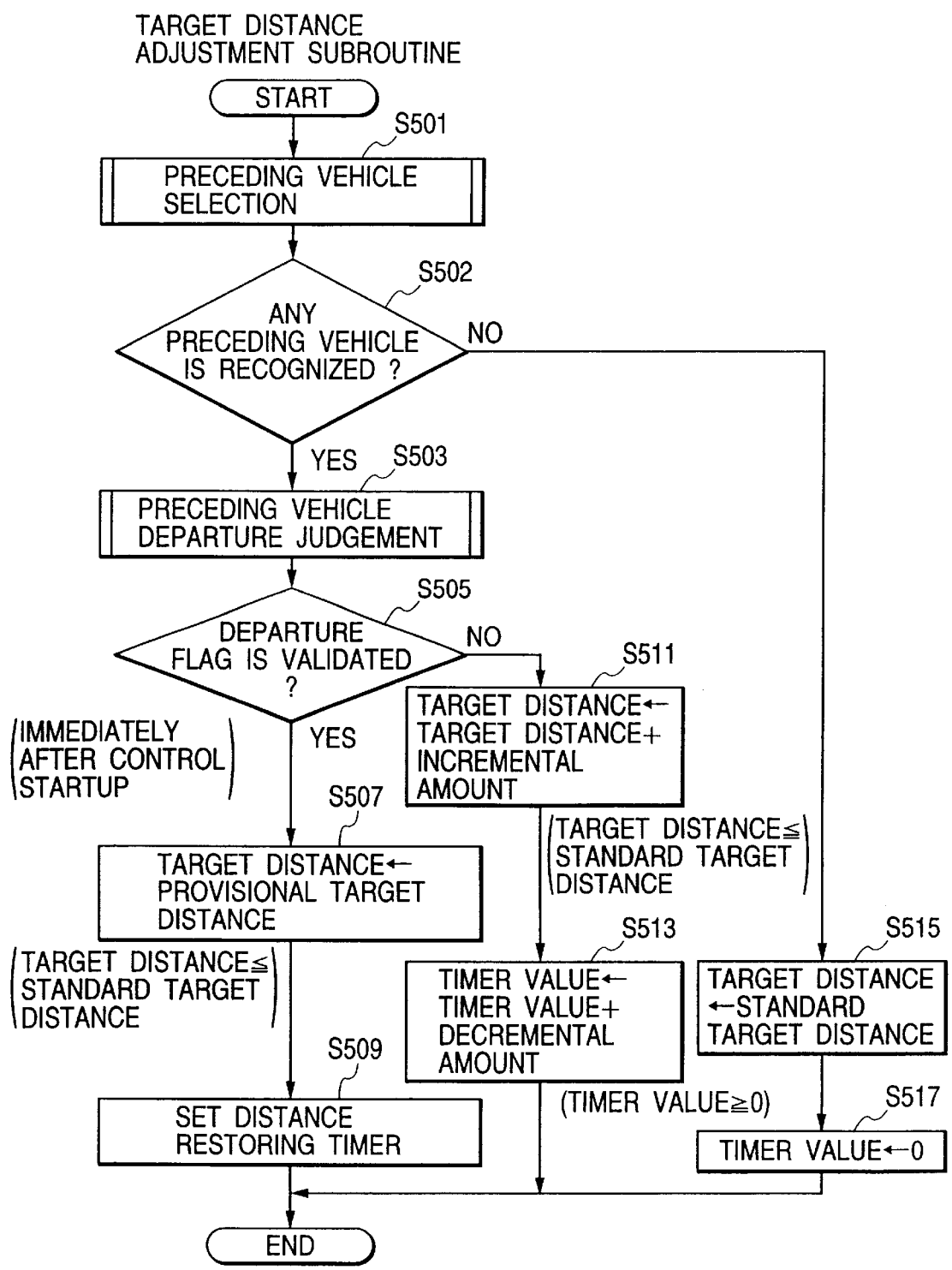
FIG. 3 is a flowchart showing a target distance adjustment subroutine constituting part of the main processing procedure of the distance control apparatus in accordance with the first embodiment of the present invention.

FIG. 3 is a flowchart showing the details of the step S500 which is the subroutine for adjusting a target distance according to a departing preceding vehicle.

In step S501, a preceding vehicle selection is performed.

Figure 4:
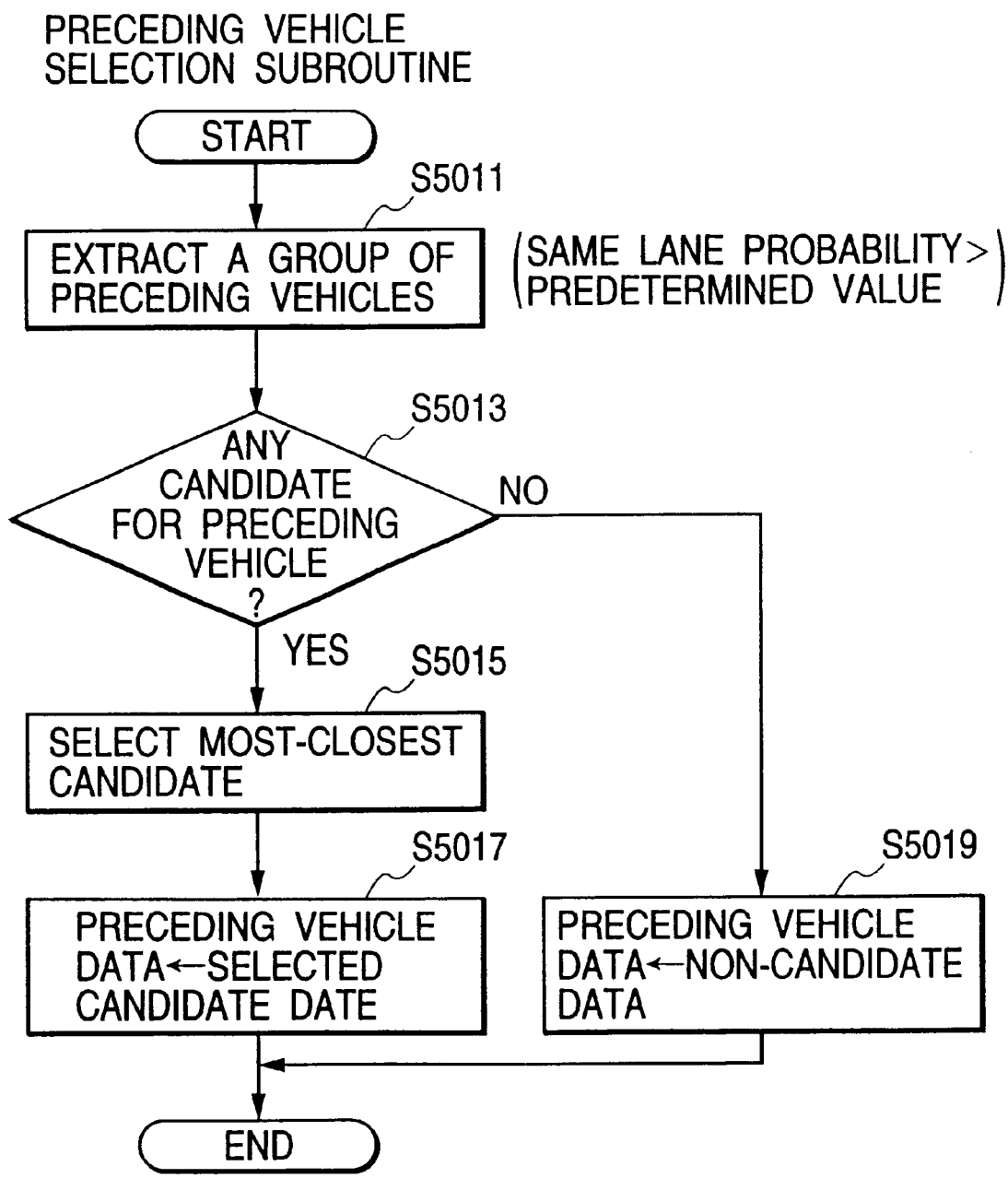
FIG. 4 is a flowchart showing details of a preceding vehicle selection subroutine shown in FIG. 3.

FIG. 4 is a flowchart showing details of the step S501 which is a preceding vehicle selecting subroutine.

In step S5011, a candidate group is extracted from all objectives recognized by the laser radar 3. The candidate group consists of all preceding vehicles traveling on the same traffic lane or zone of the traveling road, which are discriminable based on the same lane probability calculated by the laser radar 3. As described above, the laser radar 3 calculates the same lane probability (i.e., probability of both the preceding vehicle and the system's vehicle traveling on the same traffic lane or zone of the traveling road) based on the present vehicle speed (Vn) signal and the estimated curvature radius "R" of the traveling road. The calculated result is sent as the preceding vehicle information to the distance control unit 2.

When a preceding vehicle has a same lane probability higher than a predetermined value, this preceding vehicle is identified as one of candidates.

In step S5013, it is checked whether any candidate is recognized or not. When there is no candidate (NO in the step S5013), the control flow proceeds to step S5019 to memorize predetermined non-candidate data as preceding vehicle data. Then, this subroutine is completed.

When there is any candidate (YES in the step S5013), the control flow proceeds to step S5015 to select the most-closest candidate (i.e., most-closest preceding vehicle). The selected candidate (i.e., selected preceding vehicle) is identified as an objective for the distance control. Then, the control flow proceeds to the next step S5017 to memorize the selected candidate data as the preceding vehicle data. Then, this subroutine is completed.

Returning to the flowchart of FIG. 3, in step 502, it is checked whether any preceding vehicle is recognized or not. When no preceding vehicle is recognized (i.e., NO in the step S502), a standard target distance is set as a valid target distance in step S515. Then, a distance restoring timer is reset (=0) in step S517. Then, this subroutine is completed. The standard target distance may be constant or variable depending on the traveling speed of the system's vehicle.

When any preceding vehicle is recognized (i.e., YES in the step S502), the control flow proceeds to step S503 to execute a preceding vehicle departure judgement.

Figure 5:
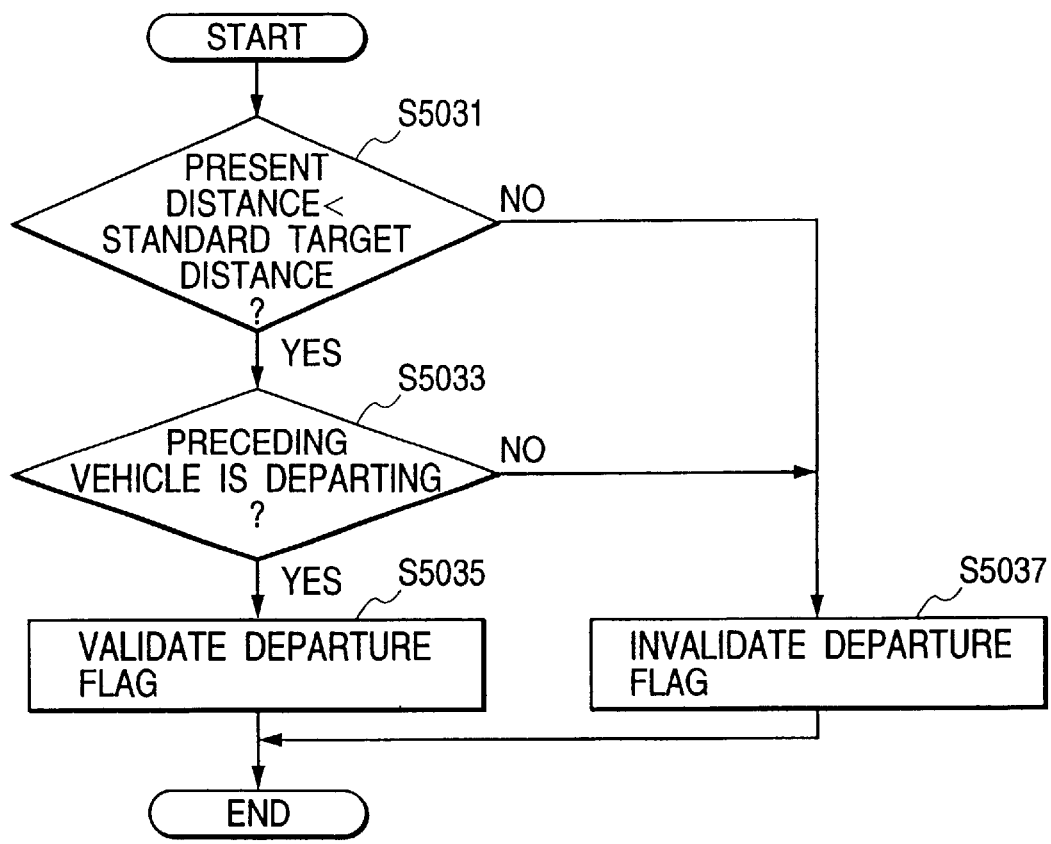
FIG. 5 is a flowchart showing details of a preceding vehicle departure judgement subroutine shown in FIG. 3.

FIG. 5 is a flowchart showing the details of the step S503.

In step S5031, it is checked whether the present distance (i.e., actual distance) is shorter than the standard target distance or not. When the present distance is shorter than the standard target distance (i.e., YES in step S5031), it is further checked in step S5033 whether the preceding vehicle is departing from the system's vehicle or not. When the preceding vehicle is departing from the system's vehicle (i.e., YES in the step S5033), a departure flag is validated in step S5035.

On the other hand, when the present distance is not shorter than the standard target distance (i.e., NO in step S5031) or when the preceding vehicle is not departing from the system's vehicle (i.e., NO in the step S5033), the departure flag is invalidated in step S5037.

Figure 6:
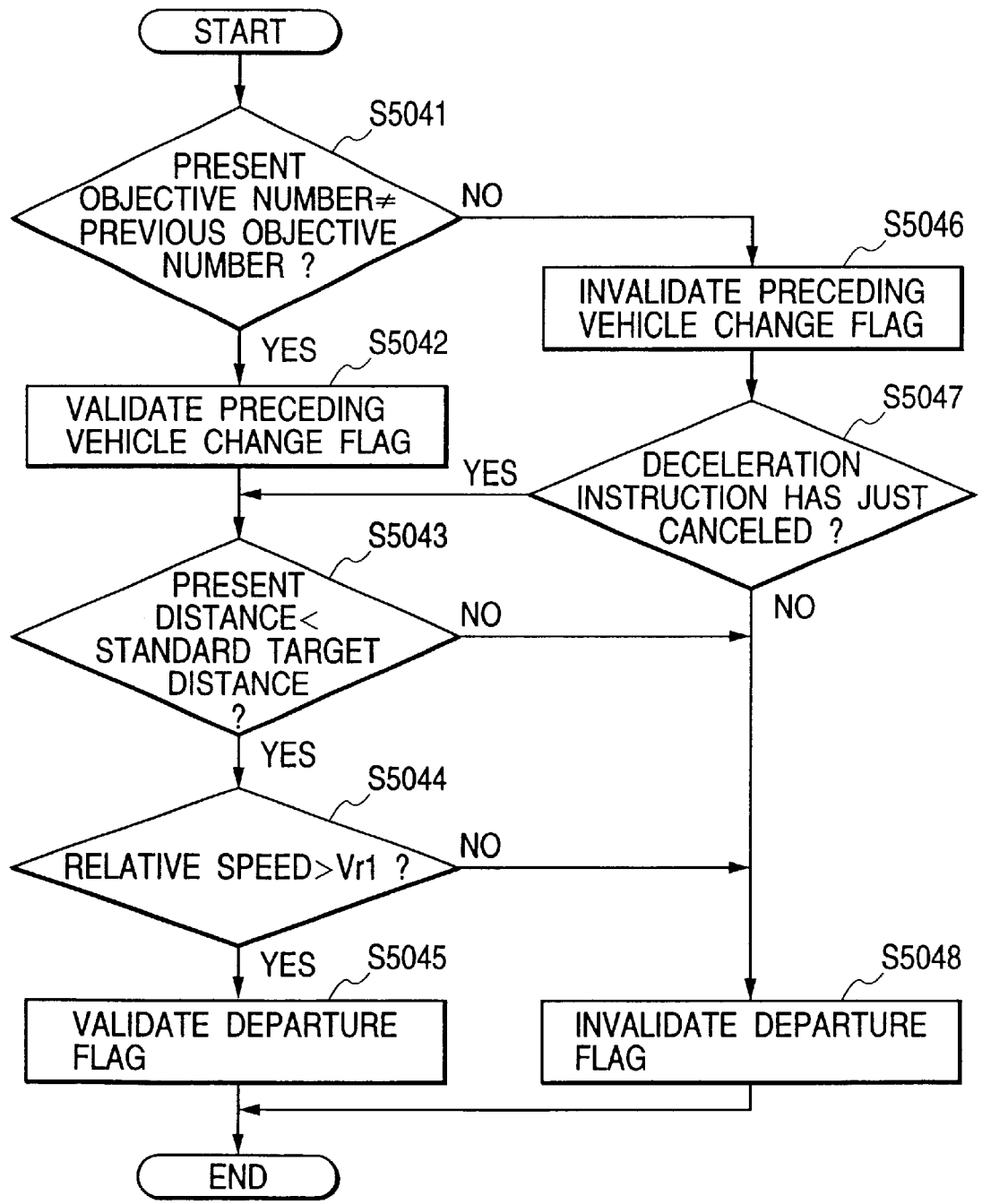
FIG. 6 is a flowchart showing details of another preceding vehicle departure judgement subroutine shown in FIG. 3.

FIG. 6 is a flowchart showing another preceding vehicle departure judgement subroutine performed in the step S503.

In step S5041, it is checked whether the objective number of a present 30 preceding vehicle is different from the objective number in the previous control cycle or not.

Figure 7:
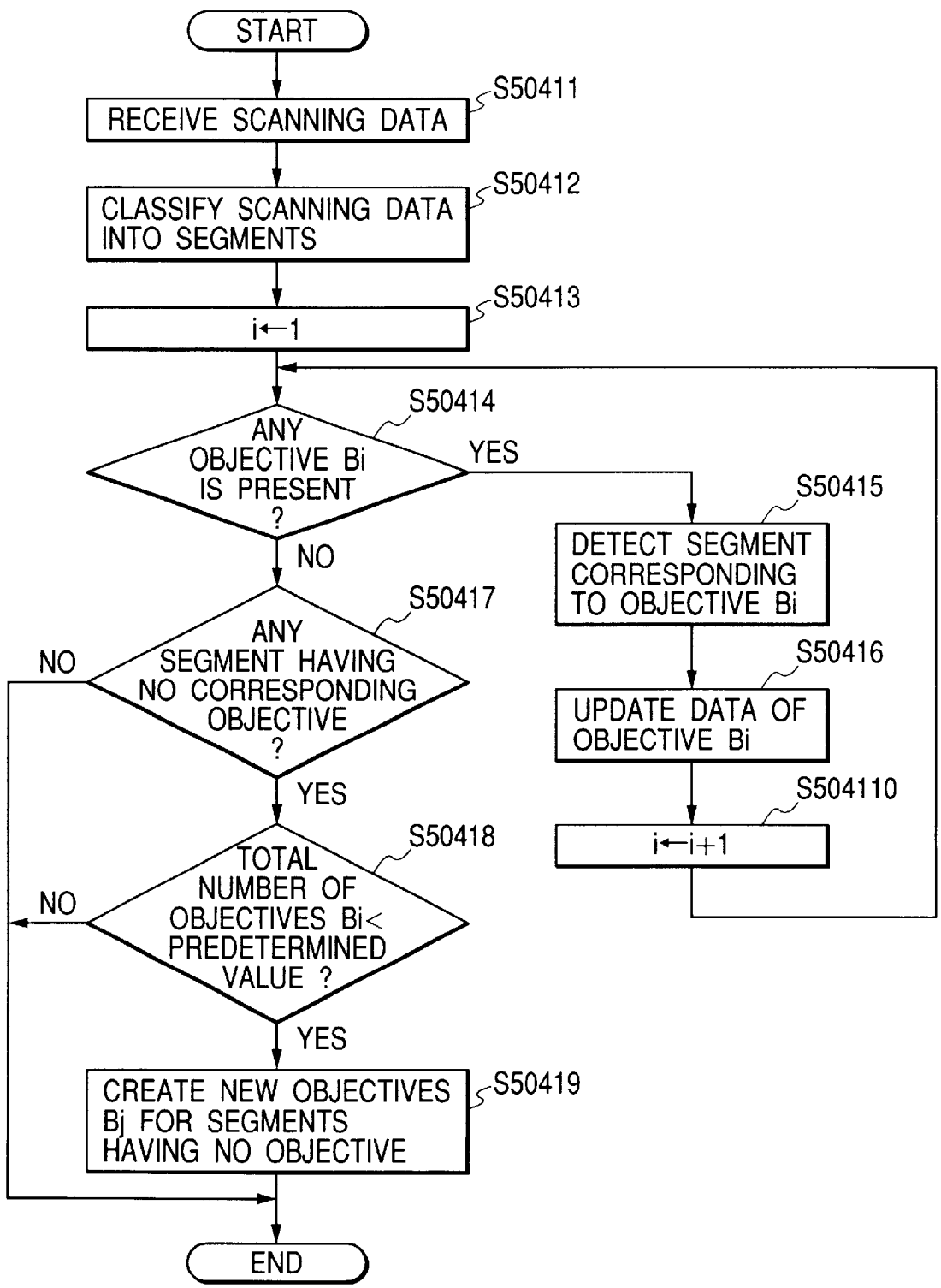
FIG. 7 is a flowchart showing details of preceding vehicle recognition processing in accordance with the first embodiment of the present invention.

FIG. 7 shows the scanning processing performed in the laser radar 3 to identify a plurality of preceding vehicles in accordance with the past measuring data.

Figure 8A:
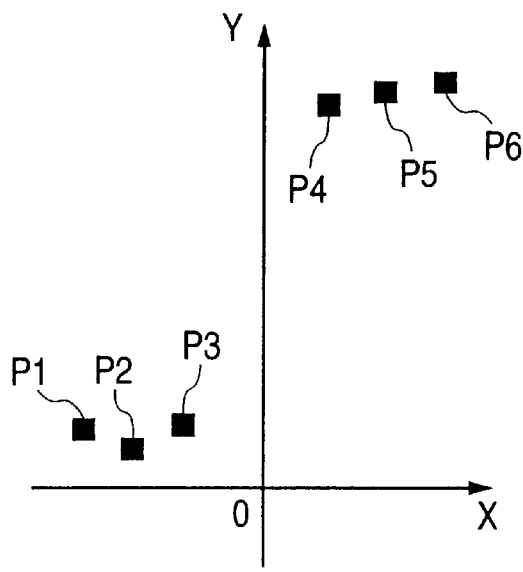
FIGS. 8A to 8C are views cooperatively illustrating the outline of the preceding vehicle recognition.

In step S50411, scanning data are received. FIG. 8A show a distribution of the scanning data detected by the laser radar 3. The scanning data are a group of one-dimensional distance data in relation to the scanning angle, each being expressed by a coordinate value (X, Y) in the orthogonal coordinate system. FIG. 8A shows a total of six scanning data, i.e., P1, P2, P3, P4, P5 and P6.

Next, in step S50412, the scanning data are segmented in the following manner. Respective scanning data are classified according to predetermined conditions. The data belonging to the same group are summarized as a single segment. When a preceding vehicle (its body or reflection plates provided at right and left tail lamps) is scanned by the laser radar, a plurality of scanning data are usually obtained in relation to the plurality of scanning angles.

Figure 8B:
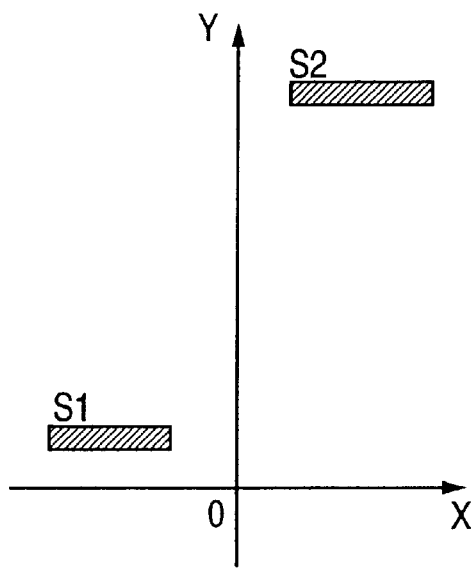

FIG. 8B shows the result of segmentation, according to which the neighboring scanning data P1, P2 and P3 are summarized as a single segment S1 and another neighboring scanning data P4, P5 and P6 are summarized as another single segment S2.

After finishing the step S50412, the control flow proceeds to step S50413 to substitute 1 for the variable "i" (i=integer). Next, in step S50414, it is checked whether an objective (i.e., recognized preceding vehicle) Bi is present or not. In other words, the objective Bi is a vehicle model created based on the segment. For example, no objective Bi may be present in an engine startup condition.

When the objective Bi is not present (i.e., NO in the step S50414), the control flow proceeds to step S50417. It is then checked in step S50417 whether there is any segment having no corresponding objective Bi. For example, no objective Bi will exist in the engine startup condition. Thus, all of the segments have no correspond objective Bi. The judgement becomes YES in the step S50417. The control flow proceeds to step S50418 to further check whether the total number of objectives Bi is smaller than a predetermined number. The predetermined number, referred to in this comparison, is a necessary and sufficient value as being corresponding to the vehicle numbers appearing in a predetermined scanning angle of the laser beam.

When the total number of objectives Bi is smaller than the predetermined number (i.e., YES in the step S50418), the control flow proceeds to step S50419 to create new objectives Bj (j=1, 2, . . . ) for the segments having no objective. In this case, assignment of the objective Bj to each segment is carried out in order of closeness between the segment and the system's vehicle. When the total number reaches the predetermined number, no further objective Bj is created.

The data relating to the newly created objective Bj include a central coordinate (X, Y), a width W, a relative speed (Vx, Vy), past four values representing the central coordinate (X, Y), and the same lane probability. The same lane probability is calculated based on the estimated curvature radius "R" transmitted from the distance control unit 2, and indicates the probability that both the objective Bj and the system's vehicle exist on the same traffic lane to travel.

When any objective Bi is present (i.e., YES in the step S50414), the control flow proceeds to step S50415 to detect the segment corresponding to the objective Bi. In this case, the segment corresponding to the objective Bi is defined in the following manner.

Figure 8C:
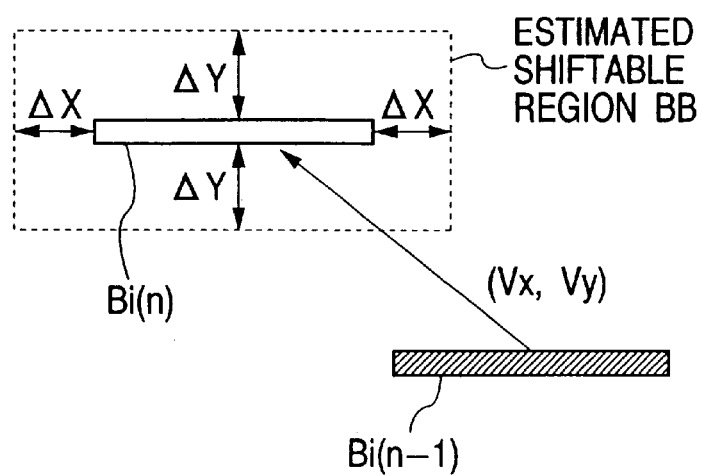

It is assumed, as shown in FIG. 8C, that the objective Bi moves from the previous position Bi(n−1) in a vectorial direction represented by the coordinate value of the relative speed (Vx, Vy). Then, an estimated position Bi(n) is calculated as a region where the present objective Bi will be present.

Next, an estimated shiftable region BB is provided as an enlarged area surrounding the estimated position Bi(n). The estimated shiftable region BB is wider than the estimated position Bi(n) by an amount ΔX in both right and left directions and by an amount ΔY in both upper and lower (closer and farther) directions. Any segment positioned in this estimated shiftable region BB is defined as the segment corresponding to the objective Bi.

After finishing the step S50415, the control flow proceeds to step S50416 to update the data of the objective Bi by the present measuring data. Then, the variable "i" is incremented (i.e., i←i+1) in the next step S504110.

In each scanning cycle, the laser radar 3 identifies the same vehicle as the same objective Bi by checking the relationship between the present measuring data and the past measuring data. The identified objectives Bi are successively transmitted to the distance control unit 2 in relation to the variable "i." In other words, the same objective number is assigned to the same vehicle whenever this vehicle is notified to the distance control unit 2.

Accordingly, the step S5041 of FIG. 6 is performed to check coincidence between the objective number of the present preceding vehicle and the objective number in the previous control cycle, thereby confirming any change in the objective for the distance control.

When the present objective number is different from the previous objective number (i.e., YES in the step S5041), the control flow proceeds to step S5042 to validate a preceding vehicle change flag. Subsequently, in step S5043, it is checked whether the present distance is shorter than the standard target distance or not. When the present distance is shorter than the standard target distance (i.e., YES in the step S5043), it is further checked in step S5044 whether the relative speed is larger than a threshold Vr1 or not. The threshold Vr1 is used in judging the departure of the preceding vehicle.

When the relative speed is larger than Vr1 (i.e., YES in the step S5044), the control flow proceeds to step S5045 to set the departure flag is validated.

When the present objective number is identical with the previous objective number (i.e., NO in the step S5041), the control flow proceeds to step S5046 to invalidate the preceding vehicle change flag. Subsequently, in step S5047, it is checked whether the deceleration instruction has just canceled or not. In this case, the deceleration instruction includes an accelerator closing instruction, a shift-down instruction, and a braking instruction.

When the deceleration instruction has just canceled (YES in the step S5047), the control flow proceeds to the step S5043 which is explained in the foregoing description.

When the judgement result is NO in the steps S5047, S5043 and S5044, the control flow proceeds to step S5048 to invalidate the departure flag.

After finishing the step S5045 or S5048, this subroutine is completed.

Returning to the flowchart of FIG. 3, in step S505, it is checked whether the departure flag is validated. When the departure flag is validated (i.e., YES in the step S505), it is assumed that the distance between the system's vehicle and the preceding vehicle will increase smoothly and exceed the target distance soon. Thus, the control flow proceeds to step S507 to set a provisional target distance. In the step S507, an upper guard is provided to prevent the provisional target distance from exceeding the standard target distance set in the step S515.

When the preceding vehicle departure judgement (I) shown in FIG. 5 is used, it is preferable to equalize the provisional target distance with the present distance or a similar value.

Figure 9A:
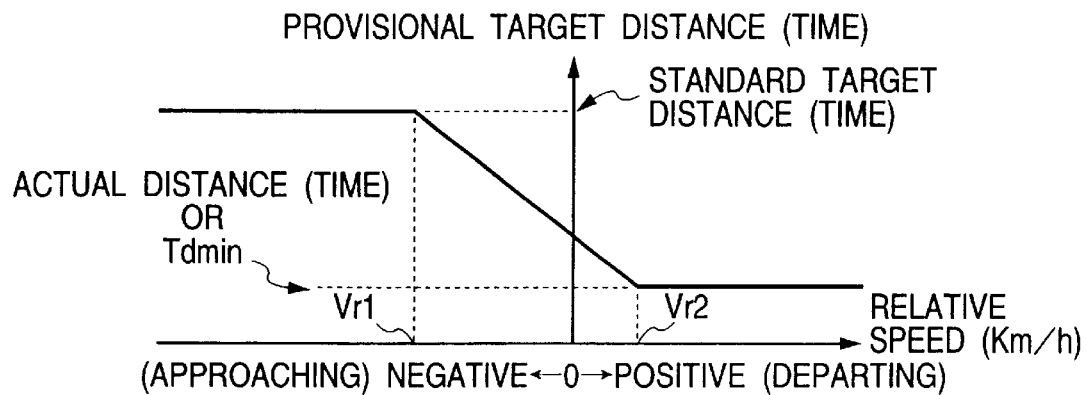
FIGS. 9A and 9B are graphs each showing the functional relationship between the provisional target distance and the relative speed used in the first embodiment of the present invention.
Figure 9B:
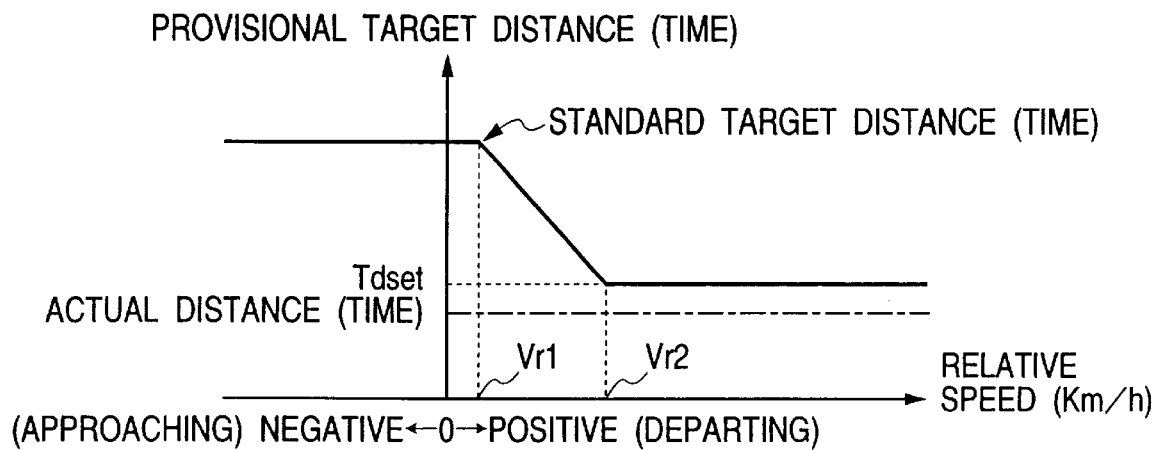

When the preceding vehicle departure judgement (II) shown in FIG. 6 is used, it is preferable to determine the provisional target distance as a function of the relative speed as shown in FIG. 9A or 9B so that the provisional target distance can be adequately determined according to the traveling conditions.

FIG. 9A shows the relationship between the provisional target distance and the relative speed, which is preferably adopted when the preceding vehicle has changed the traffic lane. Namely, when the preceding vehicle change flag is validated in the step S5042, the provisional target distance used in the step S507 is determined according to the functional graph shown in FIG. 9A.

FIG. 9B shows the relationship between the provisional target distance and the relative speed, which is preferably adopted when the preceding vehicle accelerates after it once decelerated. Namely, when the preceding vehicle change flag is invalidated in the step S5046, the provisional target distance used in the step S507 is determined according to the functional graph shown in FIG. 9B.

In both cases, the provisional target distance is expressed in terms of time interval (sec) which is obtained by dividing the distance between two vehicles by the vehicle speed of the system's vehicle.

According to the functional graph shown in FIG. 9A, the provisional target distance is equalized to a standard target distance when the relative speed is smaller than the threshold Vr1 (negative value). The provisional target distance linearly decreases with increasing relative speed when the relative speed is in a range between the threshold Vr1 and a threshold Vr2 (positive value). And, the provisional target distance is equalized to the actual distance when the relative speed is larger than threshold Vr2, although the provisional target distance is forcibly equalized to a predetermined minimum value Tdmin when the actual time interval is shorter than Tdmin. The minimum value Tdmin is an allowable minimum time interval to avoid dangerous situations.

According to the functional graph shown in FIG. 9B, the provisional target distance is equalized to the standard target distance when the relative speed is smaller than the threshold Vr1 (positive value). The provisional target distance linearly decreases with increasing relative speed when the relative speed is in a range between the threshold Vr1 and the threshold Vr2 (>Vr1). And, the provisional target distance is equalized to a predetermined value Tdset which is larger than the actual distance when the relative speed is larger than the threshold Vr2. The predetermined value Tdset is given for adjusting the deceleration degree so as to prevent the vehicle from been excessively accelerated or to eliminate undesirable hunting phenomenon appearing during the automatic distance control.

Returning to the flowchart 3, after finishing the step S507, the control flow proceeds to step S509 to set a distance restoring timer. Then, this subroutine is completed.

When the departure flag is invalidated (i.e., NO in the step S505), the control flow proceeds to step S511 to adjust the provisional target distance. More specifically, the target distance is renewed by adding an incremental amount to the previous target distance. In this case, the upper guard is provided in the same manner as in the step S507 (i.e., provisional target distance<standard target distance).

Next, in step S513, the distance restoring timer value is renewed by adding a decremental amount to the previous timer value. In this case, a lower guard is provided so that the timer value is prevented from decreasing below 0 (i.e., distance restoring timer value ≧0). Then, this subroutine is completed.

There are various ways to control the restoration of the target distance.

Figure 21:
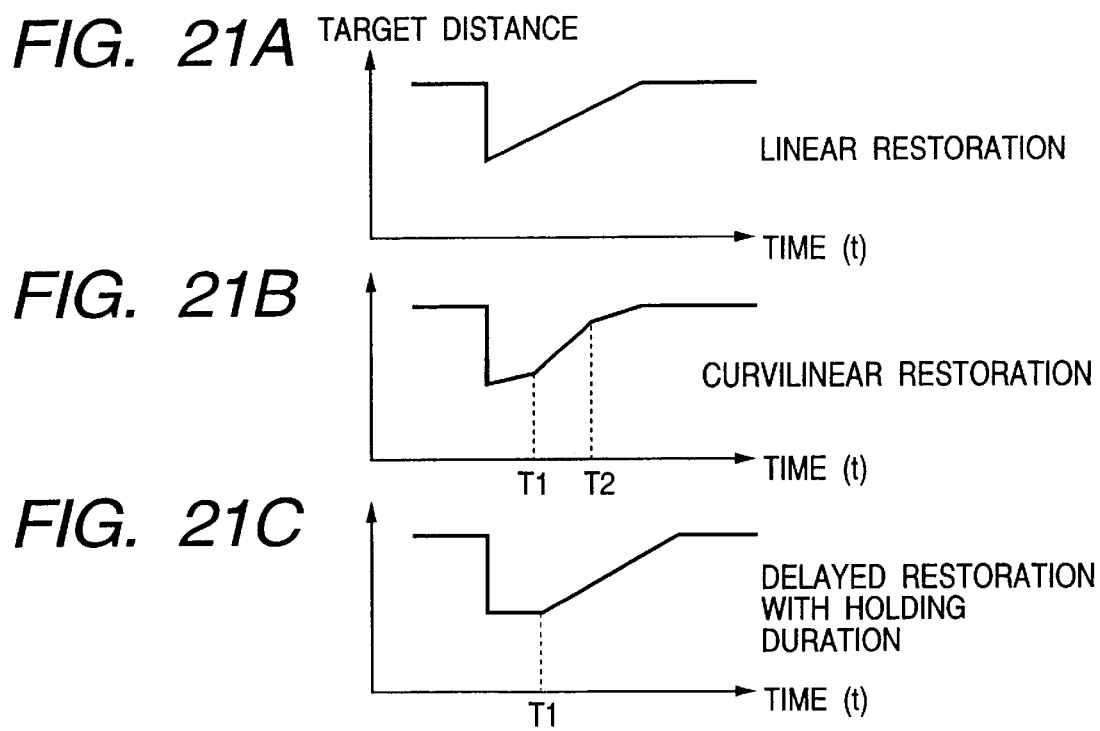
FIGS. 21A to 21C are views each showing restoration of the target distance in accordance with the first embodiment of the present invention.

For example, in a first case, as shown in FIG. 21A, it may be preferable that the provisional target distance restores linearly to the standard target distance. In this case, the incremental amount added in the step S511 is a constant positive value regardless of the restoring timer value.

In a second case, as shown in FIG. 21B, it may be preferable that the provisional target distance restores curvilinearly to the standard target distance. In this case, the incremental amount added in the step S511 varies in accordance with the timer value of the distance restoring timer; i.e., a small positive value in a beginning stage (t>T1), a large positive value in an intermediate stage (T1>t>T2), and a small positive value in a final stage (T2>t), where the timer value "t" is a decremental value.

In a third case, as shown in FIG. 21C, it may be preferable to provide a holding or dormant duration before the provisional target distance restores to the standard target distance. In this case, the incremental amount added in the step S511 is 0 in a first stage (t>T1) and a constant positive value in a second stage (T1>t).

Figures 10A, 10B:
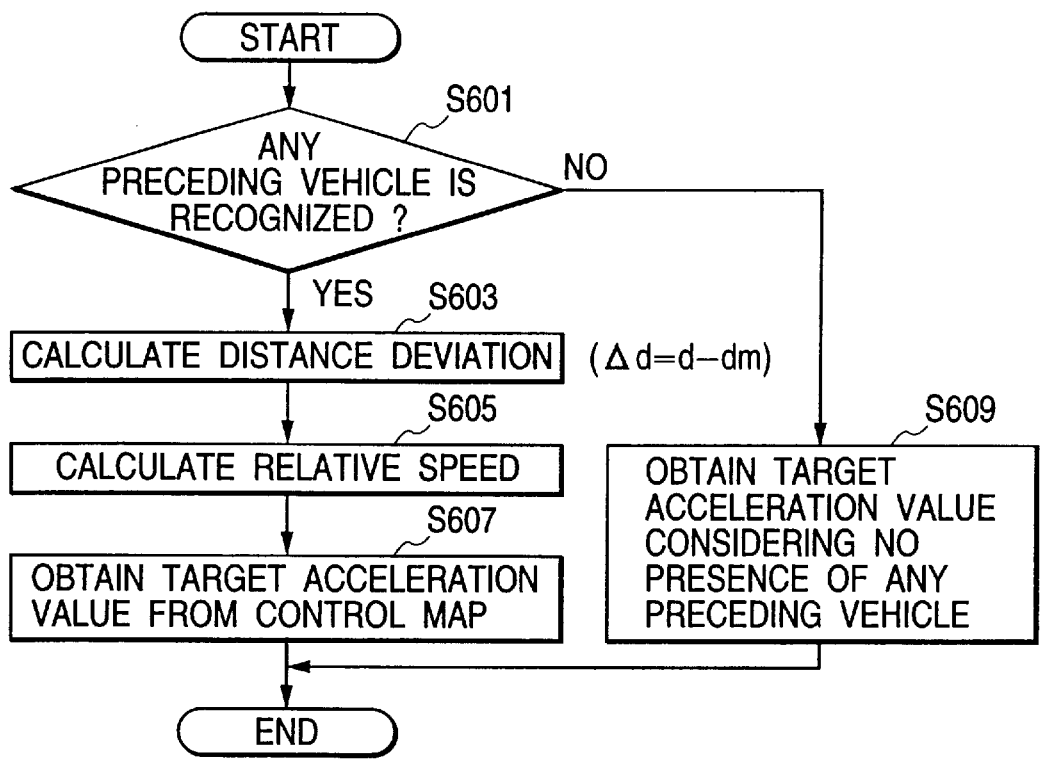
FIG. 10A is a flowchart showing a target acceleration calculation subroutine constituting part of the main processing procedure of the distance control apparatus in accordance with the first embodiment of the present invention.
FIG. 10B is a control map used in the target acceleration calculation subroutine.

FIG. 10A is a flowchart showing the details of the step S600 which is the subroutine for calculating the target acceleration (or deceleration).

In step S601, it is checked whether any preceding vehicle is recognized or not. When no preceding vehicle is recognized (NO in the step S601), a target acceleration value is obtained considering no presence of any preceding vehicle in step S609. Then, this subroutine is completed. When any preceding vehicle is recognized (YES in the step S601), the control flow proceeds to step S603 to calculate a distance deviation Δd.

The distance deviation Δd is defined by Δd=d−dm, when "d" represents an actual distance between the preceding vehicle and the system's vehicle and "dm" represents the target distance between the vehicles.

Then, in the next step S605, a relative speed ΔV is calculated based on a distance variation between two traveling vehicles which is recognized by the laser radar 3. The laser radar 3 has the capability of calculating the relative speed ΔV based on the detected distance variation, so that the calculated relative speed value is sent to the distance control unit 2. Otherwise, the distance control unit 2 can obtain the relative speed ΔV based on the distance information sent from the laser radar 3.

The processing order of the successively performed steps S603 and S605 can be reversed if required.

Then, in the next step S607, a target acceleration value is obtained based on the distance deviation Δd obtained in the step S603 and the relative speed ΔV obtained in the step S605 with reference to a control map shown in FIG. 10B. The control map of FIG. 10B shows a total of seven discrete reference values for the distance deviation Δd, i.e., −1, −0.5, 0, 0.5, 1, 1.5, 2 (sec), as well as a total of six discrete reference values for the relative speed ΔV, i.e., 16, 8, 0, −8, −16, −24 (km/h). Map data are given in relation to these different discrete reference values. When the obtained distance deviation Δd and/or the obtained relative speed ΔV are somewhere between two discrete reference values, the map data are linearly interpolated to obtain an appropriate control value. When the obtained distance deviation Δd or the obtained relative speed ΔV is large or small beyond the designated region of the control map shown in FIG. 10B, the control value is obtained based on the most-closest discrete reference value (i.e., a value located at the corresponding edge of the control map). It is possible to apply a predetermined upper and/or lower limit guard in the adoption of the map data. Then, this subroutine is completed.

Figure 11:
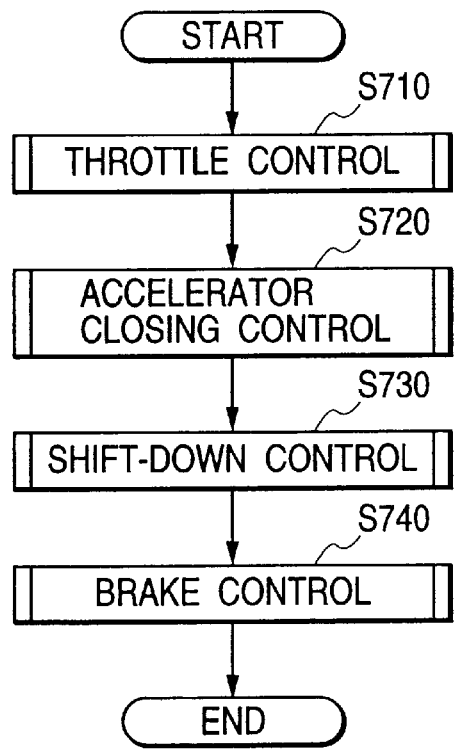
FIG. 11 is a flowchart showing an acceleration/deceleration control subroutine constituting part of the main processing procedure of the distance control apparatus shown in FIG. 2.

FIG. 11 is a flowchart showing the details of the step S700 which is the subroutine for obtaining the target acceleration. This subroutine comprises a throttle control (step S710), an accelerator closing control (step S720), a shift-down control (step S730), and a braking control (step S740) which are sequentially performed.

Figure 12:
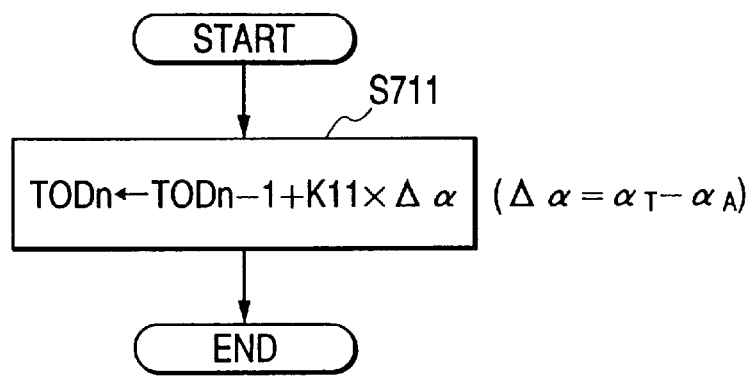
FIG. 12 is a flowchart showing details of a throttle control performed in the acceleration/deceleration control subroutine shown in FIG. 11.

FIG. 12 is a flowchart showing the details of the throttle control of the step S710. More specifically, in step S711, a present throttle opening degree TODn is obtained by multiplying a throttle control gain K11 with an acceleration deviation Δα and adding the obtained multiplied value K11×Δα to a previous throttle opening degree TODn−1.

$$TOD_n \leftarrow TOD_{n-1} + K11 \times \Delta\alpha$$

$$\Delta\alpha = \alpha_T - \alpha_A$$

where $\alpha_T$ represents the target acceleration and $\alpha_A$ represents an actual acceleration.

Figure 13:
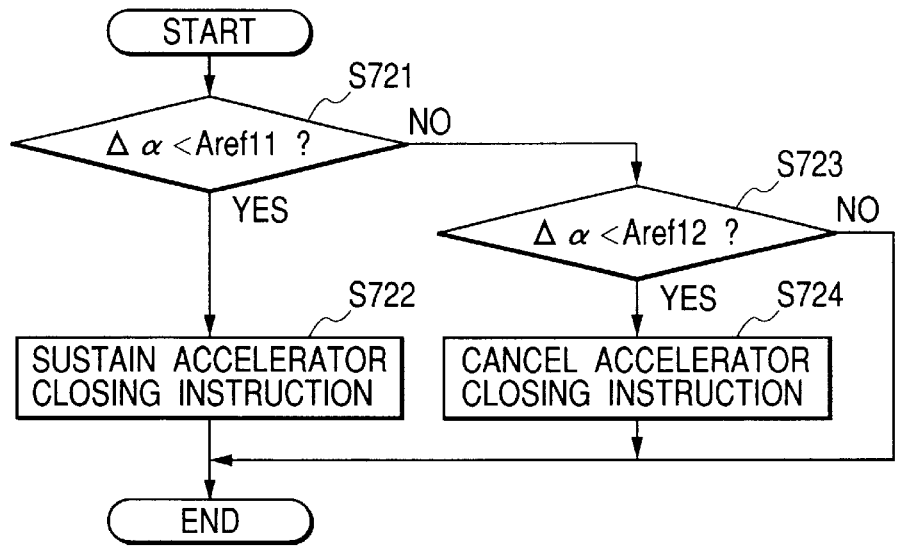
FIG. 13 is a flowchart showing details of an accelerator closing control performed in the acceleration/deceleration control subroutine shown in FIG. 11.

FIG. 13 is a flowchart showing the details of the accelerator closing control of the step S720. More specifically, in step S721, it is checked whether the acceleration deviation Δα is smaller than a first reference value Aref11 or not. When the judgement result is YES in the step S721(i.e., Δα<Aref11), the control flow proceeds to step S722 to sustain an accelerator closing instruction. Then, this subroutine is terminated.

When the judgement result is NO in the step S721(i.e., Δα≧Aref11), the control flow proceeds to step S723 to further check whether the acceleration deviation Δα is larger than a second reference value Aref12 or not. The second reference value Aref12 is larger than the first reference value Aref11 (i.e., Aref12>Aref11). When the judgement result is YES in the step S723 (i.e., Δα >Aref12), the control flow proceeds to step S724 to cancel the accelerator closing instruction. Then, this subroutine is terminated. When the judgement result is NO in the step S723 (i.e., Δα<Aref12), this subroutine is terminated.

Figure 14:
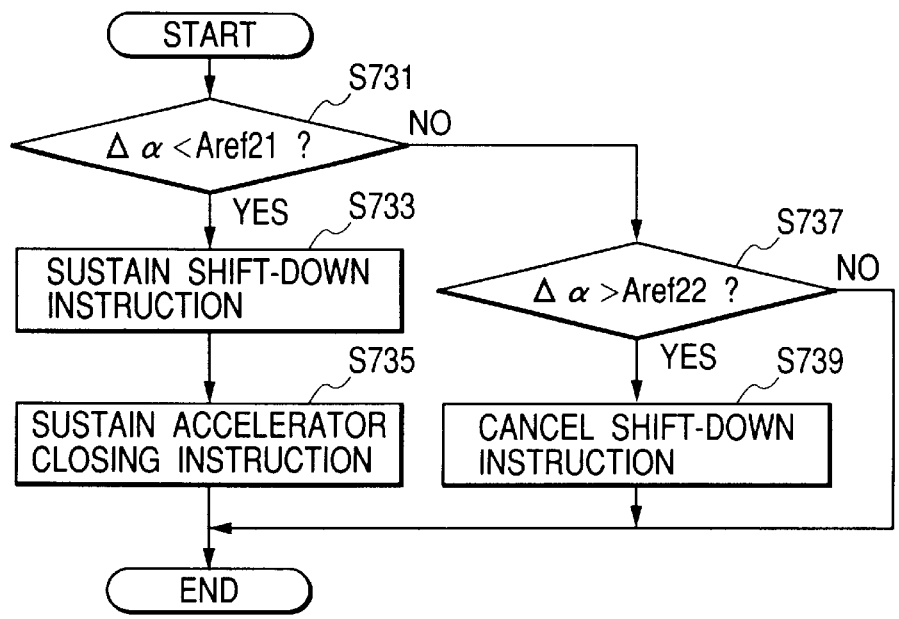
FIG. 14 is a flowchart showing details of a shift-down control performed in the acceleration/deceleration control subroutine shown in FIG. 11.

FIG. 14 is a flowchart showing the details of the shift-down control of the step S730. More specifically, in step S731, it is checked whether the acceleration deviation Δα is smaller than a third reference value Aref21 or not. When the judgement result is YES in the step S731(i.e., Δα<Aref21), the control flow proceeds to step S733 to sustain a shift-down instruction. Then, in the next step S735, the accelerator closing instruction is sustained. Then, this subroutine is terminated.

When the judgement result is NO in the step S731(i.e., Δα>Aref21), the control flow proceeds to step S737 to further check whether the acceleration deviation Δα is larger than a fourth reference value Aref22 or not. The fourth reference value Aref22 is larger than the third reference value Aref21 (i.e., Aref22>Aref21). When the judgement result is YES in the step S737(i.e., Δα>Aref22), the control flow proceeds to step S739 to cancel the shift-down instruction. Then, this subroutine is terminated. When the judgement result is NO in the step S737(i.e., Δα<Aref22), this subroutine is terminated.

Figure 15:
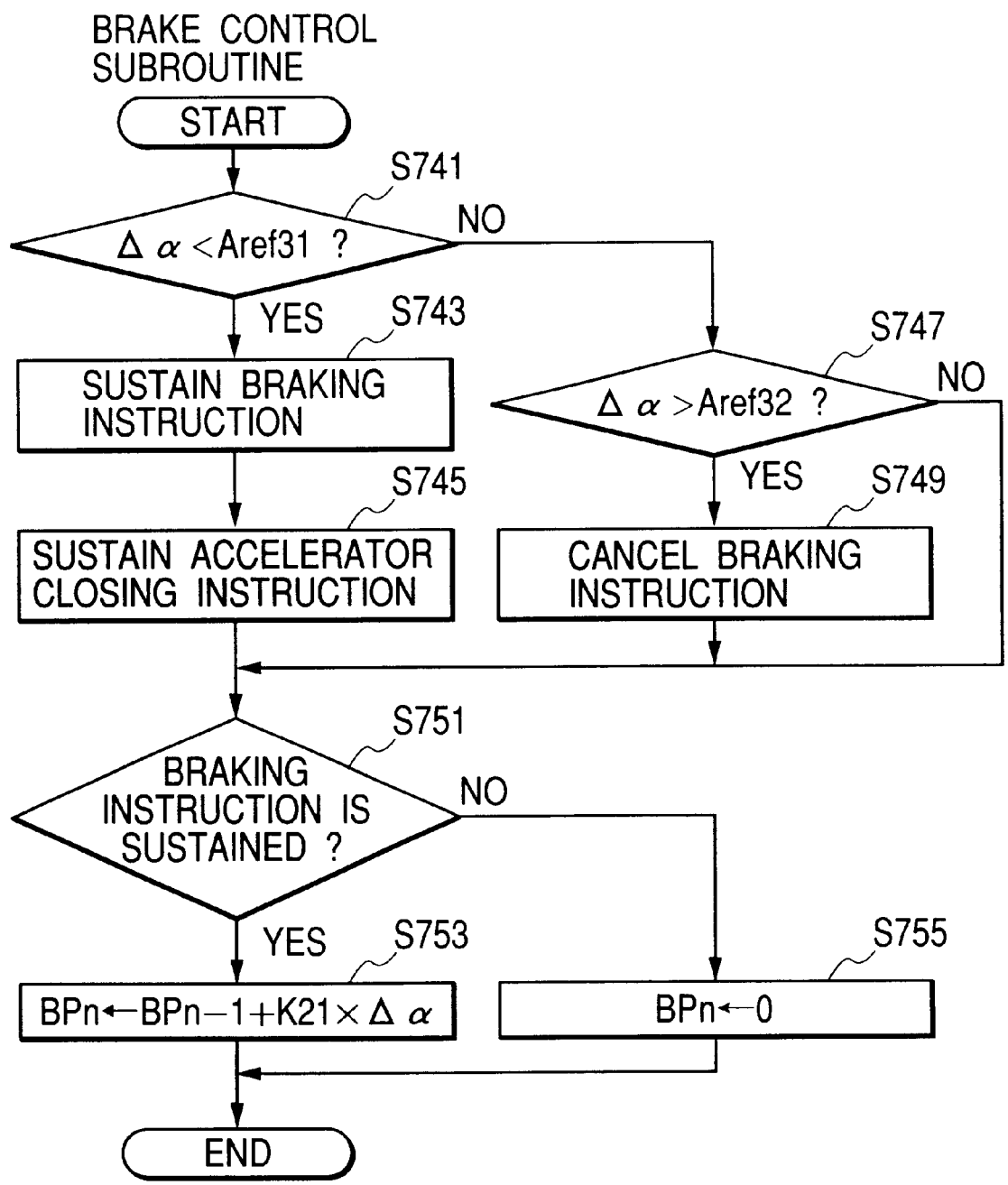
FIG. 15 is a flowchart showing details of a braking control performed in the acceleration/deceleration control subroutine shown in FIG. 11.

FIG. 15 is a flowchart showing the details of the braking control of the step S740. More specifically, in step S741, it is checked whether the acceleration deviation Δα is smaller than a fifth reference value Aref31 or not. When the judgement result is YES in the step S741(i.e., Δα<Aref31), the control flow proceeds to step S743 to sustain a braking instruction. Then, in the next step S745, the accelerator closing instruction is sustained. Then, the control flow proceeds to step S751.

When the judgement result is NO in the step S741(i.e., Δα>Aref31), the control flow proceeds to step S747 to further check whether the acceleration deviation Δα is larger than a sixth reference value Aref32 or not. The sixth reference value Aref32 is larger than the fifth reference value Aref31 (i.e., Aref32>Aref31). When the judgement result is YES in the step S747(i.e., Δα>Aref32), the control flow proceeds to step S749 to cancel the braking instruction. Then, the control flow proceeds to the step S751. When the judgement result is NO in the step S747(i.e., Δα<Aref32), the control flow directly proceeds to the step S751.

In the step S751, it is checked whether the braking instruction is sustained or not. When the judgement result is YES in the step S751, the control flow proceeds to step S753 to obtain a present braking pressure value. The present braking pressure BPn is obtained by multiplying a brake control gain K21 with the acceleration deviation Δα and adding the obtained multiplied value K21×Δα to a previous braking pressure BPn−1.

$$BP_n \leftarrow BP_{n-1} + K21 \times \Delta\alpha$$

When the judgement result is NO in the step S751, the control flow proceeds to step S755 to equalize the present braking pressure to 0, i.e., BPn=0. After finishing the step S753 or S755, this subroutine is completed.

In general, it is essentially important to ensure safety or careful driving during the automatic distance control or any other automatic vehicle behavior control. In view of this, the maximum deceleration obtainable during the automatic braking control is limited within a predetermined allowable value so as not to endanger the passengers by sudden or abrupt braking operation resulting from the excessively large deceleration value.

In other words, the driver can cause more large deceleration by strongly or fully depressing the braking pedal with his or her intent to immediately decelerate the vehicle. The deceleration degree attainable by the driver's depression of the braking pedal (such as emergency braking) is fairly higher than the deceleration degree attainable by the automatic braking control performed in the automatic distance control.

Figure 16:
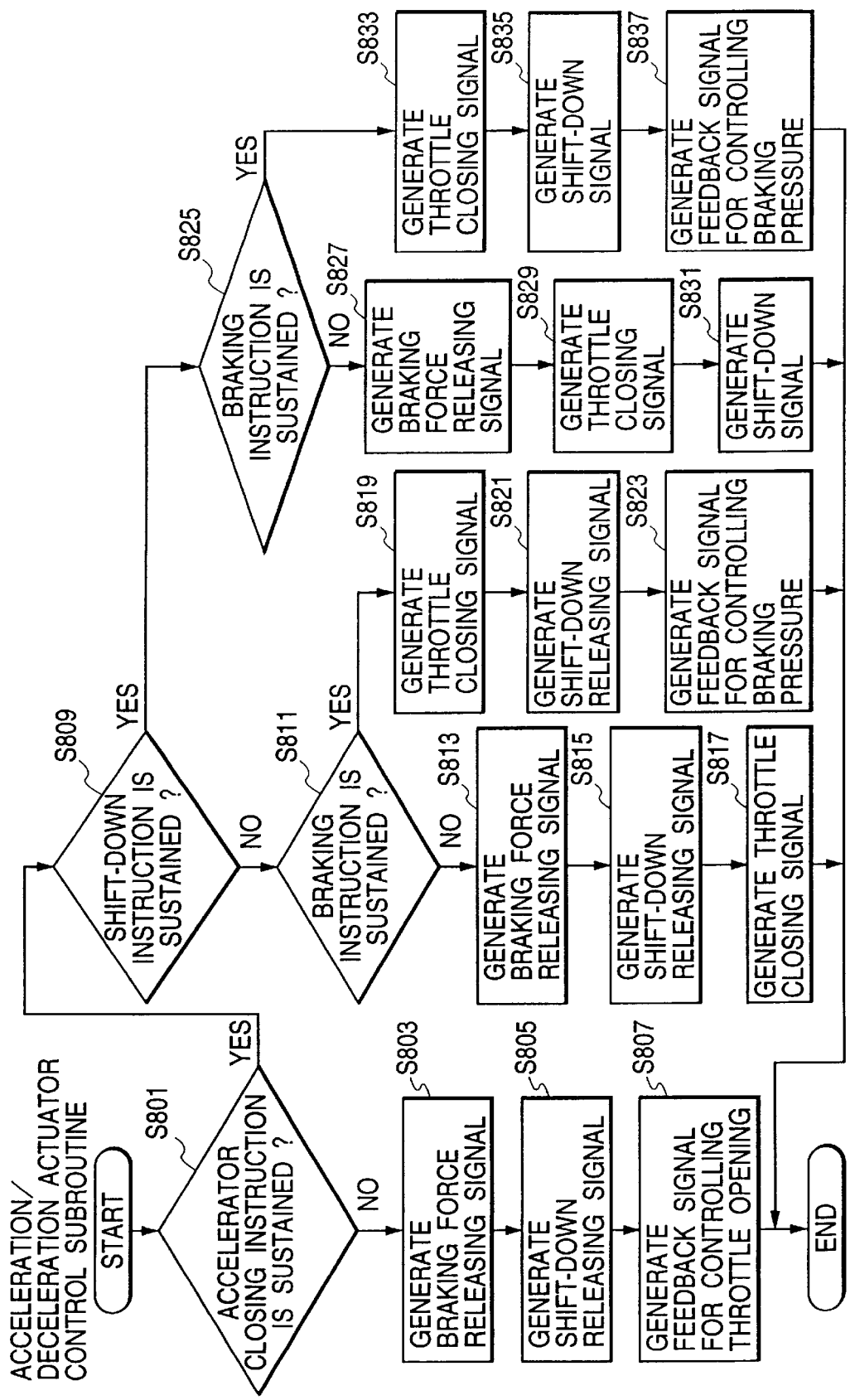
FIG. 16 is a flowchart showing an acceleration/deceleration actuator control subroutine constituting part of the main processing procedure of the automatic distance control shown in FIG. 2.

FIG. 16 is a flowchart showing the details of the step S800 which is the subroutine for actuating the acceleration/deceleration actuator.

In step S801, it is checked whether the accelerator closing instruction is sustained or not. When the accelerator closing instruction is canceled (i.e., NO in the step S801), the control flow proceeds to steps S803, S805 and S807 which are sequentially performed. In the step S803, a braking force releasing signal is generated. In the step S805, a shift-down releasing signal is generated. In the step S807, a feedback signal for controlling a throttle opening is generated. Then, this subroutine is terminated.

Meanwhile, when the accelerator closing instruction is sustained (i.e., YES in the step S801), the control flow proceeds to step S809 to further check whether the shift-down instruction is sustained or not. When the shift-down instruction is canceled (i.e., NO in the step S809), the control flow proceeds to step 811 to further check whether the braking instruction is sustained or not. When the braking instruction is canceled (i.e., NO in the step S811), the control flow proceeds to steps S813, S815 and S817 which are sequentially performed. In the step S813, the braking force releasing signal is generated. In the step S815, the shift-down releasing signal is generated. In the step S817, a throttle closing signal is generated to completely close the throttle valve. Then, this subroutine is terminated.

When the braking instruction is sustained (i.e., YES in the step S811), the control flow proceeds to steps S819, S821 and S823 which are sequentially performed. In the step S819, the throttle closing signal is generated to completely close the throttle valve. In the step S821, the shift-down releasing signal is generated. In the step S823, a feedback signal for controlling the braking pressure is generated. Then, this subroutine is terminated.

Meanwhile, when the shift-down instruction is sustained (i.e., YES in the step S809), the control flow proceeds to step 825 to further check whether the braking instruction is sustained or not. When the braking instruction is canceled (i.e., NO in the step S825), the control flow proceeds to steps S827, S829 and S831 which are sequentially performed. In the step S827, the braking force releasing signal is generated. In the step S829, the throttle closing signal is generated to completely close the throttle valve. In the step S831, the shift-down signal is generated to actuate the transmission actuator to realize a designated shift-down operation. Then, this subroutine is terminated.

When the braking instruction is sustained (i.e., YES in the step S825), the control flow proceeds to steps S833, S835 and S837. In the step S833, the throttle closing signal is generated to completely close the throttle valve. In the step S835, the shift-down signal is generated to actuate the transmission actuator to realize the designated shift-down operation. In the step S837, the feedback signal for controlling the braking pressure is generated. Then, this subroutine is terminated.

Figure 17:
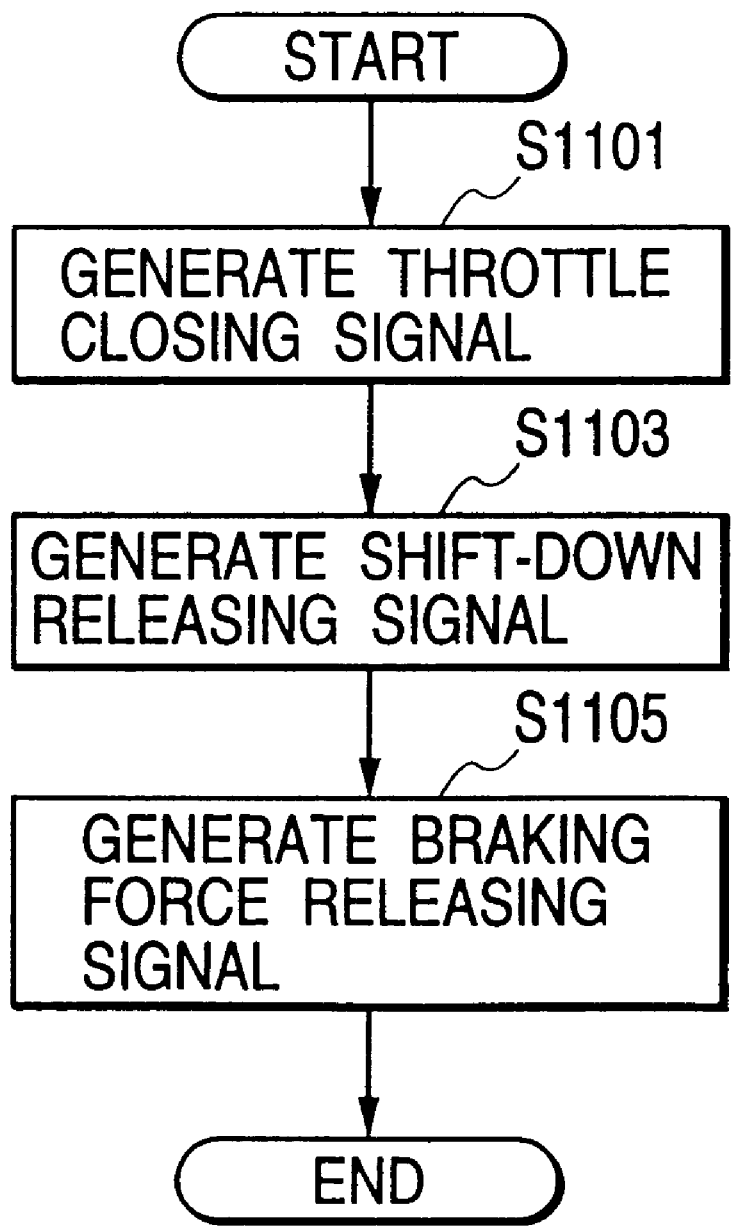
FIG. 17 is a flowchart showing a control-off output subroutine shown in FIG. 2 which is responsive to the deactivation of the acceleration/deceleration actuator.

FIG. 17 is a flowchart showing the details of the step S1100 which is the subroutine for generating the control-off output signals responsive to the deactivation of the acceleration/deceleration actuator. This subroutine shows a processing procedure executed when the acceleration/deceleration actuator receives no instructions for the acceleration and/or deceleration. In step S1101, the throttle closing signal is generated to completely close the throttle valve. Then, in step S1103, the shift-down releasing signal is generated. Subsequently, in step S1105, the braking force releasing signal is generated. Then, this subroutine is terminated.

In the above-described flowcharts, the reference values Aref11, Aref12, Aref21, Aref22, Aref31, Aref32 are thresholds having the following meaning.

| Decelerating Means | Threshold for Instructing Operation | Threshold for Canceling Operation |
| --- | --- | --- |
| Accelerator Closing Control | Aref11 | Aref12 |
| Shift-down Control | Aref21 | Aref22 |
| Braking Control | Aref31 | Aref32 |

The relationship in magnitude between the instructing and canceling thresholds is as follows.

| Accelerator Closing Control | Aref11 < Aref12 |
| --- | --- |
| Shift-down Control | Aref21 < Aref22 |
| Braking Control | Aref31 < Aref32 |

The above-described relationship between the instructing and canceling thresholds used in each control is generally provided for suppressing the chattering phenomenon.

The relationship between respective instructing thresholds is as follow.

$$Aref31 \leq Aref21 \leq Aref11 < 0$$

This relationship is necessary for determining the activation order among a plurality of deceleration devices. According to this relationship, the deceleration device activated first is the throttle valve which causes the smallest deceleration when it is closed in accordance with the throttle closing signal. The deceleration device activated second is the transmission which causes an intermediate or medium deceleration when it is shift downed in response to the shift-down signal. The deceleration device activated last is the braking device which causes the largest deceleration when it is operated in accordance with the braking signal.

The relationship between respective canceling thresholds is as follow.

$$0 < Aref32 \leq Aref22 \leq Aref12$$

This relationship is necessary for determining the cancellation order among the plural deceleration devices. According to this relationship, the deceleration device canceled first is the braking device which causes the largest deceleration. The deceleration device canceled second is the transmission which causes the intermediate or medium deceleration. The deceleration device canceled last is the throttle which causes the smallest deceleration.

Operations and effects of the automatic distance control realized by the first embodiment of the present invention will be explained hereinafter.

Figure 18:
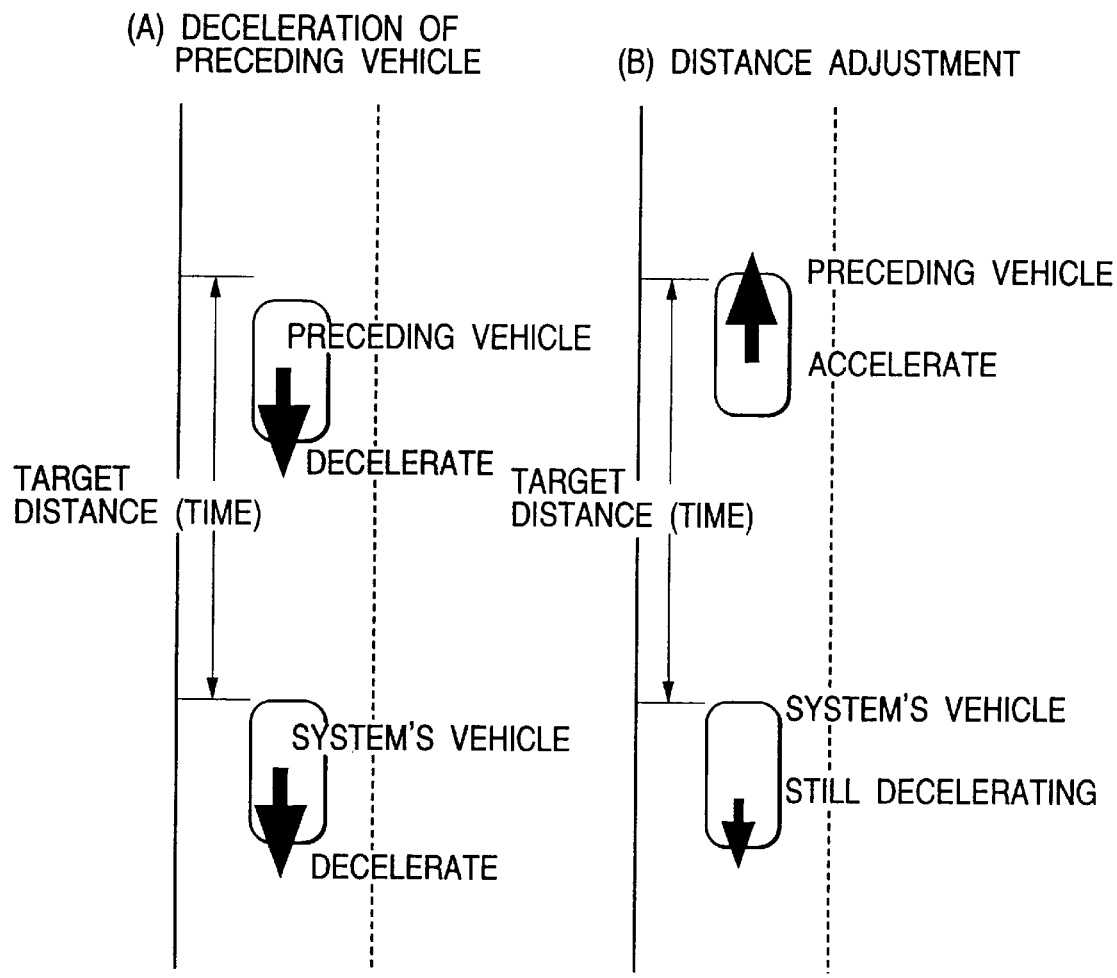
FIG. 18 is a time sequential view showing vehicle behavior in accordance with a conventional automatic distance control.

It is now assumed that the preceding vehicle decelerates first (refer to A of FIG. 18) and then accelerates (refer to B of FIG. 18). In this case, the actual distance between two vehicles becomes shorter than the standard target distance. Hence, when the target distance is fixed to the standard target distance, the system's vehicle decelerates to maintain the standard target distance between two vehicles. Even if the preceding vehicle starts accelerating (refer to B of FIG. 18), the system's vehicle will continue to decelerate unless the actual distance restores to the standard target distance. In other words, the system's vehicle must wait for a while until the actual distance restores to the standard target distance. The system's vehicle is significantly delayed to follow up the preceding vehicle and will be left behind undesirably. This will worsen the drive feeling and force a succeeding vehicle to decelerate unnecessarily.

On the contrary, according to the present invention, the target distance is variable in accordance with the driving conditions. More specifically, in the condition where the preceding vehicle has decelerated (refer to A of FIG. 19), the preceding vehicle may soon start accelerating (refer to B of FIG. 19). In this case, the target distance decreases temporarily from the standard target distance to a provisional target distance upon the preceding vehicle starting accelerating (refer to B of FIG. 19). This enables the system's vehicle to follow up the preceding vehicle promptly.

Figure 20:
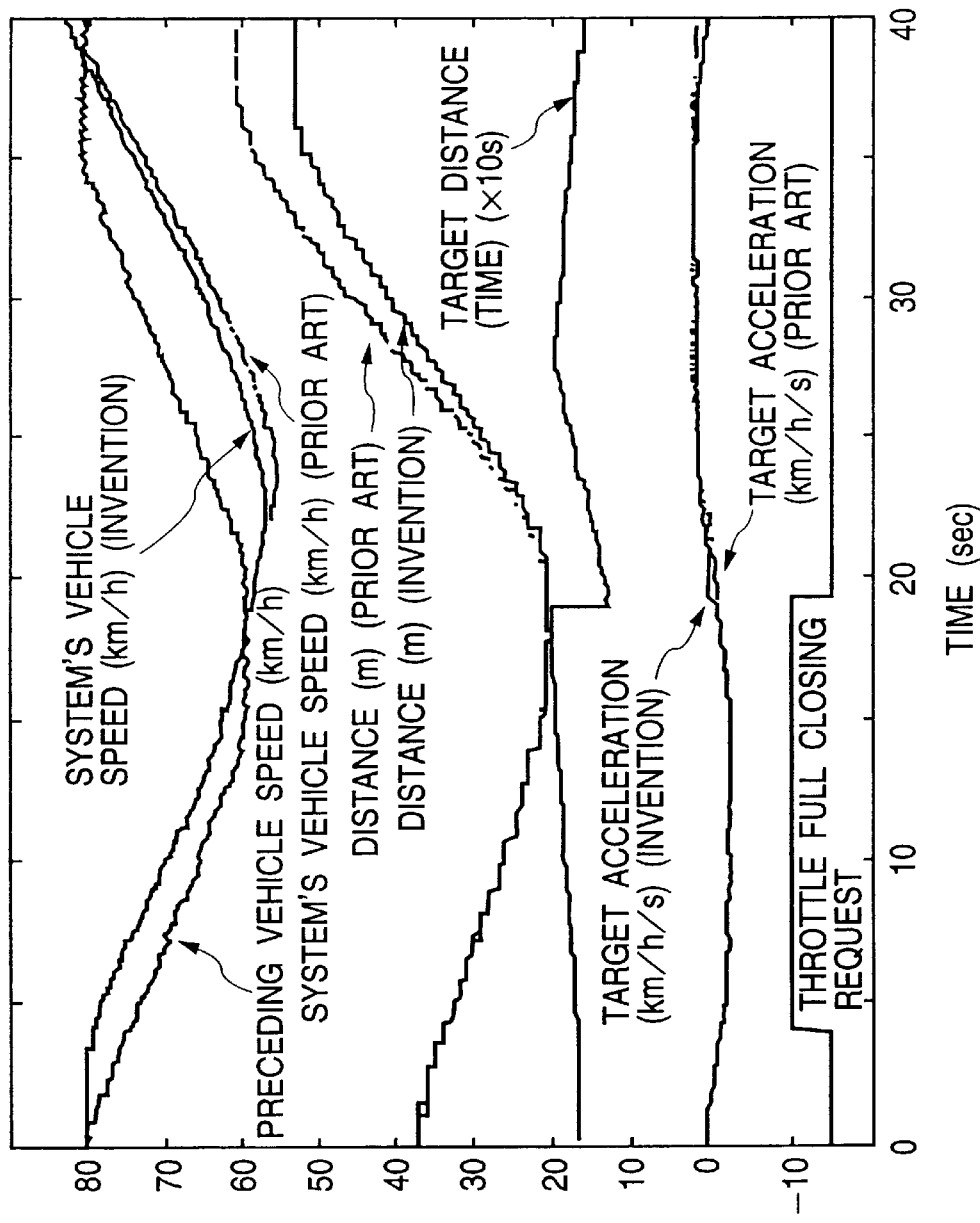
FIG. 20 is a time chart showing the vehicle behavior during the automatic distance control in accordance with the first embodiment of the present invention.

FIG. 20 is a time chart showing the difference between the present invention and the prior art in the vehicle behavior during the automatic distance control. As apparent from FIG. 20, according to the present invention, the target distance suddenly decreases to a smaller value as soon as the preceding vehicle becomes faster than the system's vehicle. Accordingly, the target acceleration is enlarged promptly. This prevents the system's vehicle from decelerating excessively and also prevents the actual distance from increasing undesirably.

The present invention is not limited to the above-described driving condition. For example, similar situation occurs during the lane change of a faster vehicle which cuts in two vehicles traveling on the same traffic lane.

In the above-described automatic distance control, the physical quantity representing the distance between two vehicles is not limited to the disclosed one. Another physical quantity representing the distance directly or indirectly will be employed equally.

Instead of regulating the target distance, it will be possible to regulate the target acceleration to have the similar effects. In this case, the present invention adjusts the degree of the deceleration. The reduction of the target acceleration is temporarily suppressed instead of setting the provisional target distance shorter than the standard target distance. For example, the lower limit of the target acceleration is temporarily set to a provisional level equal to 0 or a predetermined negative value. And then, the lower limit of the target acceleration gradually decreases with passage of time and restores to a standard value. This is also effective to suppress the undesirable deceleration.

Second Embodiment

Next, the second embodiment of the present invention will be explained. The integrated control system of an automotive vehicle, shown in FIG. 1, is also applied to in the second embodiment.

Figure 22:
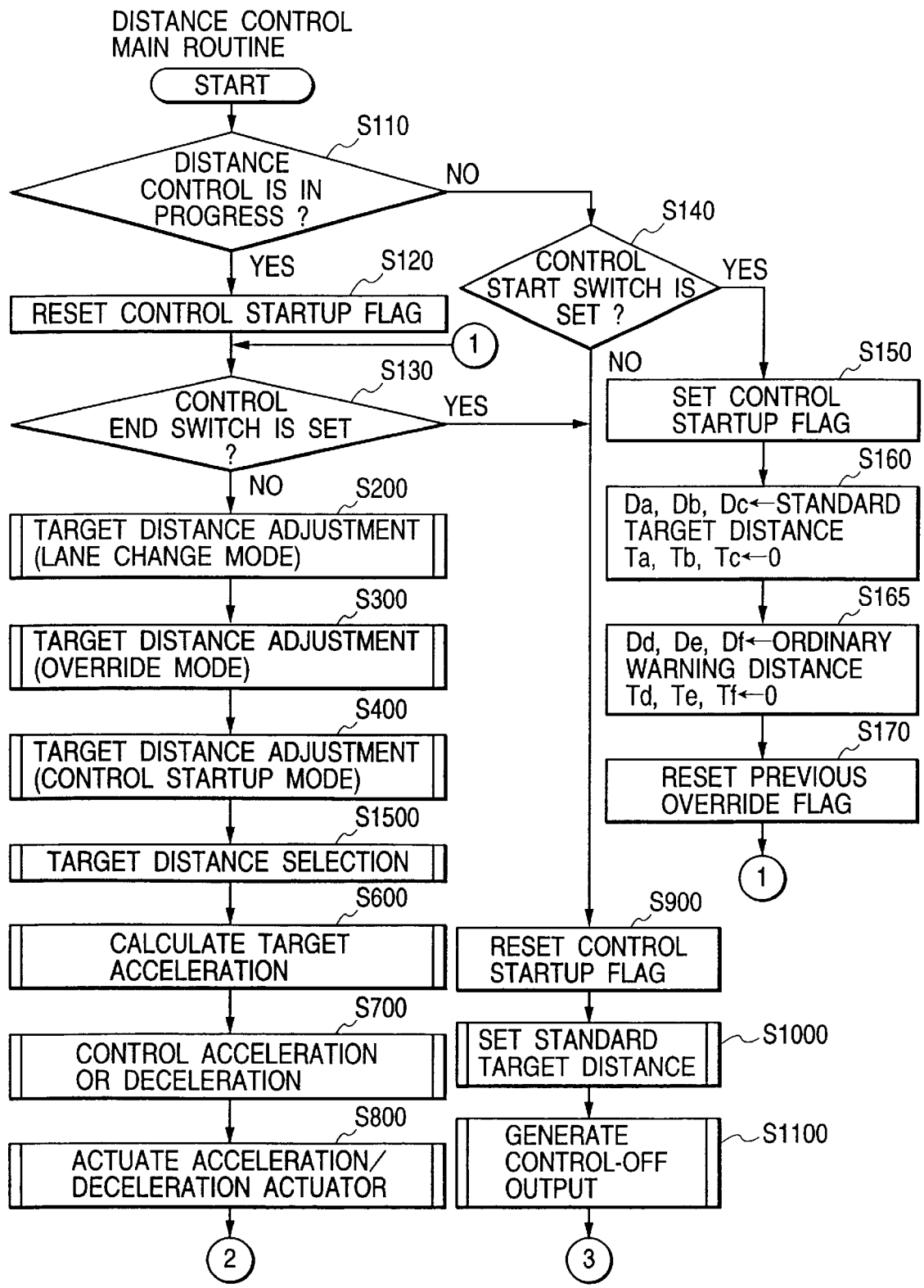
FIG. 22 is a flowchart showing the first half of a main processing procedure of the distance control apparatus in accordance with a second embodiment of the present invention.
Figure 23:
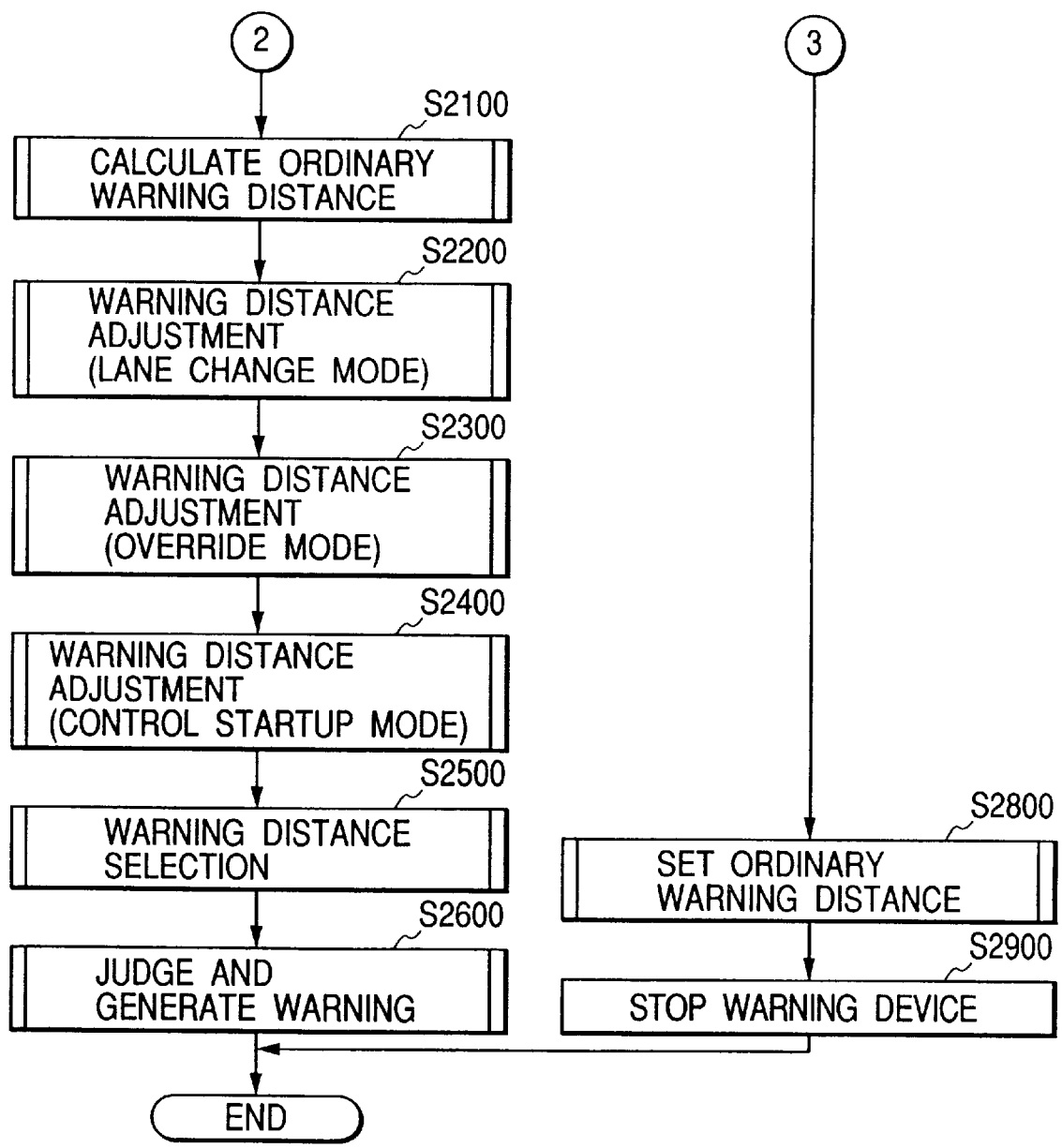
FIG. 23 is a flowchart showing the second half of the main processing procedure of the distance control apparatus in accordance with the second embodiment of the present invention.

FIGS. 22 and 23 cooperatively show a flowchart of a main processing procedure performed in the distance control unit 2 in accordance with the second embodiment of the present invention.

In step S110, it is checked whether the distance control is in progress or not. When the control is not started yet (NO in the step S110), it is checked in the step S140 whether the control start switch is set or not. When the cruise control switch 20 is turned on, the judgement in the step S140 becomes YES. When the judgement is NO in the step S140, the control flow proceeds to step S900 to reset a control startup flag. The control startup flag indicates the beginning of the automatic distance control operation, and is set immediately after the automatic distance control has been started. Then, steps S1000 (i.e., target distance control-off processing), S1100 (i.e.,acceleration/deceleration actuator control-off processing), S2800 (i.e., warning distance control-off processing), and S2900 (deactivation of a warning device) are sequentially performed.

More specifically, in the step S1000, the target distances are set to the standard value in response to deactivation of the automatic distance control apparatus. In the step S1100, control-off output signals responsive to deactivation of the acceleration/deceleration actuator are generated. In the step S2800, the warning distances are set to the ordinary value in response to deactivation of the warning device. In the step S2900, the warning device is deactivated. Then, the main processing procedure is terminated.

When the control start switch is already set (YES in the step S140), the control flow proceeds to step S150 to set the control startup flag, and then proceeds to step S160 to initialize a plurality of target distances Da, Db and Dc and a plurality of restoring timer values Ta, Tb and Tc. Furthermore, in step S165, a plurality of warning distances Dd, De and Df and a plurality of warning restoring timer values Td, Te and Tf are initialized.

More specifically, the target distances Da, Db and Dc are equalized to a predetermined standard target distance which is a fundamental value determined based on user's switching operation or the like. The standard target distance may be variable in accordance with the vehicle speed. The restoring timer values Ta, Tb and Tc are equalized to 0. The warning distances Dd, De and Df are equalized to a predetermined ordinary warning distance. The warning restoring timer values Td, Te and Tf are equalized to 0.

Next, in step S170, a previous override flag is reset. Then, the control flow proceeds to step S130.

Meanwhile, when the distance control is already started (i.e., YES in the step S110), the control startup flag is reset in step S120 and then the control flow proceeds to the step S130.

In the step S130, it is checked whether the control end switch is set or not. When the control end switch is already set (YES in the step S130), the control flow proceeds to step S900 to reset the control startup flag and execute the above-described processing in the steps S900, S1000, S1100, S2800 and S2900. Then, the main processing procedure is terminated.

When the control end switch is not set yet (NO in the step S130), the control flow proceeds to the steps of S200 (a subroutine for adjusting the target distance in a lane change condition), S300 (a subroutine for adjusting the target distance in an override condition), S400 (a subroutine for adjusting the target distance in a control startup condition), S1500 (a subroutine for selecting a preferable target distance), S600 (the subroutine for calculating the target acceleration), S700 (the subroutine for controlling the acceleration and deceleration), and S800 (the subroutine for actuating the acceleration/deceleration actuator) which are sequentially performed in this order.

Then in step S2100, the ordinary warning distance is calculated. Furthermore, the control flow proceeds to the steps of S2200 (a subroutine for adjusting the warning distance in the lane change condition), S2300 (a subroutine for adjusting the warning distance in the override condition), S2400 (a subroutine for adjusting the warning distance in the control startup condition), S2500 (a subroutine for selecting a preferable warning distance), and S2600 (a subroutine for judging and generating a warning or an alarm) which are sequentially performed in this order. Then, the main processing procedure is terminated.

Figure 24:
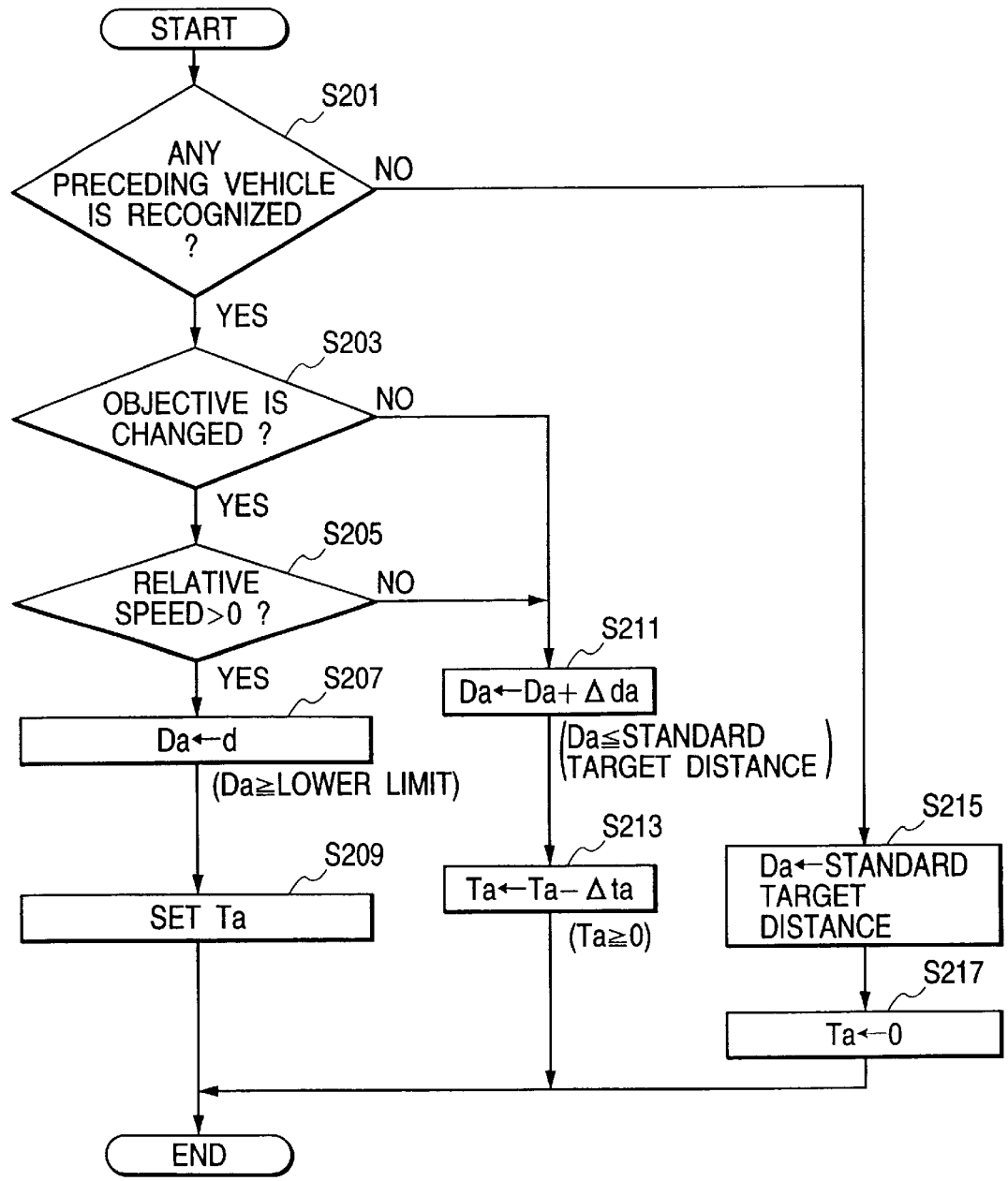
FIG. 24 is a flowchart showing a target distance adjustment subroutine (lane change mode) constituting part of the main processing procedure of the distance control apparatus shown in FIGS. 22 and 23.

FIG. 24 is a flowchart showing the details of the step S200 which is the subroutine for adjusting the target distance in a lane change condition.

In step S201, it is checked whether any preceding vehicle is recognized or not. When no preceding vehicle is recognized (i.e., NO in the step S201), the target distance Da is equalized to the standard target distance in step S215. In this embodiment, the provisional target distance and the standard target distance are expressed in terms of time interval (sec) which is obtained by dividing the distance between two vehicles by the vehicle speed of the system's vehicle. Then, a distance restoring timer Ta is reset (=0) in step S217. Then, this subroutine is completed.

When any preceding vehicle is recognized (i.e., YES in the step S201), the control flow proceeds to step S203 to further check whether an objective is changed to another preceding vehicle or not. When the objective is changed (i.e., YES in the step S203), it is assumed that the system's vehicle has just changed the traffic lane to travel. Thus, in the next step S205, it is further checked whether a relative speed is larger than 0 or not. The relative speed is defined by a traveling speed difference between the preceding vehicle and the system's vehicle. When the relative speed is a positive value, the preceding vehicle is traveling faster than the system's vehicle. In other words, the preceding vehicle is departing from the system's vehicle.

When the judgement result is YES in the step S205, i.e., when the preceding vehicle is traveling faster than the system's vehicle, the control flow proceeds to step S207 to set a provisional target distance Da equal to the present distance "d." In this case, an upper guard is provided so that the provisional target distance Da is prevented from exceeding the standard target distance. And, a lower guard is provided so that the provisional target distance Da is prevented from decreasing below a predetermined lower limit. (i.e., predetermined lower limit≦provisional target distance Da≦standard target distance).

Figure 25A:
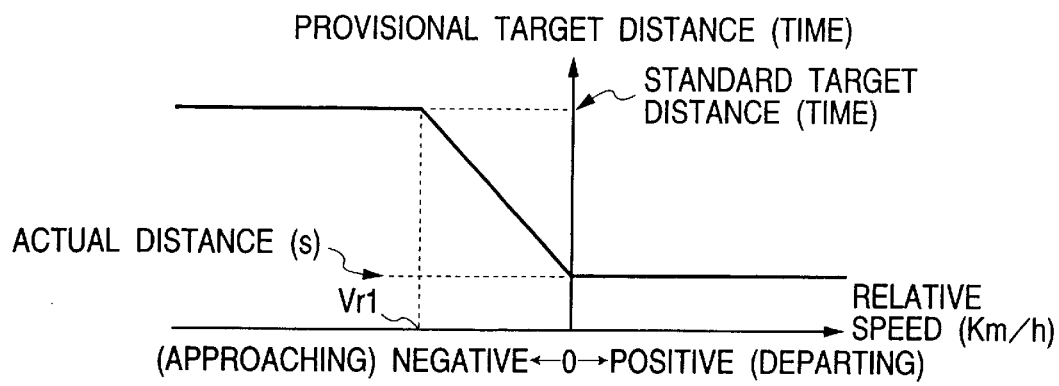
FIGS. 25A to 25C are graphs each showing the functional relationship between the provisional target distance and the relative speed in accordance with the second embodiment of the present invention.
Figure 25B:
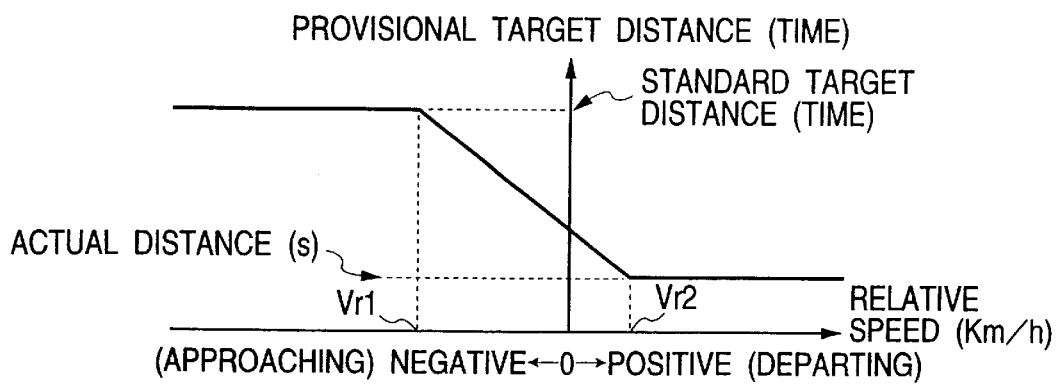
Figure 25C:
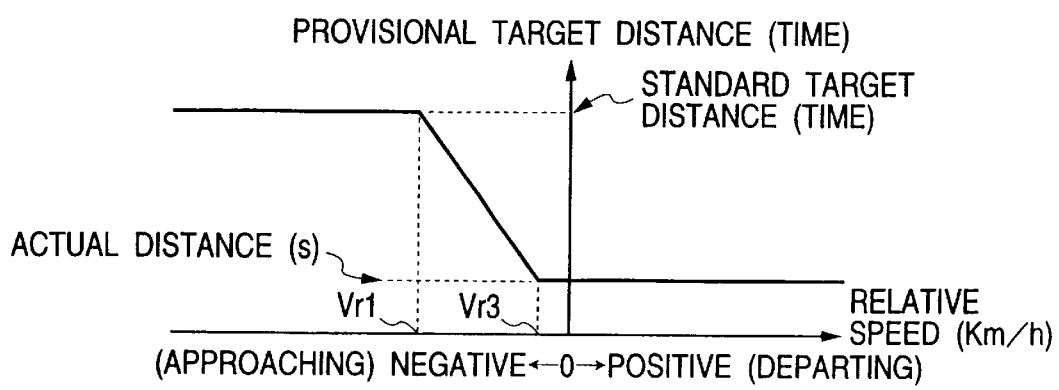

It is however possible to determine the target distance Da as a function of the relative speed shown in FIGS. 25A, 25B or 25C so that the provisional target distance can be adequately determined according to the traveling conditions. In this case, the above-described steps S205 and S207 are modified to refer to the map value shown in FIGS. 25A, 25B or 25C.

FIG. 25A shows one example of the relationship between the provisional target distance Da and the relative speed. According to the functional graph shown in FIG. 25A, the provisional target distance Da is equalized to the standard target distance set in the step S215 when the relative speed is smaller than the threshold Vr1 (negative value). The provisional target distance linearly decreases with increasing relative speed when the relative speed is in a range between the threshold Vr1 and 0. And, the provisional target distance is equalized to an actual distance when the relative speed is larger than 0.

FIG. 25B shows another example of the relationship between the provisional target distance and the relative speed. According to the functional graph shown in FIG. 25B, the provisional target distance Da is equalized to the standard target distance set in the step S215 when the relative speed is smaller than the threshold Vr1. The provisional target distance linearly decreases with increasing relative speed when the relative speed is in a range between the threshold Vr1 and a threshold Vr2 (positive value). And, the provisional target distance is equalized to the actual distance when the relative speed is larger than the threshold Vr2. In other words, in the automatic distance control, the system's vehicle should decelerate gradually when the relative speed is a positive small value so as to match with the drive feeling during the lane change operation. In general, the driver wants to ensure driving safety immediately after having completed the lane change operation. Hence, it is preferable to set the provisional target distance which makes the system's vehicle decelerate gradually during the lane change operation in the automatic distance control when the system's vehicle is departing from the preceding vehicle with a small relative speed.

FIG. 25C shows another example of the relationship between the provisional target distance and the relative speed. According to the functional graph shown in FIG. 25C, the provisional target distance Da is equalized to the standard target distance set in the step S215 when the relative speed is smaller than the threshold Vr1. The provisional target distance linearly decreases with increasing relative speed when the relative speed is in a range between the threshold Vr1 and a threshold Vr3 (negative value, i.e., Vr1<Vr3<0). And, the provisional target distance is equalized to the actual distance when the relative speed is larger than the threshold Vr3.

In any cases, the provisional target distance Da is expressed in terms of time interval (sec) which is obtained by dividing the distance between two vehicles by the vehicle speed of the system's vehicle.

After finishing the step S207, the control flow proceeds to step S209 to set the distance restoring timer Ta. Then, this subroutine is completed.

When the judgement result is NO in the step S203 or S205, the control flow proceeds to step S211 to adjust the provisional target distance Da. More specifically, the target distance Da is renewed by adding an incremental amount Δda to the previous target distance Da. In this case, the upper guard is provided so that the provisional target distance is prevented from exceeding the standard target distance (i.e., provisional target distance Da≦standard target distance).

Next, in step S213, the distance restoring timer value Ta is renewed by adding a decremental amount −Δta to the previous timer value Ta. In this case, a lower guard is provided so that the distance restoring timer value Ta is prevented from decreasing below 0 (i.e., Ta≧0). Then, this subroutine is completed.

FIG. 26 is a flowchart showing the details of the step S300 which is the subroutine for adjusting the target distance in the override condition.

In step S301, it is checked whether any preceding vehicle is recognized or not. When no preceding vehicle is recognized (i.e., NO in the step S301), a previous override flag is reset in step S323. Then, in step S325, the target distance Db is equalized to the standard target distance in step S325. Then, a distance restoring timer Tb is reset (=0) in step S327. Then, this subroutine is completed.

When any preceding vehicle is recognized (i.e., YES in the step S301), it is then checked in step S303 whether the override operation is in progress or not. When the judgement result is YES in the step S303, the control flow proceeds to step S317 to set the previous override flag and then proceeds to step S319 to set a provisional target distance Db equal to the present distance "d." In this case, an upper guard is provided so that the provisional target distance Db is prevented from exceeding the standard target distance set in the step S325. It is however possible to determine the provisional target distance Db according to the functional graph shown in FIGS. 25A, 25B or 25C.

After finishing the step S319, the control flow proceeds to step S321 to set the distance restoring timer Tb. Then, this subroutine is completed.

When the judgement result is NO in the step S303, it is further checked in step 305 whether the previous override flag is set or not. When the override flag is set (i.e., YES in the step S305), it is assumed that the override operation has just completed. Thus, the control flow proceeds to step S307 to reset the previous override flag, and then proceeds to step S309 to set a provisional target distance Db equal to the present distance "d." In this case, an upper guard is provided so that the provisional target distance Db is prevented from exceeding the standard target distance set in the step S325. And, a lower guard is provided so that the provisional target distance Db is prevented from decreasing below a predetermined lower limit (i.e., predetermined lower limit≦provisional target distance Db≦standard target distance).

In the step S309, it is however possible to determine the provisional target distance Db according to the functional graph shown in FIG. 25A, 25B or 25C.

For example, when the functional graph shown in FIG. 25C is used, the provisional target distance Db is equalized to the standard target distance set in the step S325 when the relative speed is smaller than the threshold Vr1. The provisional target distance Db linearly decreases with increasing relative speed when the relative speed is in a range between the threshold Vr1 and the threshold Vr3 (Vr1<Vr3<0). And, the provisional target distance is equalized to the actual distance when the relative speed is larger than the threshold Vr3. According to this functional graph, the provisional target distance Db is equalized to the actual distance even when the system's vehicle slightly approaches to the preceding vehicle. In other words, in the automatic distance control, the deceleration degree is effectively suppressed so as to match with the drive feeling during the override operation. In general, the driver performs the override operation with intent to approach the preceding vehicle. Hence, it is preferable to suppress the deceleration of the vehicle during the override operation in the automatic distance control when the system's vehicle is approaching to the preceding vehicle with a small relative speed.

After finishing the step S309, the control flow proceeds to step S311 to set the distance restoring timer Tb. Then, this subroutine is completed.

When the override flag is not set (i.e., NO in the step S305), it is assumed that a significant time has passed after finishing the override operation. Thus, the control flow proceeds to step S313 to adjust the provisional target distance Db. More specifically, the target distance Db is renewed by adding an incremental amount Δdb to the previous target distance Db. In this case, the upper guard is provided in the same manner as in the step S309 (i.e., provisional target distance Db≦standard target distance).

Next, in step S315, the distance restoring timer value Tb is renewed by adding a decremental amount −Δtb to the previous timer value Tb. In this case, a lower guard is provided so that the distance restoring timer value Tb is prevented from decreasing below 0 (i.e., Tb≧0). Then, this subroutine is completed.

Figure 27:
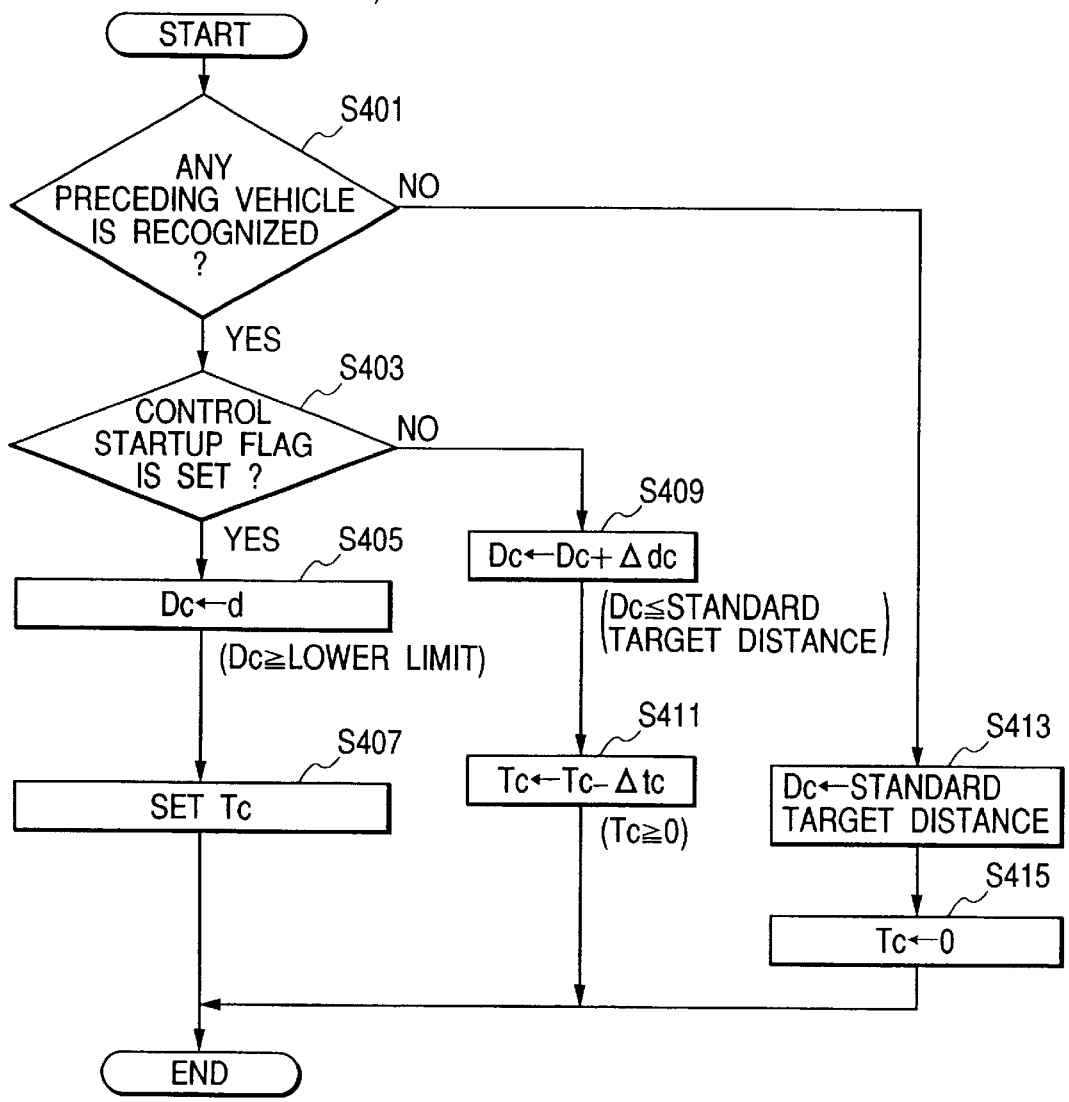
FIG. 27 is a flowchart showing a target distance adjustment subroutine (control startup mode) constituting part of the main processing procedure of the distance control apparatus shown in FIGS. 22 and 23.

FIG. 27 is a flowchart showing the details of the step S400 which is the subroutine for adjusting the target distance in the control startup condition.

In step S401, it is checked whether any preceding vehicle is recognized or not. When no preceding vehicle is recognized (i.e., NO in the step S401), the target distance Dc is equalized to the standard target distance in step S413. Then, a distance restoring timer Tc is reset (=0) in step S415. Then, this subroutine is completed.

When any preceding vehicle is recognized (i.e., YES in the step S401), the control flow proceeds to step S403 to further check whether the control startup flag is set or not. When the control startup flag is set (i.e., YES in the step S403), it is assumed that the automatic distance control operation has just begun. Thus, the control flow proceeds to the next step S405 to set a provisional target distance Dc equal to the present distance "d." In this case, an upper guard is provided so that the provisional target distance Dc is prevented from exceeding the standard target distance set in the step S413. And, a lower guard is provided so that the provisional target distance Dc is prevented from decreasing below a predetermined lower limit (i.e., predetermined lower limit≦provisional target distance Dc≦standard target distance).

In the step S405, it is however possible to determine the provisional target distance Dc according to the functional graph shown in FIGS. 25A, 25B or 25C.

For example, when the functional graph shown in FIG. 25C is used, the provisional target distance Dc is equalized to the standard target distance set in the step S413 when the relative speed is smaller than the threshold Vr1. The provisional target distance Dc linearly decreases with increasing relative speed when the relative speed is in a range between the threshold Vr1 and the threshold Vr3 (Vr1<Vr3<0). And, the provisional target distance is equalized to the actual distance when the relative speed is larger than the threshold Vr3. According to this functional graph, the provisional target distance Dc is equalized to the actual distance even when the system's vehicle slightly approaches to the preceding vehicle. In other words, in the automatic distance control, the deceleration degree is effectively suppressed so as to match with the drive feeling during the control startup condition. In general, the driver starts the automatic distance control with intent to approach the preceding vehicle. Hence, it is preferable to suppress the deceleration of the vehicle during the control startup condition in the automatic distance control when the system's vehicle is approaching to the preceding vehicle with a small relative speed.

After finishing the step S405, the control flow proceeds to step S407 to set the distance restoring timer Tc. Then, this subroutine is completed.

When the judgement result is NO in the step S403, i.e., when the control startup flag is not set, the control flow proceeds to step S409 to adjust the provisional target distance Dc. More specifically, the target distance Dc is renewed by adding an incremental amount Δdc to the previous target distance Dc. In this case, the upper guard is provided in the same manner as in the step S405 (i.e., provisional target distance Dc≦standard target distance).

Next, in step S411, the distance restoring timer value Tc is renewed by adding a decremental amount −Δtc to the previous timer value Tc. In this case, a lower guard is provided so that the distance restoring timer value Tc is prevented from decreasing below 0 (i.e., Tc≧0). Then, this subroutine is completed.

Figure 28:
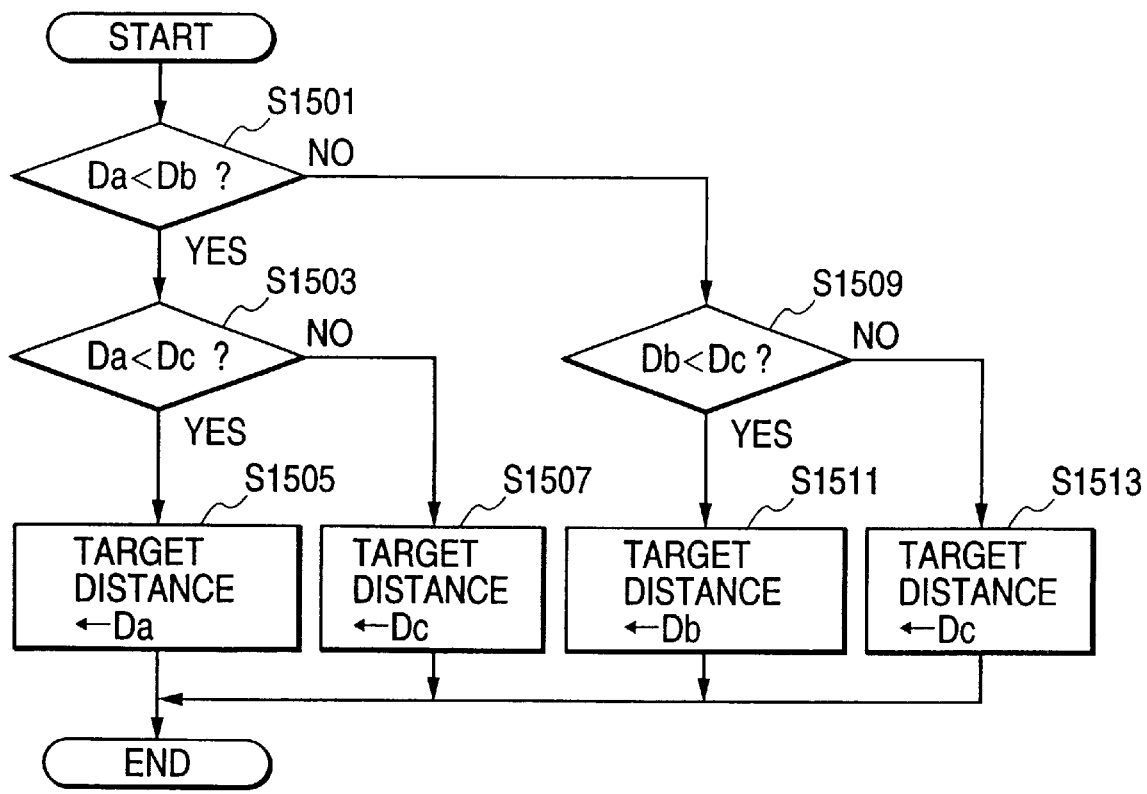
FIG. 28 is a flowchart showing a target distance selection subroutine constituting part of the main processing procedure of the distance control apparatus shown in FIGS. 22 and 23.

FIG. 28 is a flowchart showing the details of the step S1500 which is the subroutine for selecting a desirable target distance. This processing is performed to select the shortest one among a plurality of target distances Da, Db and Dc having been set in the steps S200, S300 and S400, respectively.

In step S1501, it is checked whether the target distance Da is shorter than the target distance Db or not. When the judgement result is YES in the step S1501, it is further checked whether the target distance Da is shorter than the target distance Dc or not. When the judgement result is YES in the step S1503, it is concluded that the target distance Da is shortest. Thus, in step S1505, the target distance Da is selected or designated as valid target distance. When the judgement result is NO in the step S1503, it is concluded that the target distance Dc is shortest. Thus, in step S1507, the target distance Dc is selected as the valid target distance.

When the judgement result is NO in the step S1501, it is further checked in step S1509 whether the target distance Db is shorter than the target distance Dc or not. When the judgement result is YES in the step S1509, it is concluded that the target distance Db is shortest. Thus, in step S1511, the target distance Db is selected as the valid target distance. When the judgement result is NO in the step S1509, it is concluded that the target distance Dc is shortest. Thus, in step S1513, the target distance Dc is selected as the valid target distance.

After finishing the step S1505, S1507, S1511 or S1513, this subroutine is completed.

Returning to the main processing procedure shown in FIGS. 22 and 23, the details of the sequential steps S600 (the subroutine for calculating the target acceleration), S700 (the subroutine for controlling the acceleration and deceleration), S800 (the subroutine for actuating the acceleration/deceleration actuator), and S100 (the subroutine for performing the acceleration/deceleration actuator control-off processing) are completely identical with those disclosed in FIGS. 10A, 10B, and 11 to 17 explained in the first embodiment.

Figure 29:
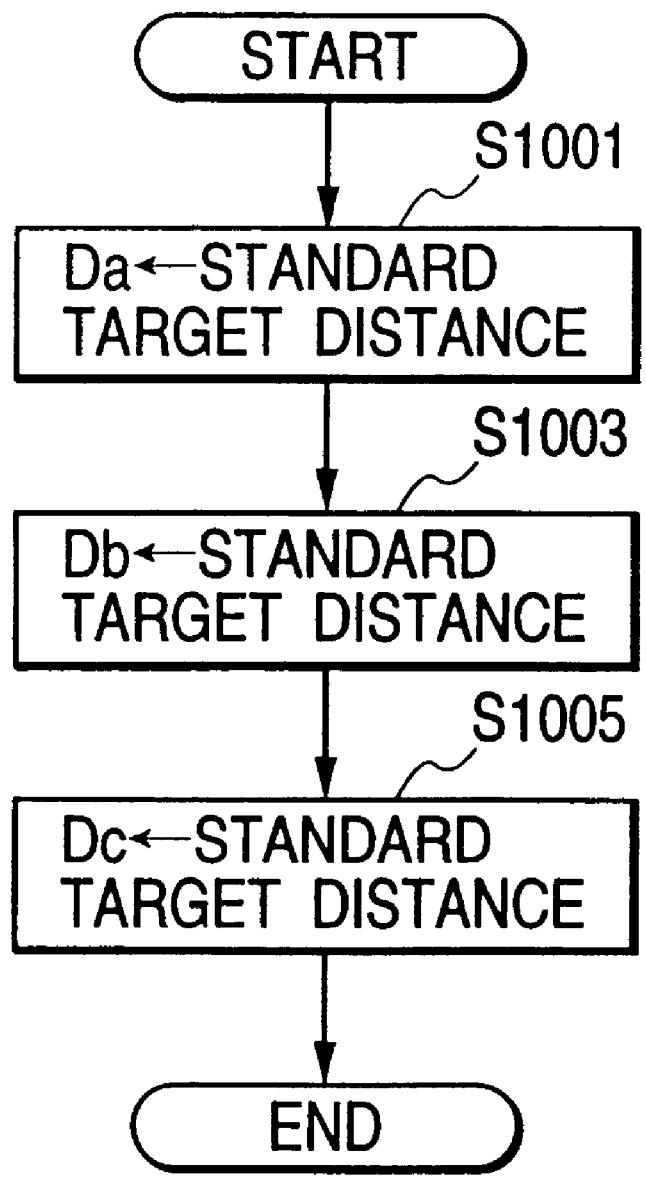
FIG. 29 is a flowchart showing a standard target distance setting subroutine constituting part of the main processing procedure of the distance control apparatus shown in FIGS. 22 and 23.

FIG. 29 is a flowchart showing the details of the step S1000 which is the subroutine for setting the standard target distance. This processing is performed when the automatic distance control is ceased.

In step S1001, the target distance Da is equalized to the standard target distance. In step S1003, the target distance Db is equalized to the standard target distance. In step S1005, the target distance Dc is equalized to the standard target distance. Then, this subroutine is completed.

Figure 30:
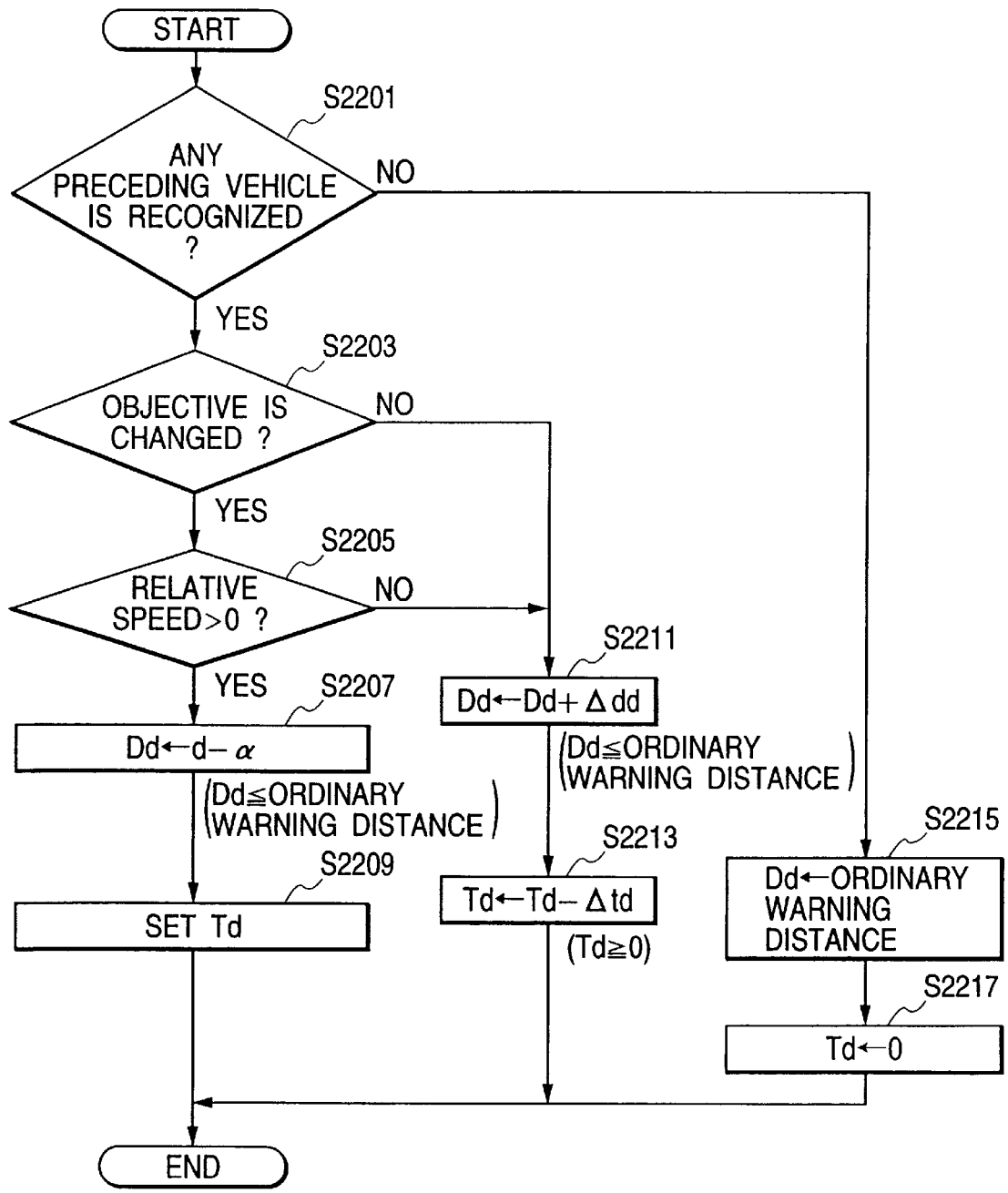
FIG. 30 is a flowchart showing a warning distance adjustment subroutine (lane change mode) constituting part of the main processing procedure of the distance control apparatus shown in FIGS. 22 and 23.

FIG. 30 is a flowchart showing the details of the step S2200 which is the subroutine for adjusting the warning distance in the lane change condition.

In step S2201, it is checked whether any preceding vehicle is recognized or not. When no preceding vehicle is recognized (i.e., NO in the step S2201), the warning distance Dd is equalized to an ordinary warning distance in step S2215. Then, a distance restoring timer Td is reset (=0) in step S2217. Then, this subroutine is completed.

When any preceding vehicle is recognized (i.e., YES in the step S2201), the control flow proceeds to step S2203 to further check whether an objective is changed to another preceding vehicle or not. When the objective is changed (i.e., YES in the step S2203), it is assumed that the system's vehicle has just changed the traffic lane to travel. Thus, in the next step S2205, it is further checked whether the relative speed is larger than 0 or not. When the relative speed is a positive value, the preceding vehicle is traveling faster than the system's vehicle.

When the judgement result is YES in the step S2205, i.e., when the preceding vehicle is departing from the system's vehicle, the control flow proceeds to step S2207 to set a provisional warning distance Dd (=d−α) which is shorter than the present distance "d" by a predetermined value α. In this case, an upper guard is provided so that the provisional warning distance Dd is prevented from exceeding the ordinary warning distance set in the step S2215. After finishing the step S2207, the control flow proceeds to step S2209 to set the distance restoring timer Td. Then, this subroutine is completed.

When the judgement result is NO in the step S2203 or S2205, the control flow proceeds to step S2211 to adjust the provisional warning distance Dd. More specifically, the warning distance Dd is renewed by adding an incremental amount Δdd to the previous warning distance Dd. In this case, the upper guard is provided in the same manner as in the step S2207 (provisional warning distance Dd≦ordinary warning distance).

Next, in step S2213, the distance restoring timer value Td is renewed by adding a decremental amount −Δtd to the previous timer value Td. In this case, a lower guard is provided so that the distance restoring timer value Td is prevented from decreasing below 0 (i.e., Td≧0). Then, this subroutine is completed.

Figure 31:
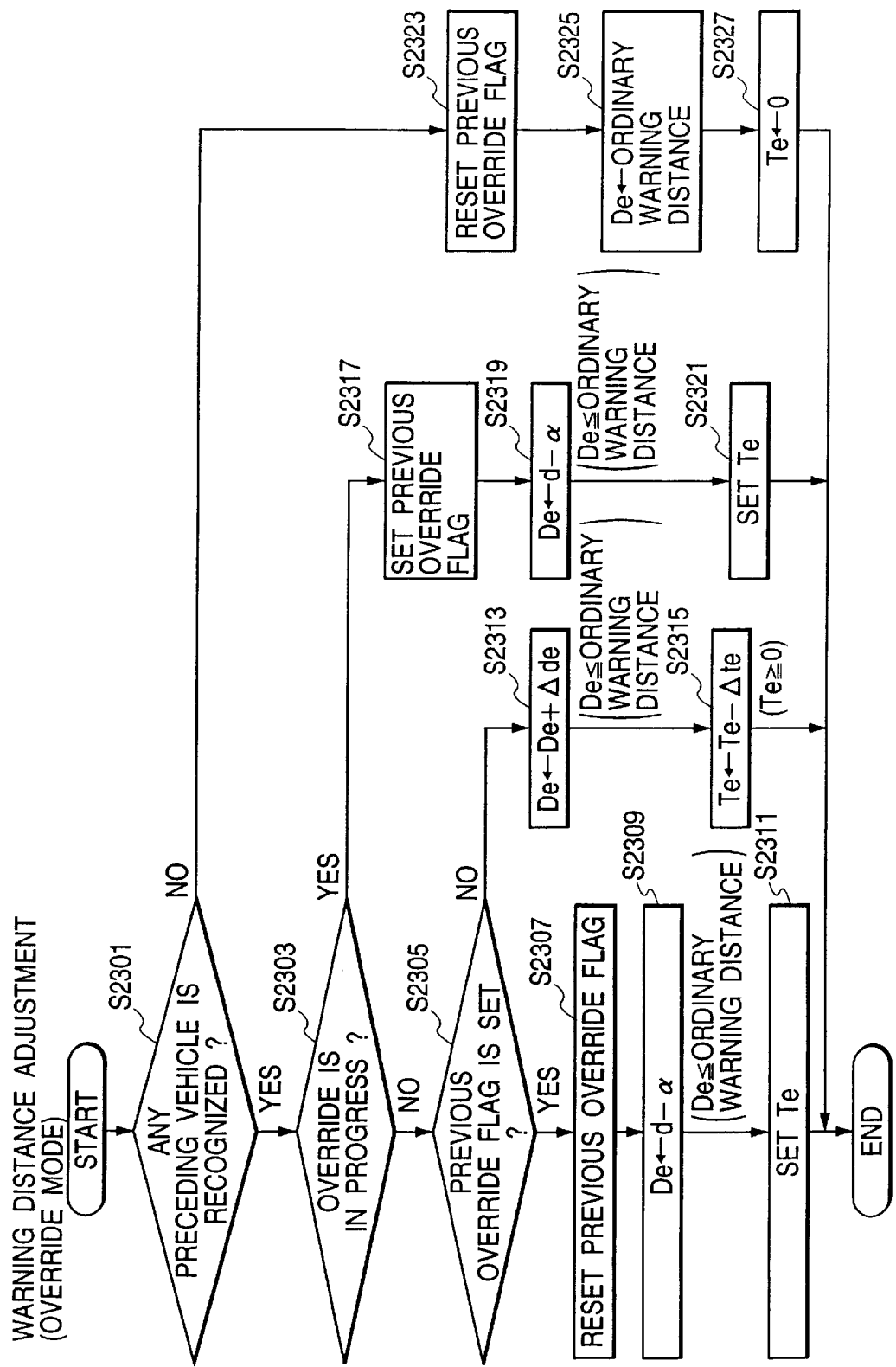
FIG. 31 is a flowchart showing a warning distance adjustment subroutine (override mode) constituting part of the main processing procedure of the distance control apparatus shown in FIGS. 22 and 23.

FIG. 31 is a flowchart showing the details of the step S2300 which is the subroutine for adjusting the warning distance in the override condition.

In step S2301, it is checked whether any preceding vehicle is recognized or not. When no preceding vehicle is recognized (i.e., NO in the step S2301), a previous override flag is reset in step S2323. Then, in step S2325, the warning distance De is equalized to the ordinary warning distance in step S2325. Then, a distance restoring timer Te is reset (=0) in step S2327. Then, this subroutine is completed.

When any preceding vehicle is recognized (i.e., YES in the step S2301), it is then checked in step S2303 whether the override operation is in progress or not. When the judgement result is YES in the step S2303, the control flow proceeds to step S2317 to set the previous override flag and then proceeds to step S2319 to set a provisional warning distance De (=d−α) which is shorter than the present distance "d" by the predetermined value α. In this case, an upper guard is provided so that the provisional warning distance De is prevented from exceeding the ordinary warning distance set in the step S2325. After finishing the step S2319, the control flow proceeds to step S2321 to set the distance restoring timer Te. Then, this subroutine is completed.

When the judgement result is NO in the step S2303, it is further checked in step 2305 whether the previous override flag is set or not. When the override flag is set (i.e., YES in the step S2305), it is assumed that the override operation has just completed. Thus, the control flow proceeds to step S2307 to reset the previous override flag, and then proceeds to step S2309 to set a provisional warning distance De (=d−α) which is shorter than the present distance "d" by the predetermined value α. In this case, an upper guard is provided so that the provisional warning distance De is prevented from exceeding the ordinary warning distance set in the step S2325. After finishing the step S2309, the control flow proceeds to step S2311 to set the distance restoring timer Te. Then, this subroutine is completed.

When the override flag is not set (i.e., NO in the step S2305), it is assumed that a significant time has passed after finishing the override operation. Thus, the control flow proceeds to step S2313 to adjust the provisional warning distance De. More specifically, the warning distance De is renewed by adding an incremental amount Δde to the previous warning distance De. In this case, the upper guard is provided in the same manner as in the step S2309 (provisional warning distance De≦ordinary warning distance).

Next, in step S2315, the distance restoring timer value Te is renewed by adding a decremental amount −Δte to the previous timer value Te. In this case, a lower guard is provided so that the distance restoring timer value Te is prevented from decreasing below 0 (i.e., Te≧0). Then, this subroutine is completed.

Figure 32:
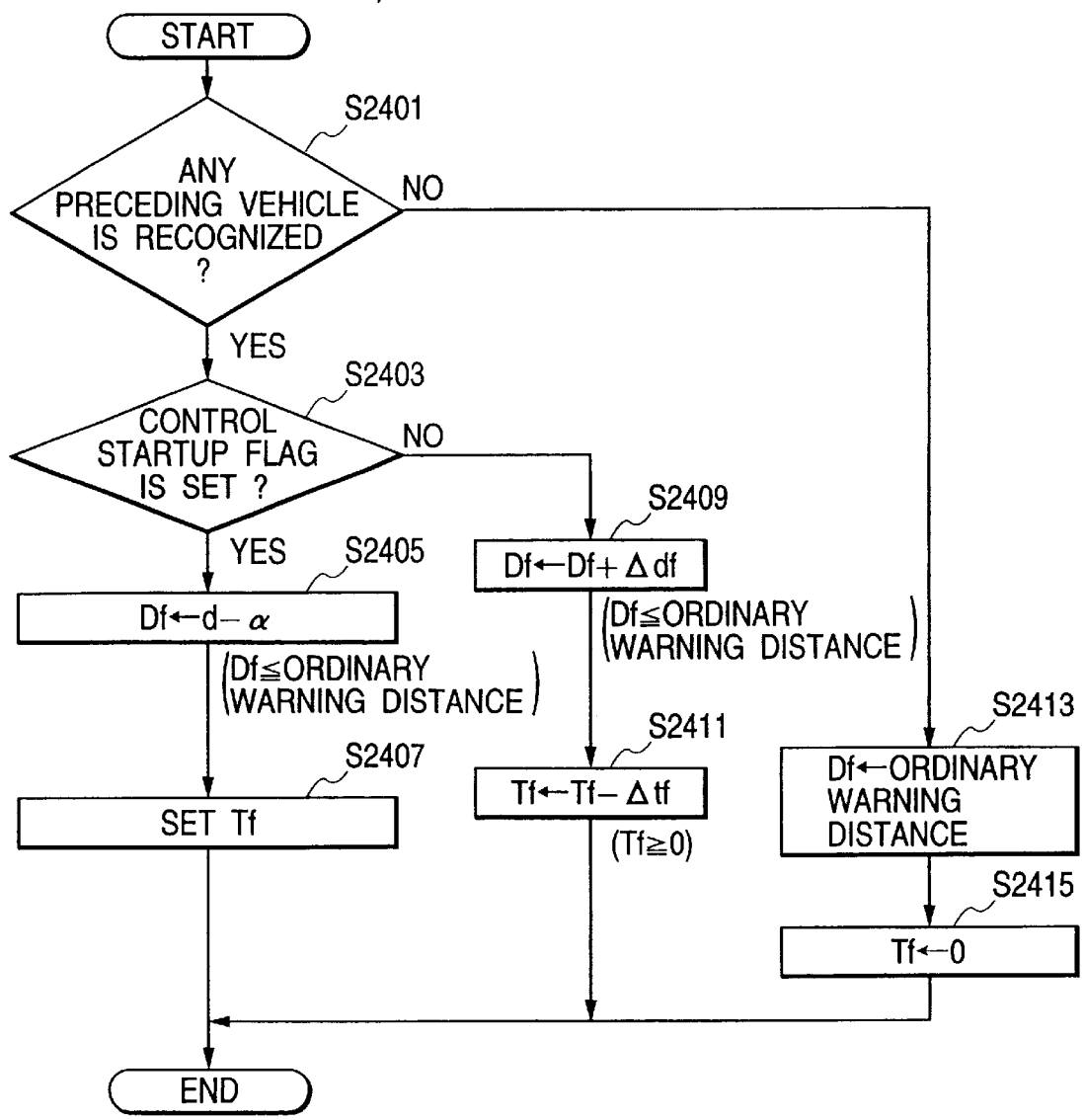
FIG. 32 is a flowchart showing a warning distance adjustment subroutine (control startup mode) constituting part of the main processing procedure of the distance control apparatus shown in FIGS. 22 and 23.

FIG. 32 is a flowchart showing the details of the step S2400 which is the subroutine for adjusting the warning distance in the control startup condition.

In step S2401, it is checked whether any preceding vehicle is recognized or not. When no preceding vehicle is recognized (i.e., NO in the step S2401), the warning distance Df is equalized to the ordinary warning distance in step S2413. Then, a distance restoring timer Tf is reset (=0) in step S2415. Then, this subroutine is completed.

When any preceding vehicle is recognized (i.e., YES in the step S2401), the control flow proceeds to step S2403 to further check whether the control startup flag is set or not. When the control startup flag is set (i.e., YES in the step S2403), it is assumed that the automatic distance control operation has just begun. Thus, the control flow proceeds to the next step S2405 to set a provisional warning distance Df (=d−α) which is shorter than the present distance "d" by the predetermined value α. In this case, an upper guard is provided so that the provisional warning distance Df is prevented from exceeding the ordinary warning distance set in the step S2413. After finishing the step S2405, the control flow proceeds to step S2407 to set the distance restoring timer Tf. Then, this subroutine is completed.

When the judgement result is NO in the step S2403, i.e., when the control startup flag is not set, the control flow proceeds to step S2409 to adjust the provisional warning distance Df. More specifically, the warning distance Df is renewed by adding an incremental amount Δdf to the previous warning distance Df. In this case, the upper guard is provided in the same manner as in the step S2405 (provisional warning distance Df≦ordinary warning distance).

Next, in step S2411, the distance restoring timer value Tf is renewed by adding a decremental amount −Δtf to the previous timer value Tf. In this case, a lower guard is provided so that the distance restoring timer value Tf is prevented from decreasing below 0 (i.e., Tf≧0). Then, this subroutine is completed.

Figure 33:
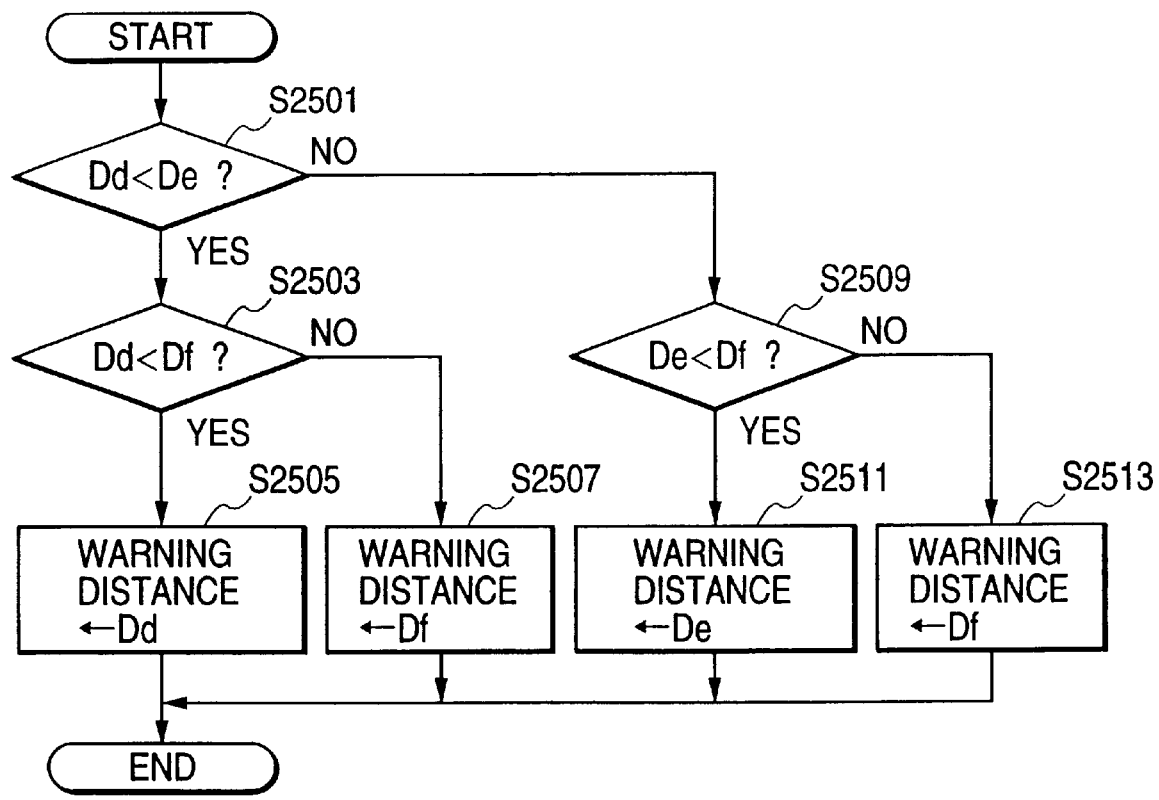
FIG. 33 is a flowchart showing a warning distance selection subroutine constituting part of the main processing procedure of the distance control apparatus shown in FIGS. 22 and 23.

FIG. 33 is a flowchart showing the details of the step S2500 which is the subroutine for selecting a desirable warning distance. This processing is performed to select the shortest one among a plurality of warning distances Dd, De and Df having been set in the steps S2200, S2300 and S2400, respectively.

In step S2501, it is checked whether the warning distance Dd is shorter than the warning distance De or not. When the judgement result is YES in the step S2501, it is further checked whether the warning distance Dd is shorter than the warning distance Df or not. When the judgement result is YES in the step S2503, it is concluded that the warning distance Dd is shortest. Thus, in step S2505, the warning distance Dd is selected or designated as valid warning distance. When the judgement result is NO in the step S2503, it is concluded that the warning distance Df is shortest. Thus, in step S2507, the warning distance Df is selected as the valid warning distance.

When the judgement result is NO in the step S2501, it is further checked in step S2509 whether the warning distance De is shorter than the warning distance Df or not. When the judgement result is YES in the step S2509, it is concluded that the warning distance De is shortest. Thus, in step S2511, the warning distance De is selected as the valid warning distance. When the judgement result is NO in the step S2509, it is concluded that the warning distance Df is shortest. Thus, in step S2513, the warning distance Df is selected as the valid warning distance.

After finishing the step S2505, S2507, S2511 or S2513, this subroutine is completed.

Figure 34:
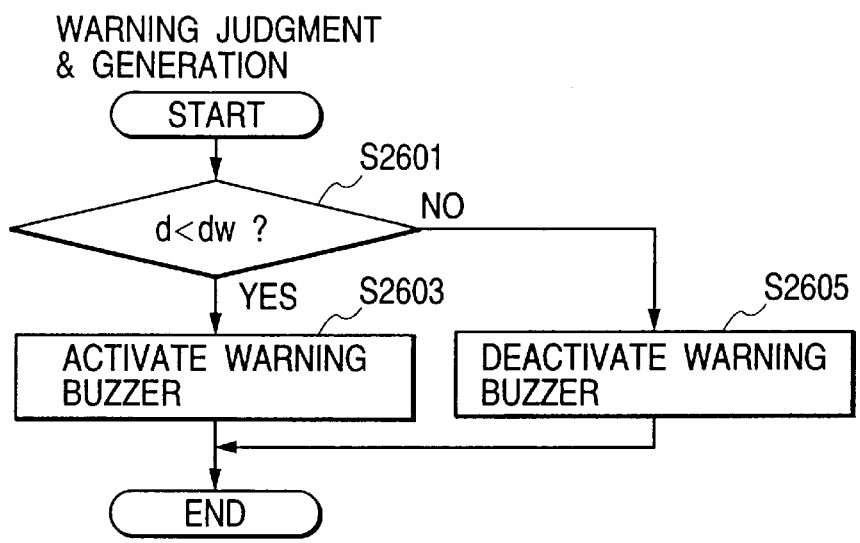
FIG. 34 is a flowchart showing a warning judgement and generation subroutine constituting part of the main processing procedure of the distance control apparatus shown in FIGS. 22 and 23.

FIG. 34 is a flowchart showing the details of the step S2600 which is the subroutine for judging and generating a warning or an alarm.

In step S2601, it is checked whether the present distance "d" is shorter than a valid warning distance "dw" selected in the step S2500. When the judgement result is YES in the step S2601 (i.e., d<dw), the control flow proceeds to step S2603 to activate the warning buzzer 14 to generate or issue a warning or an alarm. On the other hand, when the judgement result is NO in the step S2601 (i.e., d≧dw), the control flow proceeds to step S2605 to deactivate the warning buzzer 14 to stop the warning or alarm.

In this case, the valid warning distance dw used in step S2601 may be shorter than the ordinary warning distance in specific driving (e.g., lane change, override, and control startup) conditions. Otherwise, the valid warning distance dw is equal to the ordinary warning distance.

Figure 35:
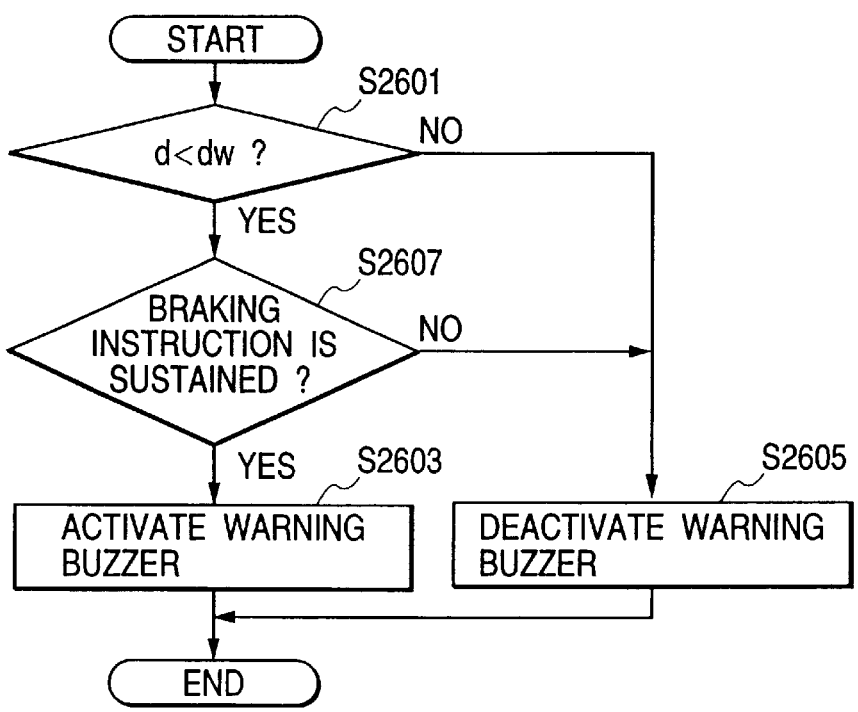
FIG. 35 is a flowchart showing another warning judgement and generation subroutine constituting part of the main processing procedure of the distance control apparatus shown in FIGS. 22 and 23.

FIG. 35 is another flowchart showing the details of the step S2600 which is the subroutine for judging and generating a warning or an alarm.

In step S2601, it is checked whether the present distance "d" is shorter than the valid warning distance "dw" selected in the step S2500. When the judgement result is YES in the step S2601 (i.e., d<dw), the control flow proceeds to step S2607 to further check whether the braking instruction is sustained or not. When the braking instruction is sustained (i.e., YES in step S2607), the control flow proceeds to step S2603 to activate the warning buzzer 14 to generate or issue a warning or an alarm. On the other hand, when the judgement result is NO in the step S2601 (i.e., d≧dw) or NO in the step 2607 (i.e., the braking instruction is not sustained), the control flow proceeds to step S2605 to deactivate the warning buzzer 14 to stop the warning or alarm.

Figure 36:
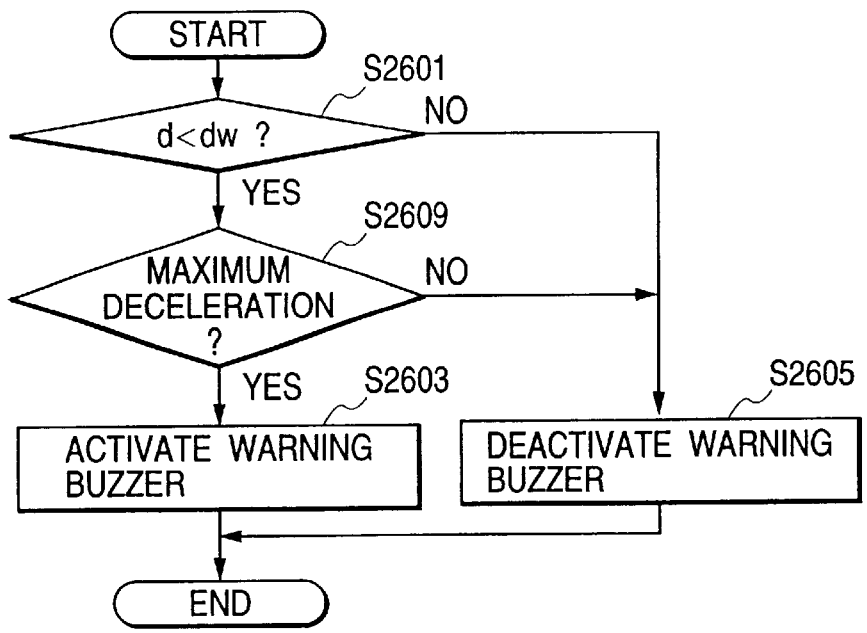
FIG. 36 is a flowchart showing another warning judgement and generation subroutine constituting part of the main processing procedure of the distance control apparatus shown in FIGS. 22 and 23.

FIG. 36 is another flowchart showing the details of the step S2600 which is the subroutine for judging and generating a warning or an alarm.

In step S2601, it is checked whether the present distance "d" is shorter than the valid warning distance "dw" selected in the step S2500. When the judgement result is YES in the step S2601 (i.e., d<dw), the control flow proceeds to step S2609 to further check whether the target acceleration is equal to an available maximum deceleration. When the available maximum deceleration is already attained (i.e., YES in step S2609), the control flow proceeds to step S2603 to activate the warning buzzer 14 to generate or issue a warning or an alarm. On the other hand, when the judgement result is NO in the step S2601 (i.e., d≧dw) or NO in the step 2609 (i.e., the available maximum deceleration is not attained), the control flow proceeds to step S2605 to deactivate the warning buzzer 14 to stop the warning or alarm.

In each of the flowcharts shown in FIGS. 35 and 36, the warning device is activated only when the largest decelerating device is operated so as to eliminate unnecessary warning operation.

Figure 37:
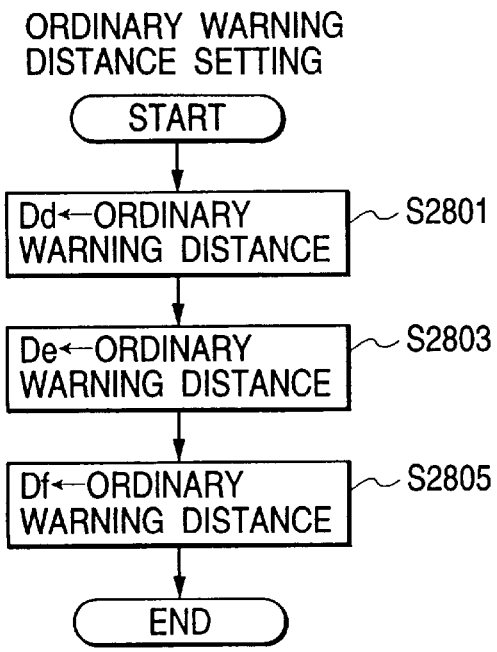
FIG. 37 is a flowchart showing an ordinary warning distance setting subroutine constituting part of the main processing procedure of the distance control apparatus shown in FIGS. 22 and 23.

FIG. 37 is a flowchart showing the details of the step S2800 which is the subroutine for setting the ordinary warning distance. This processing is performed when the warning distance control is ceased.

In step S2801, the warning distance Dd is equalized to the ordinary warning distance. In step S2803, the warning distance De is equalized to the ordinary warning distance. In step S2805, the warning distance Df is equalized to the ordinary warning distance. Then, this subroutine is completed.

Operations and effects of the automatic distance control realized by the second embodiment of the present invention will be explained hereinafter.

Lane Change Mode

It is now assumed that the system's vehicle changes the traveling lane to a faster traffic lane and follows up a new preceding vehicle which is faster than the system's vehicle. The system's vehicle may transfer to a passing or overtaking lane from a normal or slower traffic lane on a highway.

Figure 38:
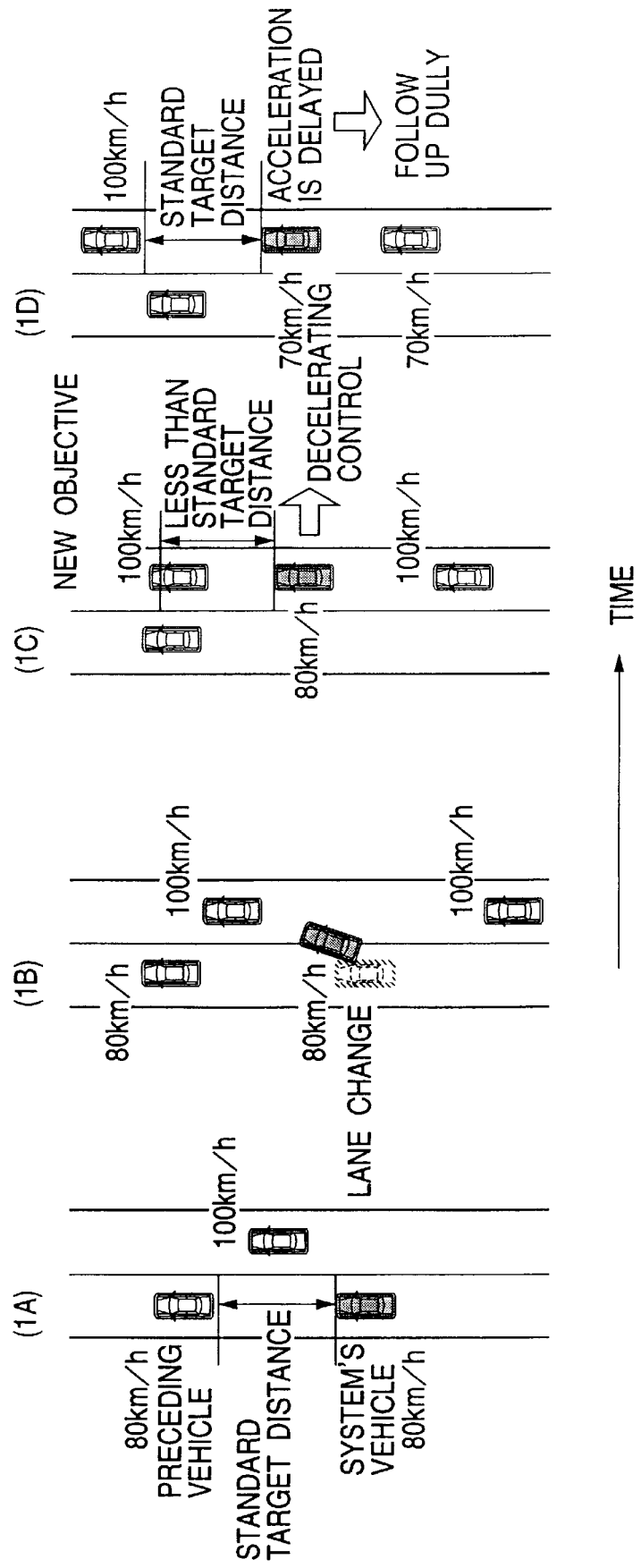
FIG. 38 is a time sequential view showing the vehicle behavior (lane change mode) in accordance with a conventional automatic distance control.
Figure 39:
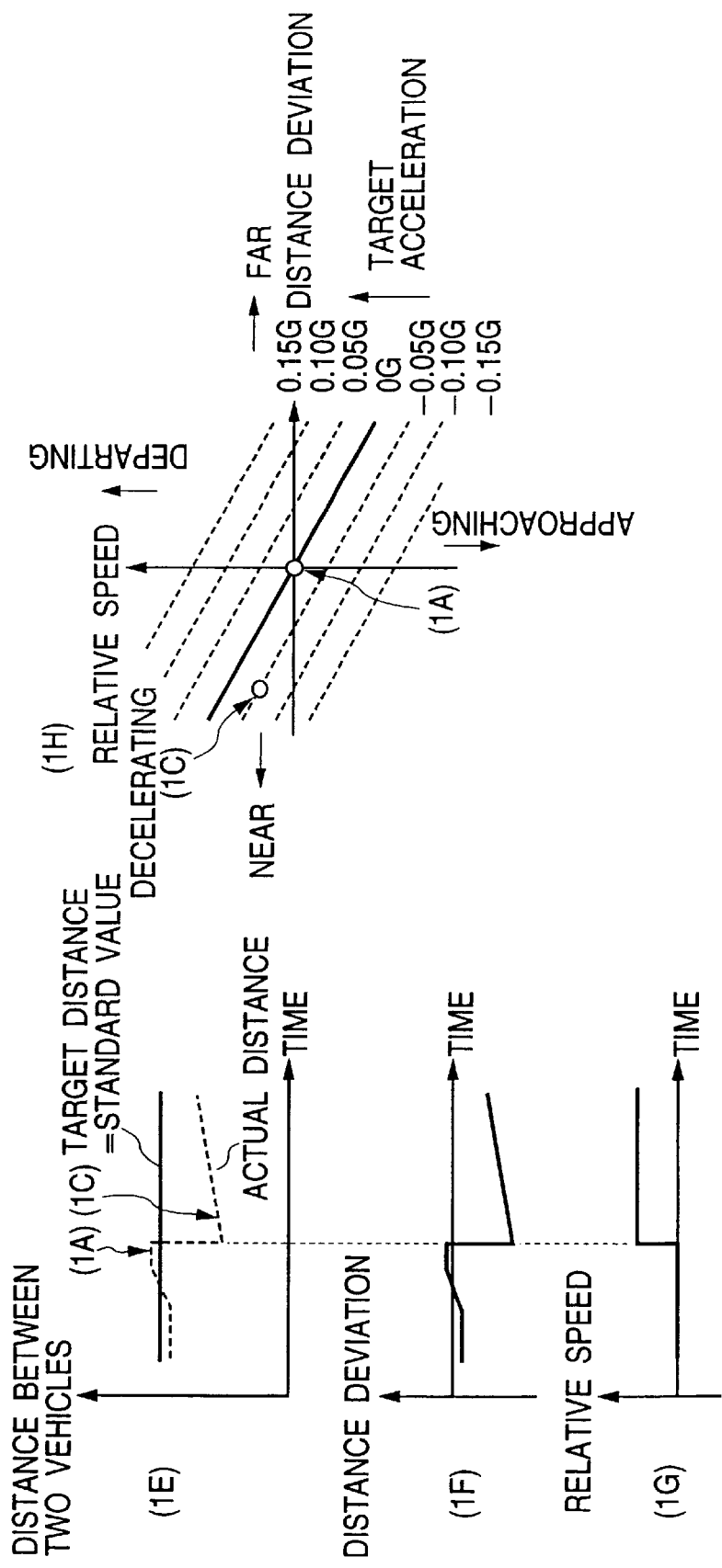
FIG. 39 is time charts and a graph showing the vehicle behavior (lane change mode) in accordance with the conventional automatic distance control.

FIGS. 38 and 39 show vehicle behavior in accordance with a conventional automatic control logic in the lane change mode. The system's vehicle cruises at a constant speed of 80 km/h while keeping a standard target distance with respect to a preceding vehicle (refer to 1A). Then, the system's vehicle starts transferring to a passing or overtaking lane (refer to 1B) on which other vehicles travel at a faster speed of 100 km/h. At the moment that the system's vehicle has completed the lane change, a distance from the system's vehicle to a preceding vehicle may be shorter than the standard target distance (refer to 1C).

In such a case, according to the conventional distance control logic, the system's vehicle first decelerates to increase the distance with respect to the preceding vehicle. For example, the system's vehicle travels at 70 km/h. After a sufficient distance equivalent to the standard target distance is maintained, the system's vehicle starts accelerating to follow up the preceding vehicle (refer to 1D).

According to the conventional distance control logic, the target distance is fixed to the standard distance (refer to 1E). The relative speed is changed from 0 to a positive value upon completing the lane change because a new objective is a faster preceding vehicle (refer to 1G). The distance deviation becomes a negative value. The target acceleration becomes a negative value in the condition 1C (refer to 1H).

Thus, according to the conventional distance control logic, the system's vehicle continues to decelerate unless the actual distance is increased to the standard distance. In other words, there is a dead time until the system's vehicle starts accelerating to follow up the faster preceding vehicle. Thus, the system's vehicle is significantly delayed to follow up the preceding vehicle and will be left behind undesirably. This will worsen the drive feeling and force a succeeding vehicle to decelerate unnecessarily.

Figure 40:
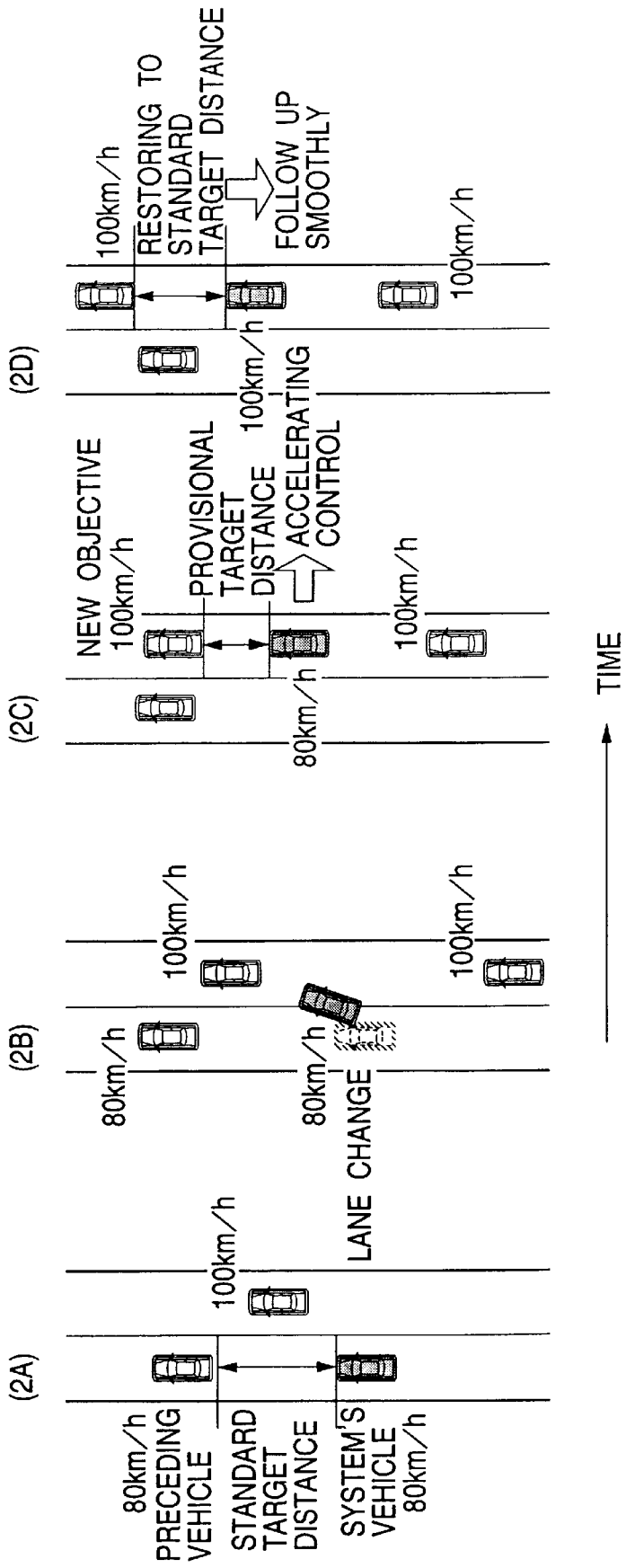
FIG. 40 is a time sequential view showing the vehicle behavior (lane change mode) in accordance with the automatic distance control in accordance with the second embodiment of the present invention.
Figure 41:
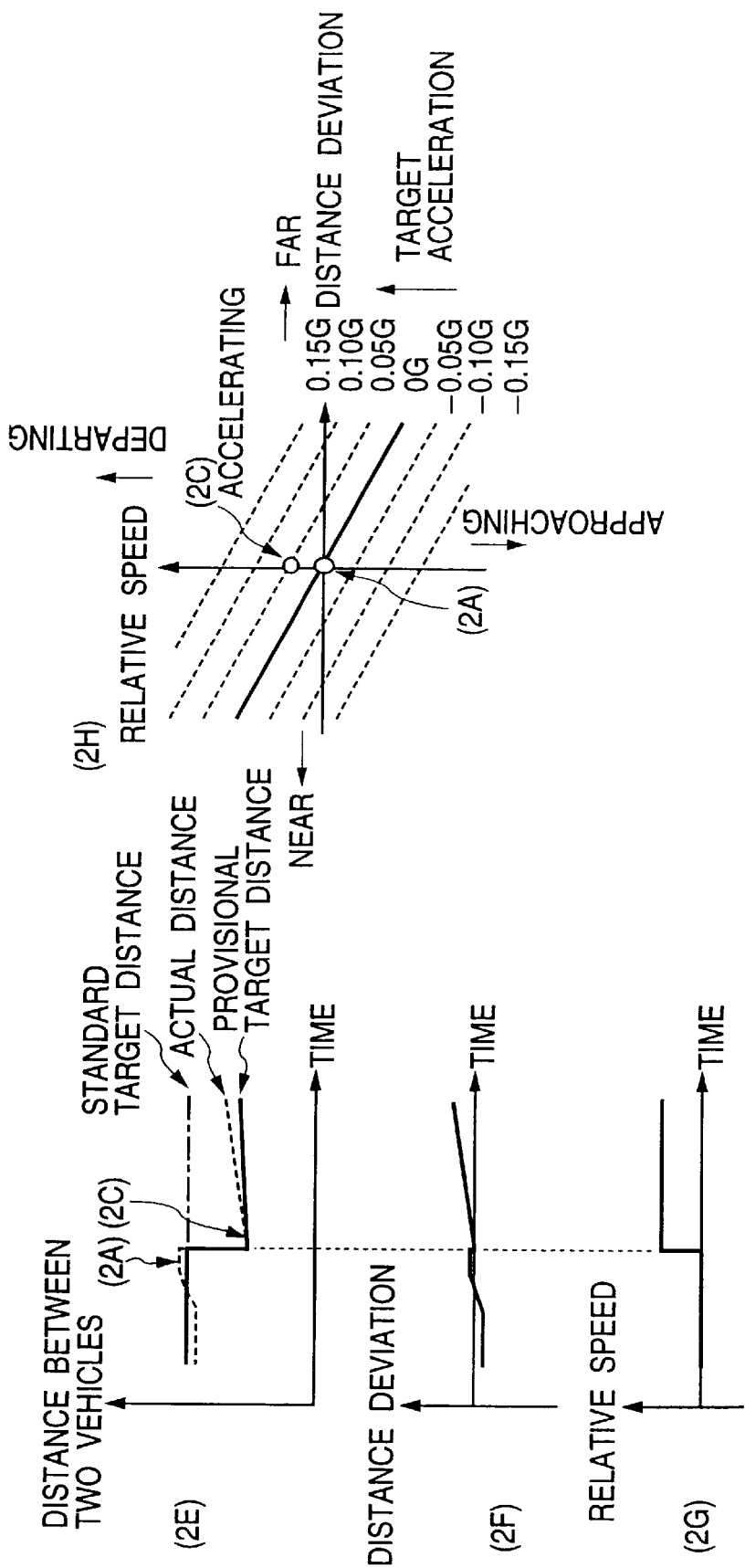
FIG. 41 is time charts and a graph showing the vehicle behavior (lane change mode) in accordance with the automatic distance control in accordance with the second embodiment of the present invention.

FIGS. 40 and 41 show vehicle behavior in accordance with the automatic control logic of the second embodiment of the present invention. The system's vehicle cruises at a constant speed of 80 km/h while keeping a standard target distance with respect to a preceding vehicle (refer to 2A). Then, the system's vehicle starts transferring to a passing or overtaking lane (refer to 2B) on which other vehicles travel at a faster speed of 100 km/h. At the moment that the system's vehicle has completed the lane change, a distance from the system's vehicle to a preceding vehicle may be shorter than the standard target distance.

In such a case, according to the distance control logic of the second embodiment of the present invention, the target distance is temporarily reduced to a provisional target distance so that the system's vehicle can accelerate quickly (refer to 2C). The system's vehicle continues to accelerate from 80 km/h. However, the actual distance between two vehicles gradually increases when the preceding vehicle is traveling at 100 km/h. The actual distance gradually restores to the standard target distance (refer to 2D).

Namely, according to the distance control logic of the second embodiment of the present invention, the target distance is reduced to the actual distance immediately after the lane change is accomplished (refer to 2E). The distance deviation is substantially 0 at this moment (refer to 2F). The relative speed is changed from 0 to a positive value upon completing the lane change because a new objective is a faster preceding vehicle (refer to 2G). The target acceleration becomes a positive value in the condition 2C (refer to 2H).

According to the distance control logic of the second embodiment of the present invention, the system's vehicle can smoothly follow up the faster preceding vehicle without being left behind. Thus, the automatic distance control of the present invention realizes excellent vehicle behavior fitting to driver feeling in the lane change mode.

Furthermore, according to the warning distance control in accordance with the second embodiment of the present invention, the warning distance is temporarily reduced after completing the lane change so as to eliminate unnecessary warning operation.

Override Mode

In the override operation, the driver depresses the accelerator pedal (i.e., manually operates the acceleration device) to generate an acceleration larger than that obtainable by the automatic distance control. In this respect, the driver performs the override operation with intent to approach the preceding vehicle.

Figure 42:
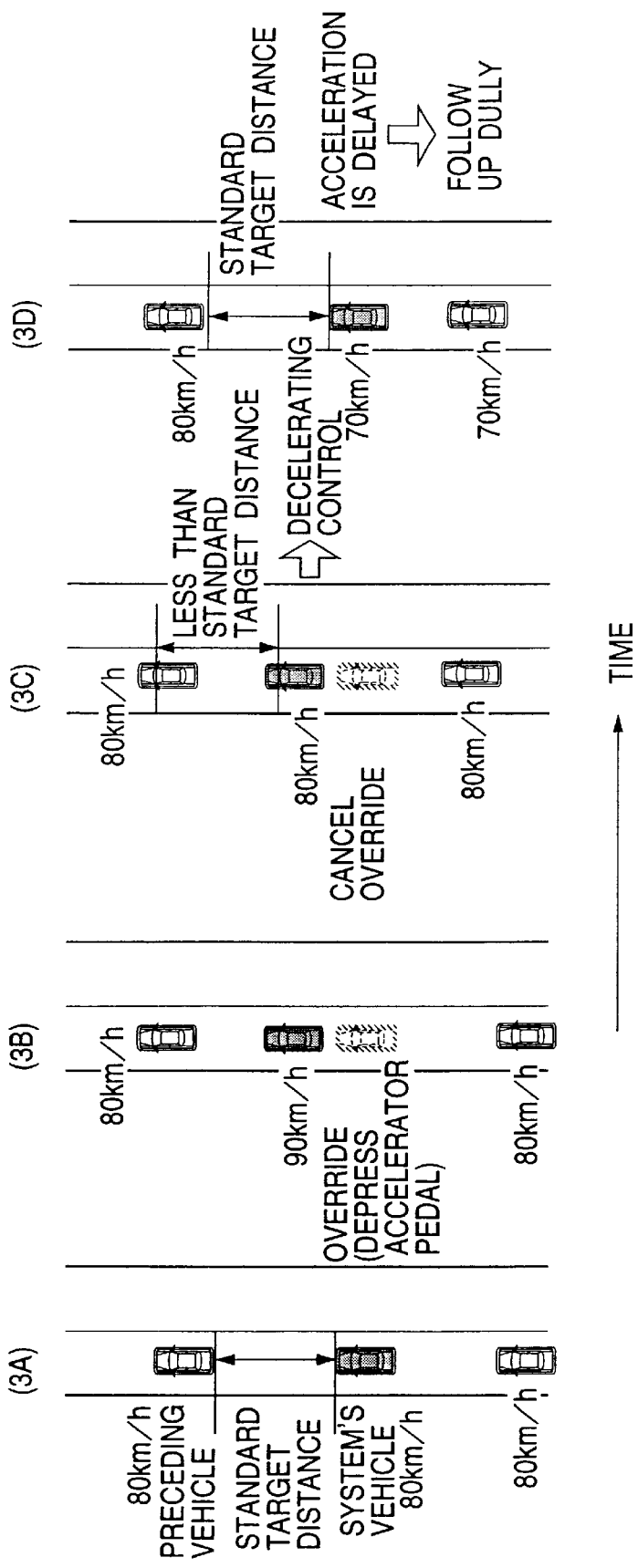
FIG. 42 is a time sequential view showing the vehicle behavior (override mode) in accordance with the conventional automatic distance control.
Figure 43:
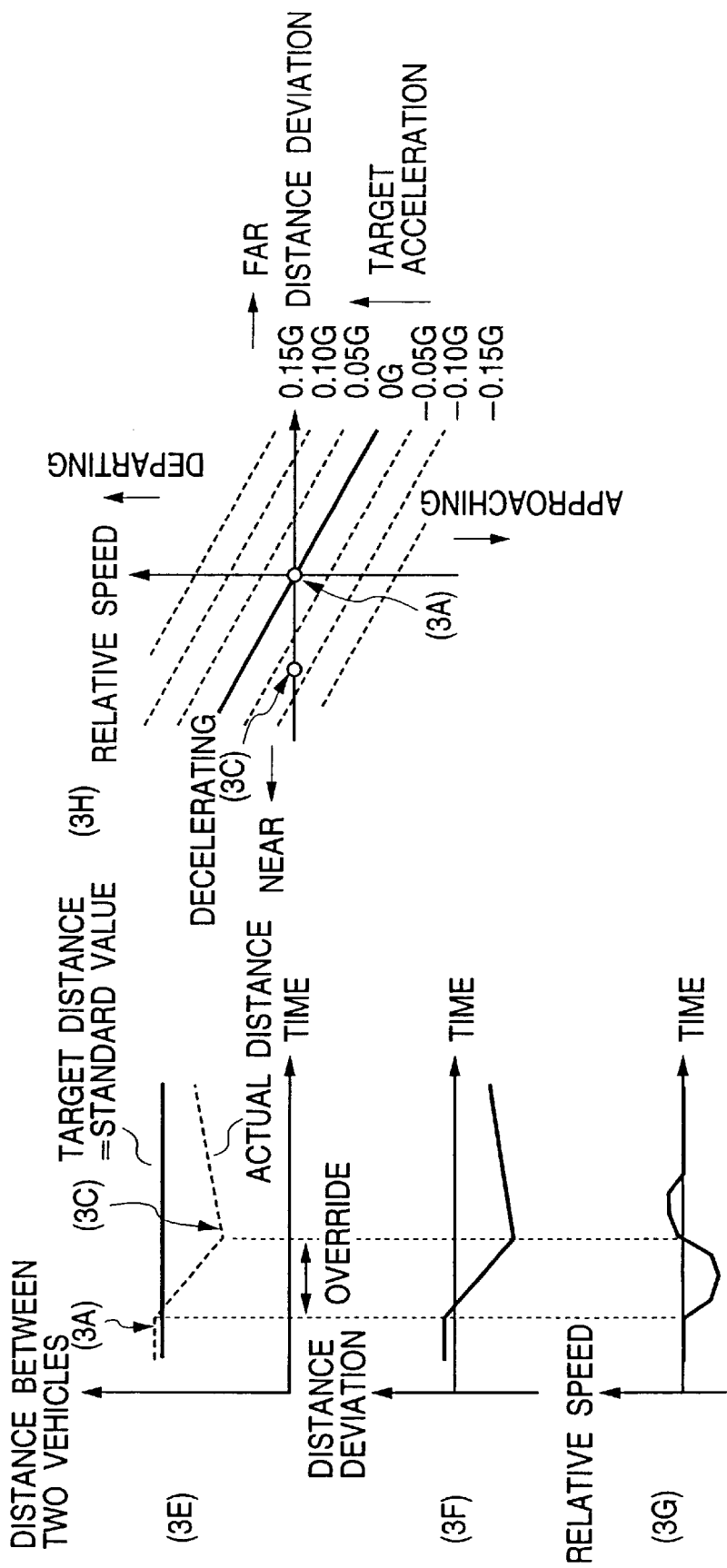
FIG. 43 is time charts and a graph showing the vehicle behavior (override mode) in accordance with the conventional automatic distance control.

FIGS. 42 and 43 show vehicle behavior in accordance with a conventional automatic control logic in the override mode. It is assumed that the system's vehicle cruises at a constant speed of 80 km/h while keeping a standard target distance with respect to a preceding vehicle (refer to 3A). Then, in response to the override operation of the driver, the system's vehicle increases the traveling speed to 90 km/h to chase the preceding vehicle (refer to 3B). Then, the driver cancels the override operation to resume the automatic distance control at the traveling speed of 80 km/h (refer to 3C). For example, the driver releases his/her foot from the accelerator pedal. At this moment, the distance between the system's vehicle and the preceding vehicle is shorter than the standard target distance (refer to 3C).

In such a case, according to the conventional distance control logic, the system's vehicle first decelerates to increase the distance with respect to the preceding vehicle. For example, the system's vehicle travels at 70 km/h. Then, after a sufficient distance equivalent to the standard target distance is maintained, the system's vehicle starts accelerating to follow up the preceding vehicle (refer to 3D).

According to the conventional distance control logic, the target distance is fixed to the standard distance (refer to 3E). As the system's vehicle approaches the preceding vehicle during the override operation (refer to 3E) with a negative relative speed (refer to 3G), the distance deviation becomes a negative value when the override operation is canceled (refer to 3F). As a result, the target acceleration becomes a negative value in the condition 3C (refer to 3H).

Thus, according to the conventional distance control logic, the system's vehicle continues to decelerate unless the actual distance is increased to the standard distance. In other words, there is a dead time until the system's vehicle starts accelerating to follow up the preceding vehicle. Thus, the system's vehicle is significantly delayed to follow up the preceding vehicle and will be left behind undesirably. This will worsen the drive feeling and force a succeeding vehicle to decelerate unnecessarily.

Hence, it is preferable to suppress the deceleration of the vehicle during the override operation in the automatic distance control when the system's vehicle is approaching to the preceding vehicle with an appropriate relative speed.

Figure 44:
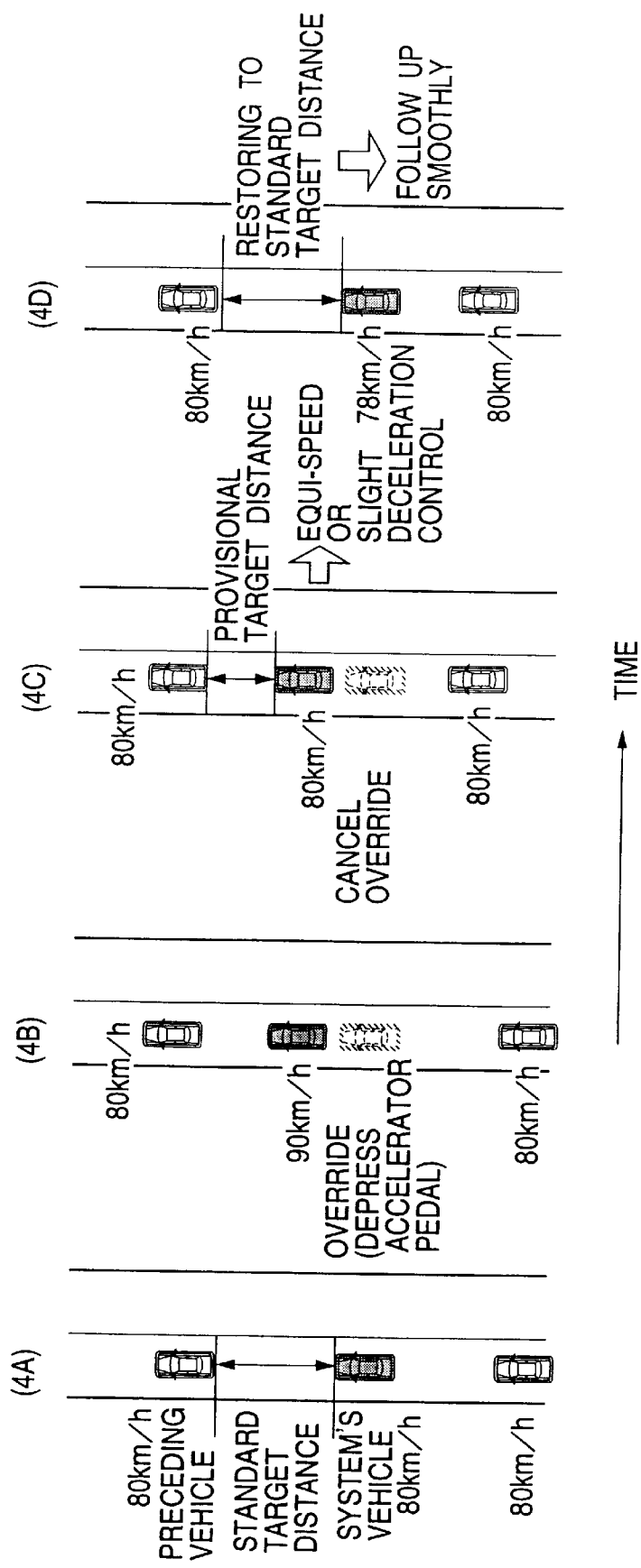
FIG. 44 is a time sequential view showing the vehicle behavior (override mode) in accordance with the automatic distance control in accordance with the second embodiment of the present invention.
Figure 45:
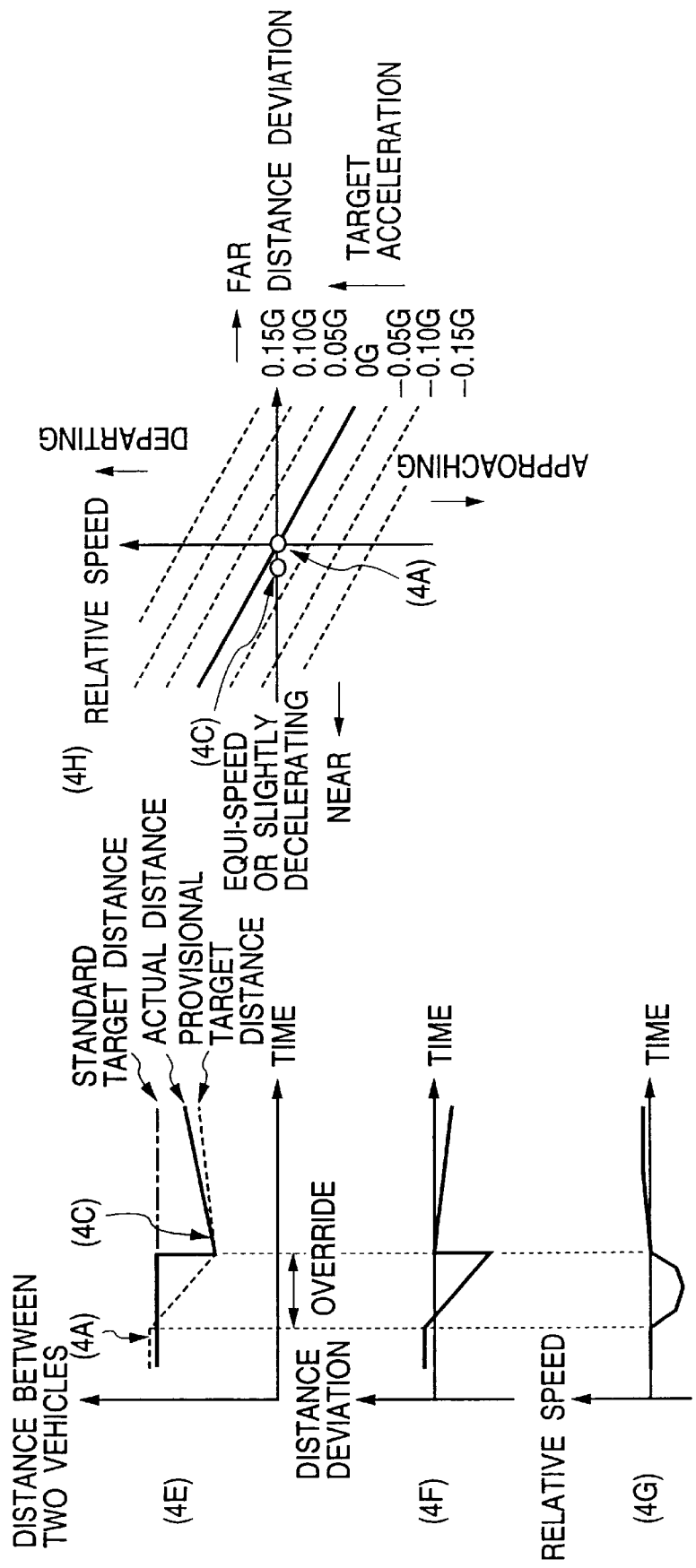
FIG. 45 is time charts and a graph showing the vehicle behavior (override mode) in accordance with the automatic distance control in accordance with the second embodiment of the present invention.

FIGS. 44 and 45 show vehicle behavior in accordance with the automatic control logic of the second embodiment of the present invention. The system's vehicle cruises at a constant speed of 80 km/h while keeping a standard target distance with respect to a preceding vehicle (refer to 4A). Then, in response to the override operation of the driver, the system's vehicle increases the traveling speed to 90 km/h to chase the preceding vehicle (refer to 4B). Thereafter, the driver cancels the override operation to resume the automatic distance control at the traveling speed of 80 km/h (refer to 4C). At this moment, the distance between the system's vehicle and the preceding vehicle is shorter than the standard target distance.

In such a case, according to the distance control logic of the second embodiment of the present invention, the target distance is temporarily reduced to a provisional target distance so that the system's vehicle can cruise at the speed substantially identical with or slightly slower than that of the preceding vehicle. For example, when the system's vehicle travels at 78 km/h, the actual distance between two vehicles gradually increases and restores to the standard target distance (refer to 4D).

Namely, according to the distance control logic of the second embodiment of the present invention, the target distance is reduced to the actual distance immediately after the override operation is canceled (refer to 4E). The distance deviation is substantially 0 at this moment and then gradually decreases (refer to 4F). The relative speed is substantially 0 (refer to 4G). The target acceleration in the condition 4C is substantially 0 or a small negative value. In other words, the target acceleration in the condition 4C is substantially identical with the target acceleration in the condition 4A (refer to 4H). When the override operation is canceled, it is generally preferable to slightly decelerate the vehicle to eliminate an inertia effect that the vehicle approaches the preceding vehicle too much.

According to the distance control logic of the second embodiment of the present invention, the system's vehicle can smoothly follow up the preceding vehicle without being left behind. Thus, the automatic distance control of the present invention realizes excellent vehicle behavior fitting to driver feeling in the override mode.

Furthermore, according to the warning distance control in accordance with the second embodiment of the present invention, the warning distance is temporarily reduced after canceling the override operation so as to eliminate unnecessary warning operation.

Control Startup Mode

Figure 46:
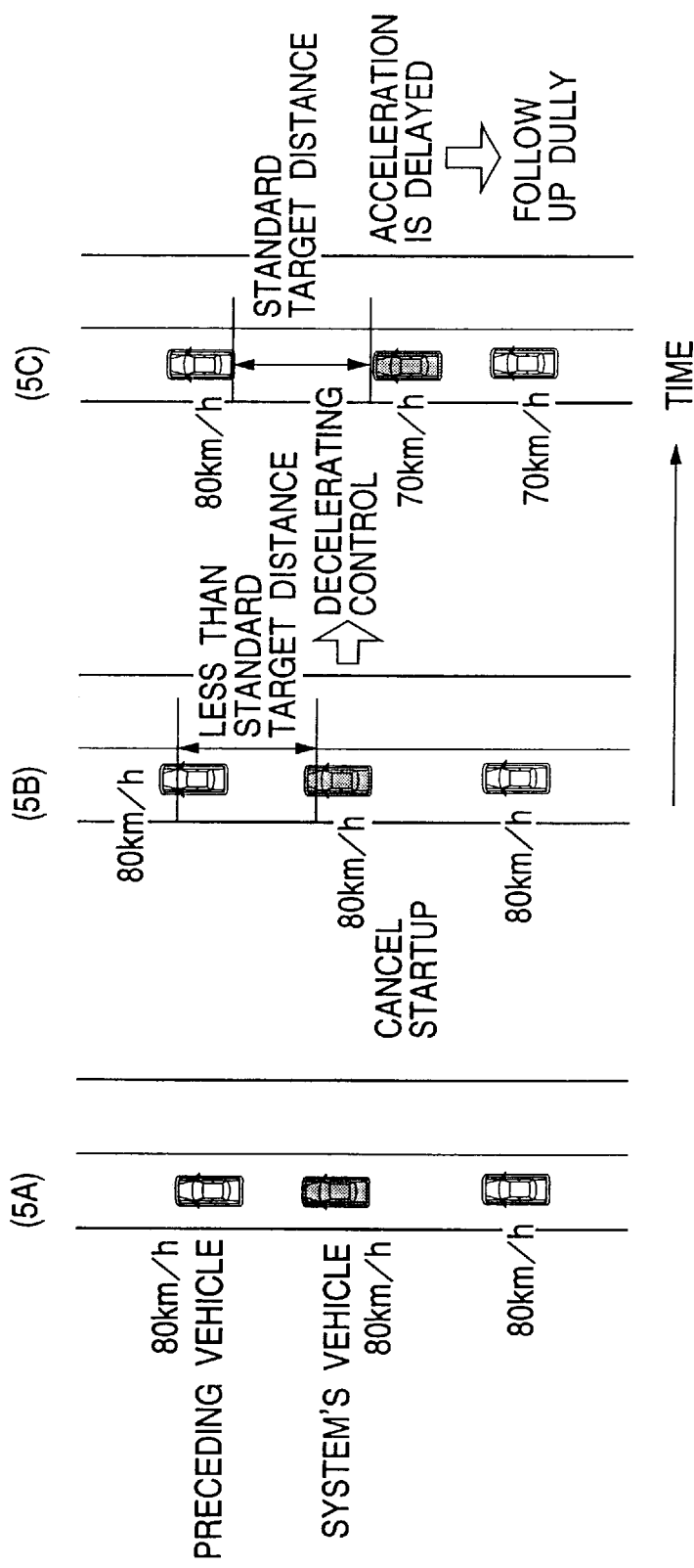
FIG. 46 is a time sequential view showing the vehicle behavior (control startup mode) in accordance with the conventional automatic distance control.
Figure 47:
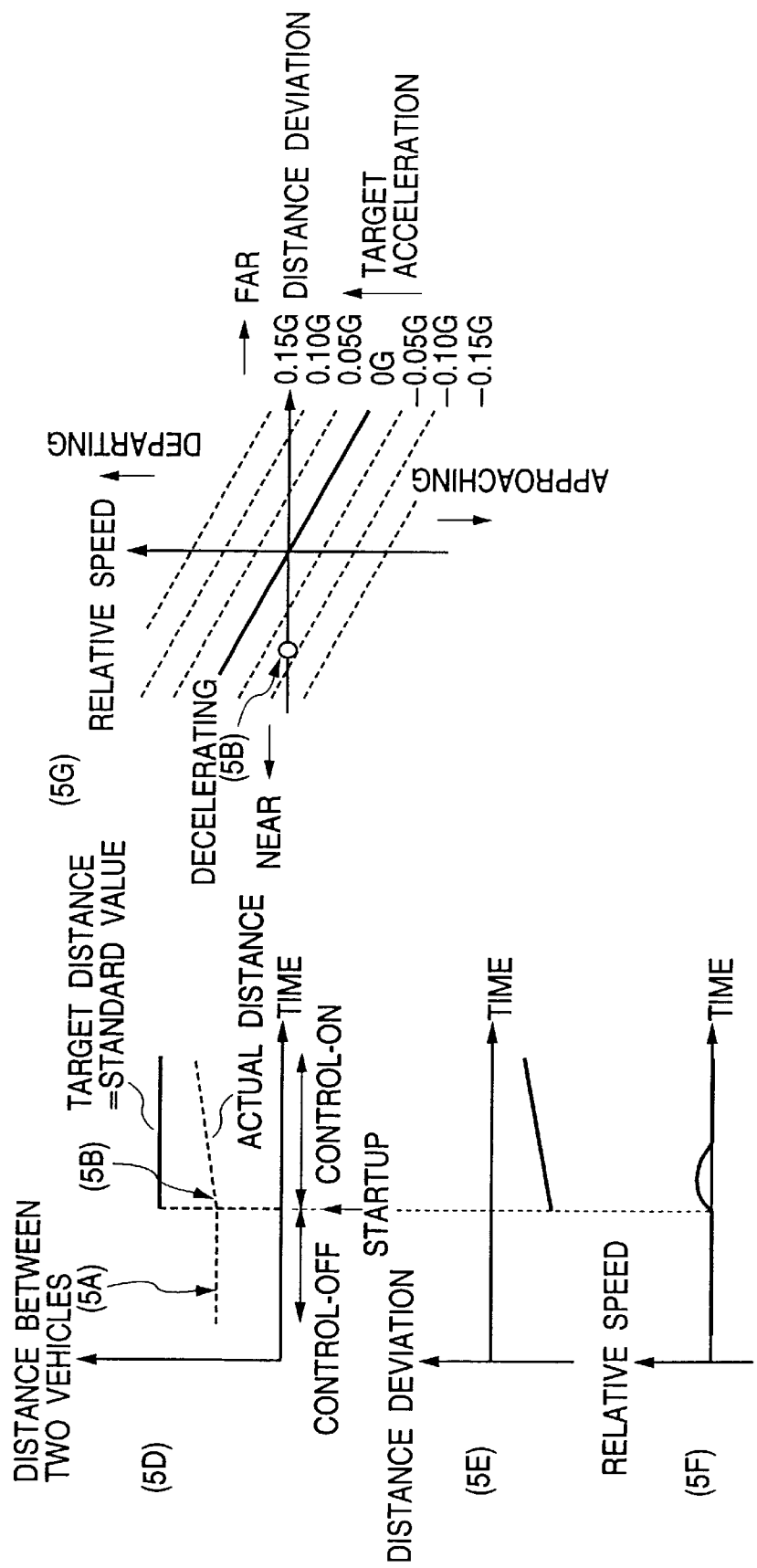
FIG. 47 is time charts and a graph showing the vehicle behavior (control startup mode) in accordance with the conventional automatic distance control.

FIGS. 46 and 47 show vehicle behavior in accordance with a conventional automatic control logic in the control startup mode. It is assumed that the system's vehicle cruises at a constant speed of 80 km/h without performing an automatic distance control (refer to 5A). In this case, the distance between the system's vehicle and the preceding vehicle is shorter than the standard target distance. Then, in response to the startup operation of the driver, the automatic distance control is performed (refer to 5B).

In such a case, according to the conventional distance control logic, the system's vehicle first decelerates to increase the distance with respect to the preceding vehicle. For example, the system's vehicle travels at 70 km/h. Then, after a sufficient distance equivalent to the standard target distance is maintained, the system's vehicle starts accelerating to follow up the preceding vehicle (refer to 5C).

When the actual distance between two vehicles is shorter than the standard target distance (refer to 5D), the distance deviation is a negative value in the beginning of the automatic distance control (refer to 5E). As a result, the target acceleration becomes a negative value in the condition 5B (refer to 5G).

Thus, according to the conventional distance control logic, the system's vehicle continues to decelerate unless the actual distance is increased to the standard distance. In other words, there is a tendency that the system's vehicle is left behind the preceding vehicle undesirably. Thus, the system's vehicle is significantly delayed to follow up the preceding vehicle. This will worsen the drive feeling and force a succeeding vehicle to decelerate unnecessarily.

Hence, it is preferable to suppress the deceleration of the vehicle during the startup operation in the automatic distance control when the actual distance between the system's vehicle and the preceding vehicle is shorter than the standard target distance.

Figure 48:
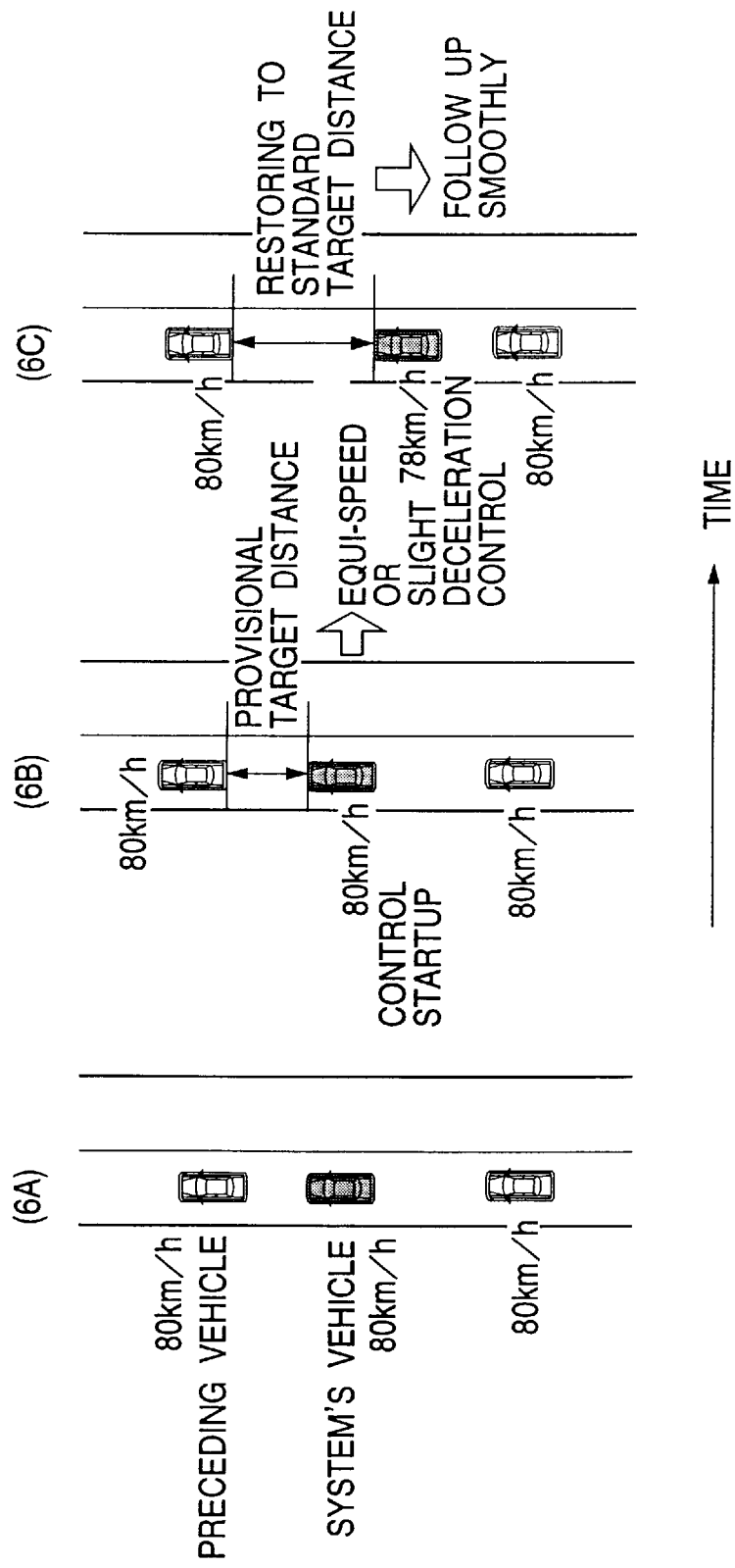
FIG. 48 is a time sequential view showing the vehicle behavior (control startup mode) in accordance with the automatic distance control in accordance with the second embodiment of the present invention.
Figure 49:
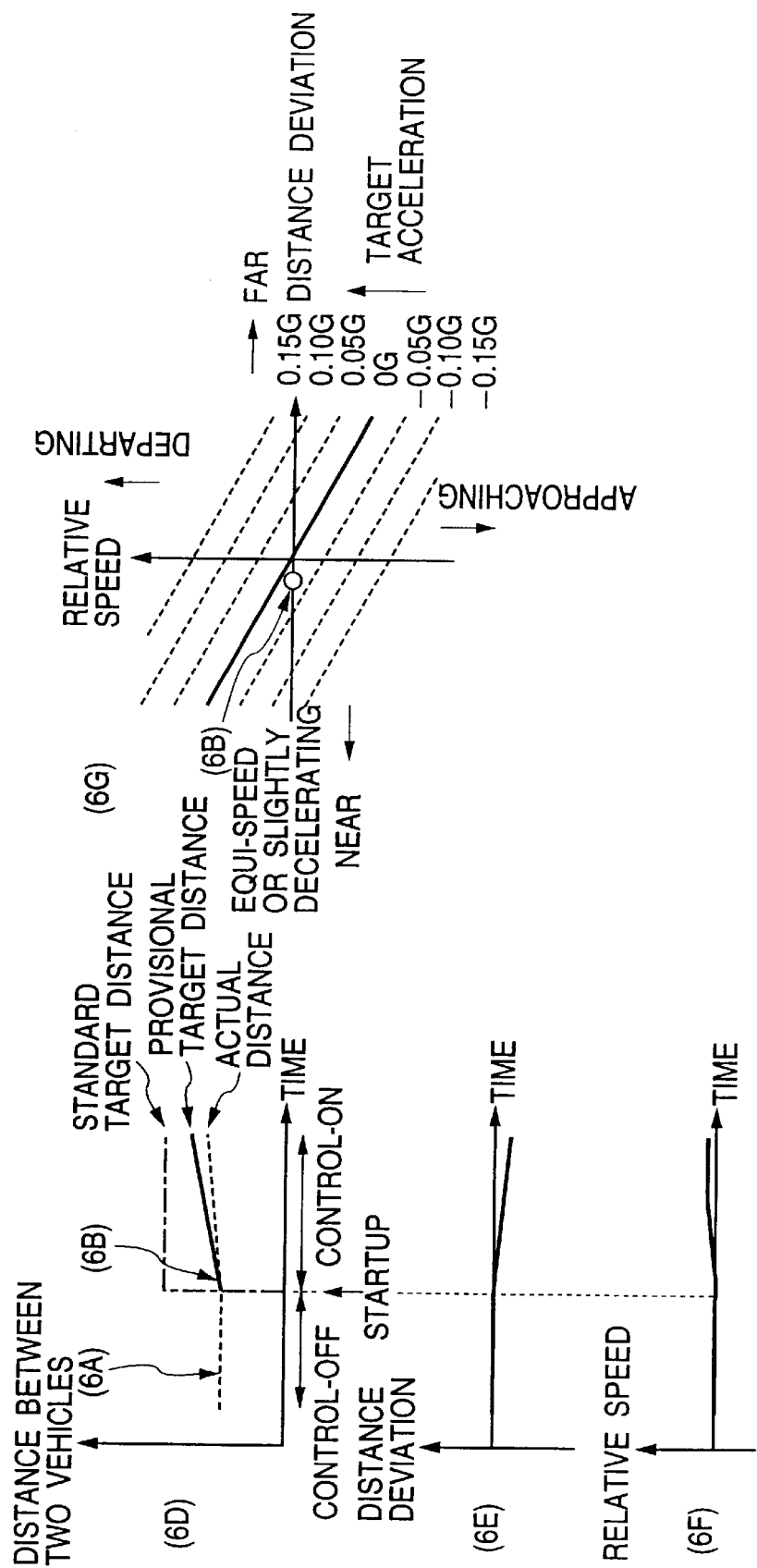
FIG. 49 is time charts and a graph showing the vehicle behavior (control startup mode) in accordance with the automatic distance control in accordance with the second embodiment of the present invention.

FIGS. 48 and 49 show vehicle behavior in accordance with the automatic control logic of the second embodiment of the present invention. The system's vehicle cruises at a constant speed of 80 km/h without performing an automatic distance control (refer to 6A). The distance between the system's vehicle and the preceding vehicle is shorter than the standard target distance. Then, in response to the startup operation of the driver, the automatic distance control is performed (refer to 6B).

In such a case, according to the distance control logic of the second embodiment of the present invention, the target distance is temporarily reduced to a provisional target distance so that the system's vehicle can cruise at the speed substantially identical with or slightly slower than that of the preceding vehicle. For example, when the system's vehicle travels at 78 km/h, the actual distance between two vehicles gradually increases and restores to the standard target distance (refer to 6C).

Namely, according to the distance control logic of the second embodiment of the present invention, the target distance is reduced to the actual distance immediately after the automatic distance control is started (refer to 6D). The distance deviation is substantially 0 at this moment and then gradually decreases (refer to 6E). The relative speed is substantially 0 (refer to 6F). The target acceleration in the condition 6B is substantially 0 or a small negative value (refer to 6G).

According to the distance control logic of the second embodiment of the present invention, the system's vehicle can smoothly follow up the preceding vehicle without being left behind. Thus, the automatic distance control of the present invention realizes excellent vehicle behavior fitting to driver feeling in the control startup mode.

Furthermore, according to the warning distance control in accordance with the second embodiment of the present invention, the warning distance can be temporarily reduced after starting the automatic distance control in case of the short actual distance between two vehicles, thereby eliminating unnecessary warning operation.

As explained above, all of the lane change operation, the override operation and the control startup operation are performed based on the driver's intent and should be discriminated from other situations such as emergency condition not related to the driver's intent. Thus, the automatic distance control in the lane change operation, the override operation and the control startup operation should be differentiated from the ordinary one. In such conditions, it is preferable to suppress the deceleration degree of the vehicle.

For example, when the system's vehicle has just finished the lane change operation to the passing or overtaking lane, the system's vehicle is usually slower than other vehicles traveling on this lane. It is thus preferable that the system's vehicle accelerates to follow up the preceding vehicle without decelerating to maintain the standard target distance. Hence, the present invention temporarily reduces the target distance to suppress the deceleration degree of the system's vehicle. Thus, the system's vehicle can smoothly follow up the preceding vehicle.

Furthermore, the warning distance is temporarily reduced to eliminate unnecessary warning operations in the lane change operation, the override operation, and the control startup operation.

Regarding the restoration of the target distance, there are various ways to control the restoration as explained with reference to FIGS. 21A to 21C.

In the above-described automatic distance control, the physical quantity representing the distance between two vehicles is not limited to the disclosed one. Another physical quantity representing the distance directly or indirectly will be employed equally. For example, a ratio of the distance deviation to the target distance can be used in the automatic distance control of the present invention.

Instead of regulating the target distance, it will be possible to regulate the target acceleration to have the similar effects. In this case, the present invention adjusts the degree of the deceleration. The reduction of the target acceleration is temporarily suppressed instead of setting the provisional target distance shorter than the standard target distance. For example, the lower limit of the target acceleration is temporarily set to a provisional level equal to 0 or a predetermined negative value. And then, the lower limit of the target acceleration gradually decreases with passage of time and restores to a standard value. This is also effective to suppress the undesirable deceleration.

There is the possibility that, when the override operation has just been canceled, the actual distance between the system's vehicle and the preceding vehicle is still longer than the standard target distance although the actual distance will soon decrease.

Figure 50:
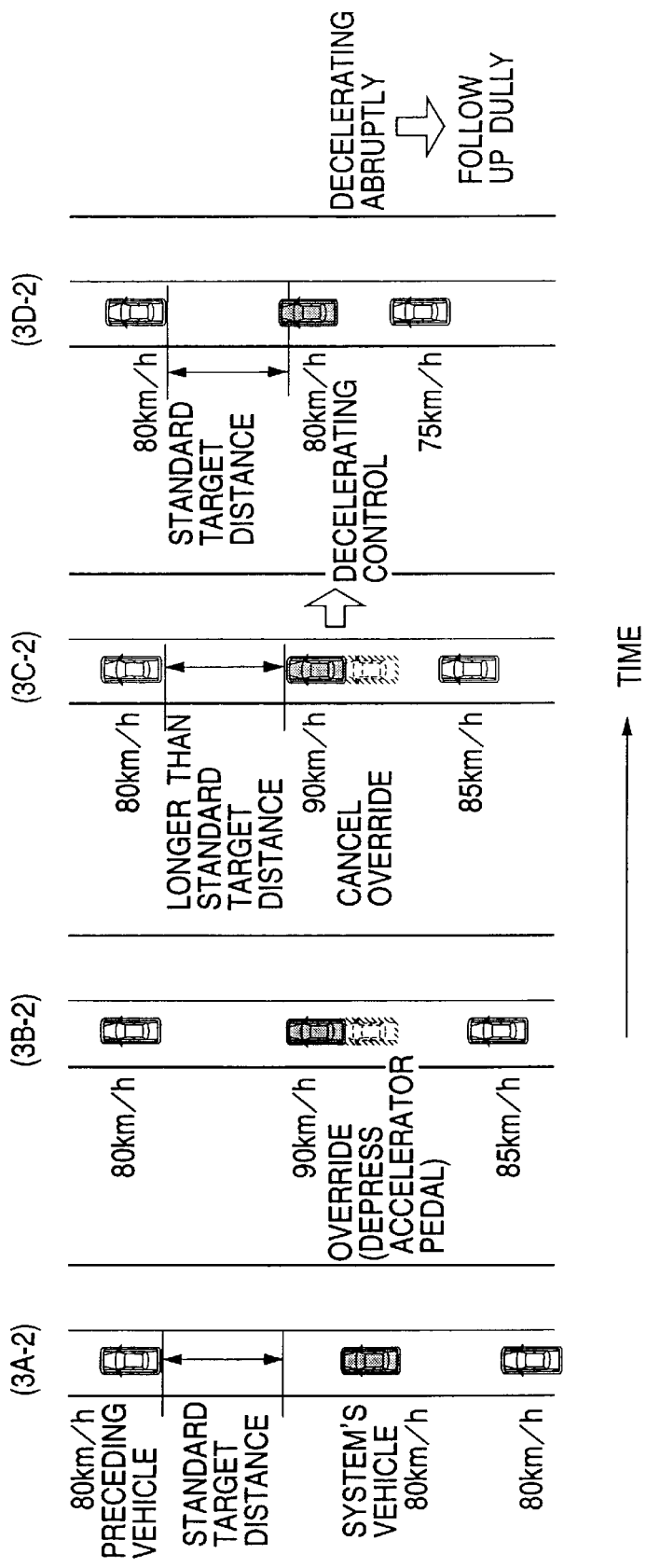
FIG. 50 is a time sequential view showing the vehicle behavior (override mode) in accordance with the conventional automatic distance control.
Figure 51:
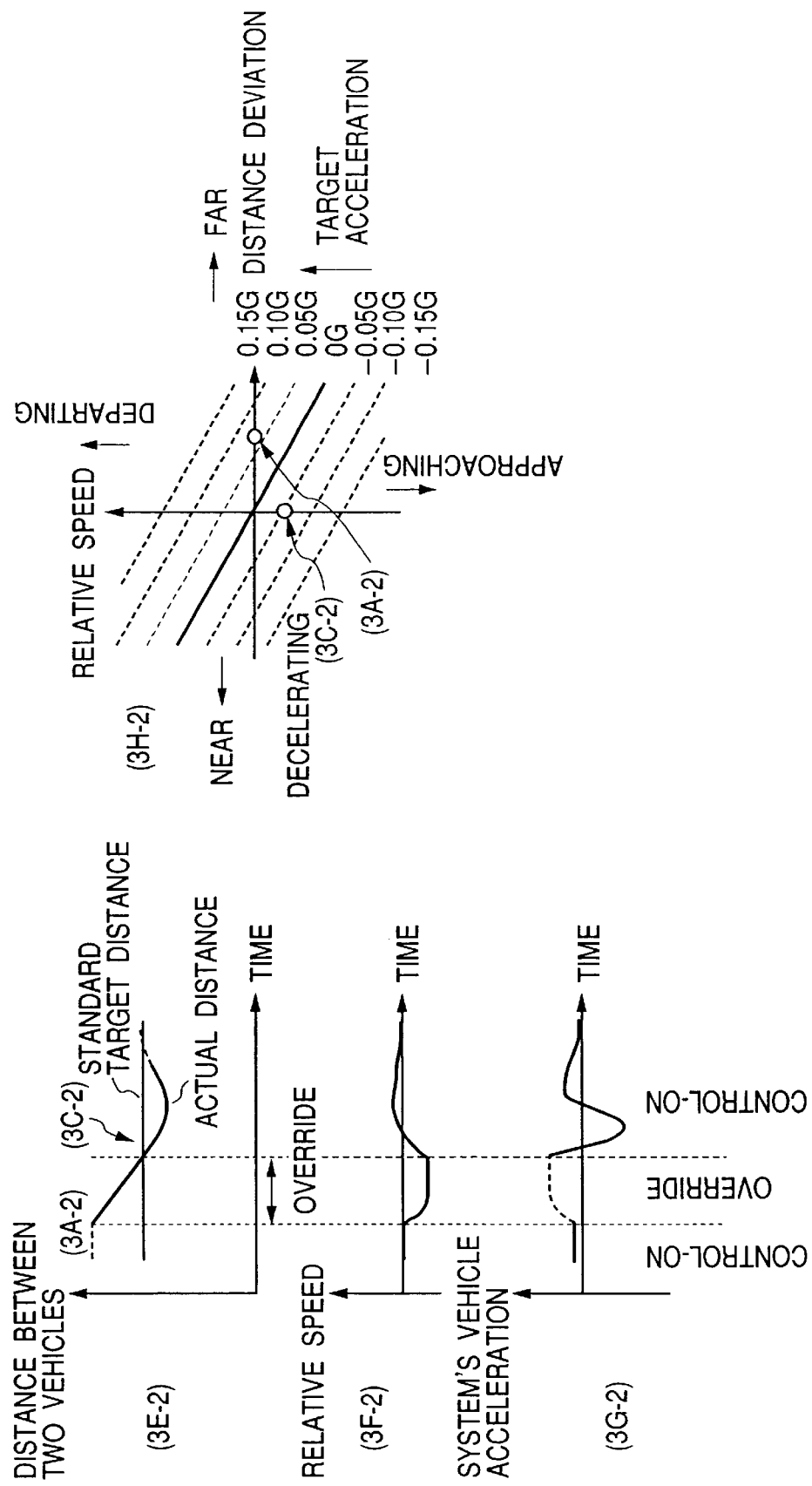
FIG. 51 is time charts and a graph showing the vehicle behavior (override mode) in accordance with the conventional automatic distance control.

FIGS. 50 and 51 show vehicle behavior in accordance with a conventional automatic control logic in the override mode. It is assumed that the system's vehicle cruises at a constant speed of 80 km/h while keeping a distance longer than the standard target distance with respect to a preceding vehicle (refer to 3A-2). Then, in response to the override operation of the driver, the system's vehicle increases the traveling speed to 90 km/h to chase the preceding vehicle (refer to 3B-2). Then, the driver cancels the override operation (i.e., releases his/her foot from the accelerator pedal) when the actual distance approaches the standard target distance (refer to 3C-2). At this moment, the system's vehicle (90 km/h) is faster than the preceding vehicle (80 km/h). Thus, the actual distance between two vehicles will soon become shorter than the standard target distance (3D-2). In such a condition, according to the conventional distance control logic, the system's vehicle decelerates abruptly (refer to 3G-2) immediately after the actual distance is equalized to the standard target distance. This will worsen the drive feeling and force a succeeding vehicle to decelerate.

Figure 52:
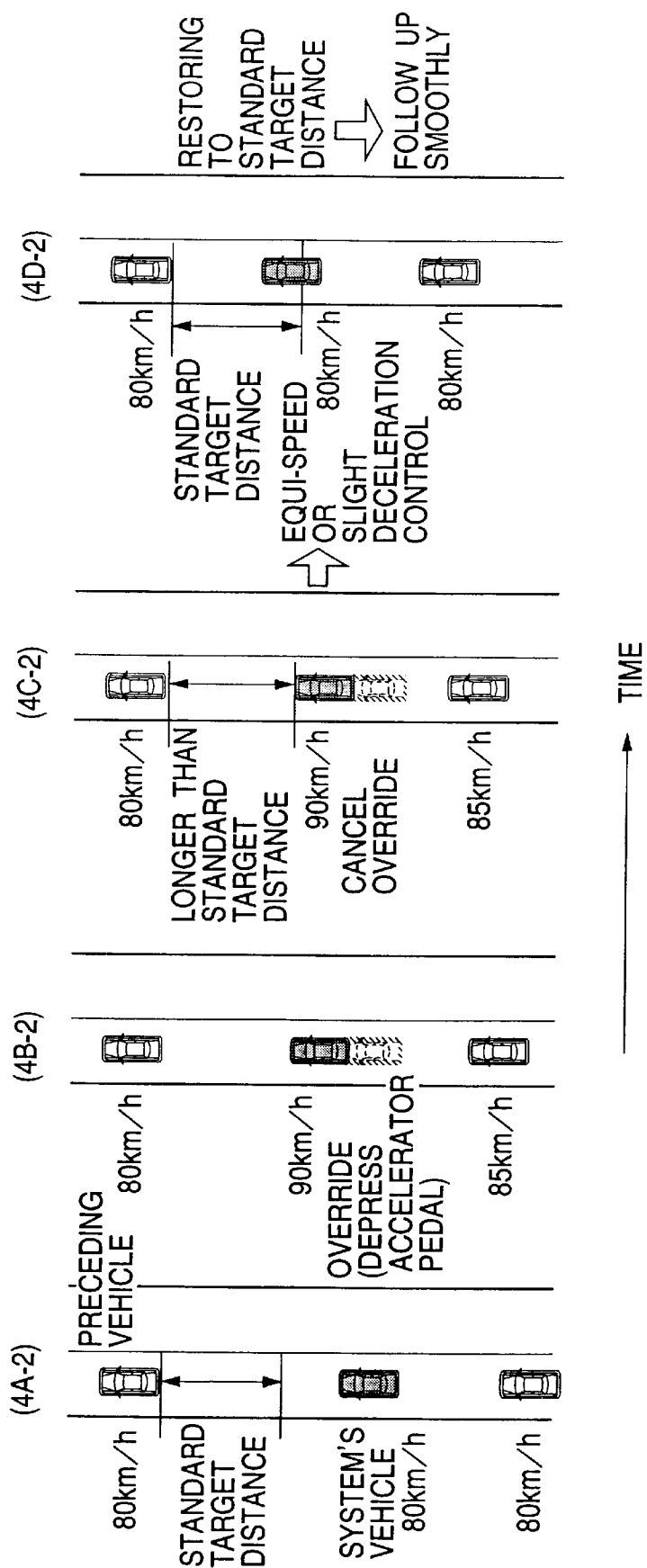
FIG. 52 is a time sequential view showing the vehicle behavior (override mode) in accordance with the automatic distance control in accordance with the second embodiment of the present invention.
Figure 53:
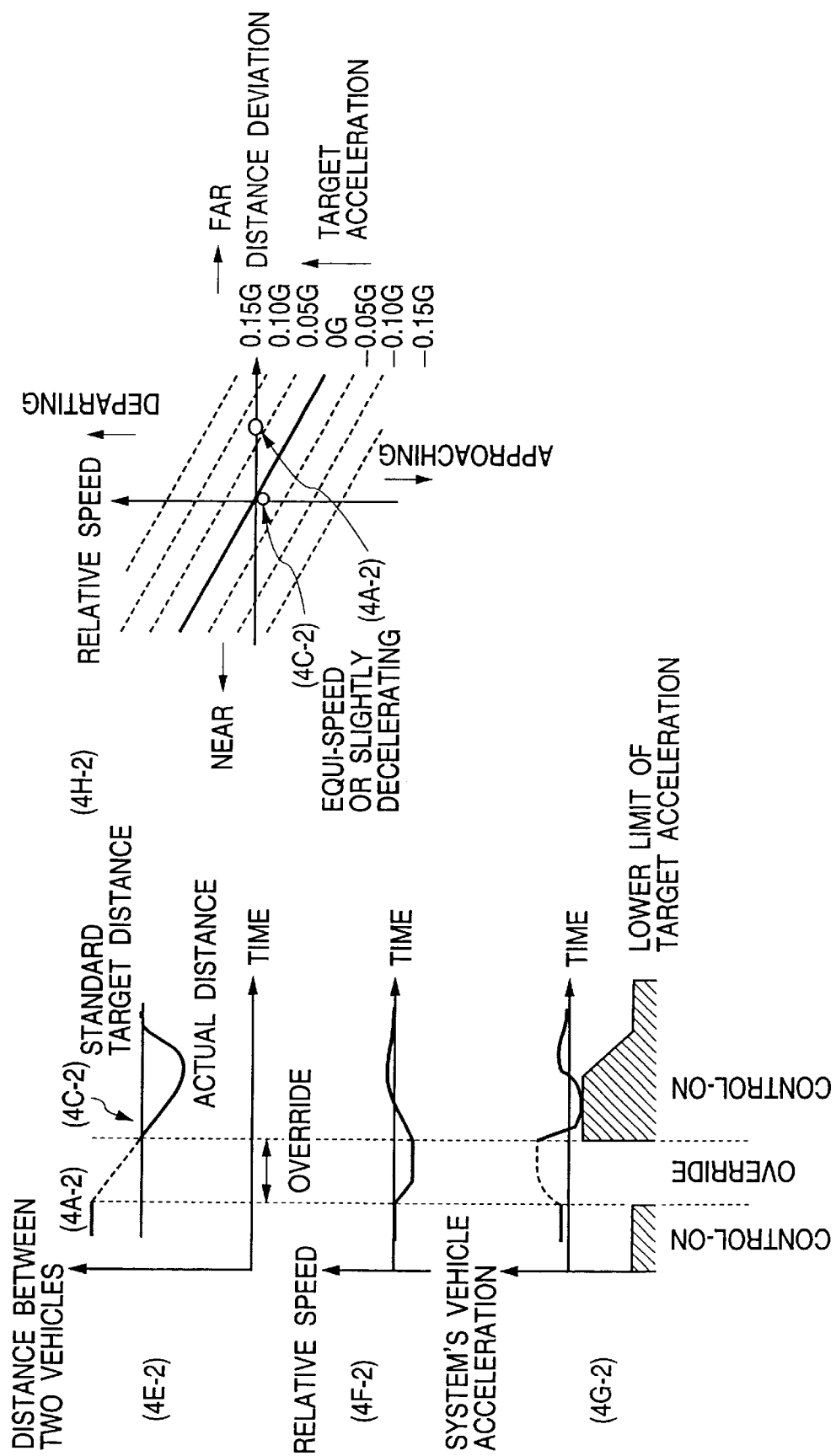
FIG. 53 is time charts and a graph showing the vehicle behavior (override mode) in accordance with the automatic distance control in accordance with the second embodiment of the present invention.

FIGS. 52 and 53 show vehicle behavior in accordance with the automatic control logic of the second embodiment of the present invention.

Conditions 4A-2 and 4B-2 are same as conditions 3A-2 and 3B-2. When the driver has canceled the override operation (condition 4C-2), the lower limit of the target acceleration is temporarily increased to a higher level, e.g., 0 or a predetermined negative value. With this adjustment, it becomes possible to suppress the vehicle from decelerating abruptly (refer to 4G-2). The system's vehicle can smoothly follow up the preceding vehicle.

The lower limit of the target acceleration gradually decreases with passage of time and restores to a standard value.

Figure 54A:
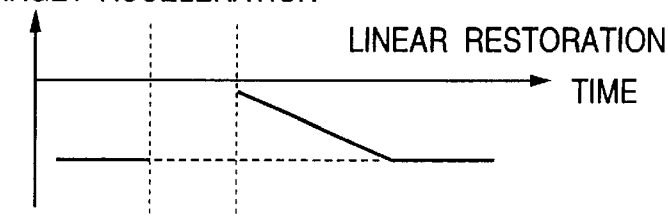
FIGS. 54A to 54C are views each showing restoration of the lower limit of the target acceleration in accordance with the second embodiment of the present invention.
Figure 54B:
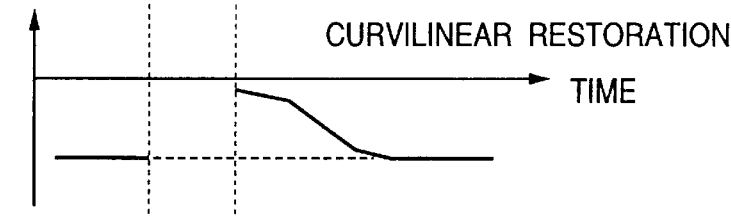
Figure 54C:
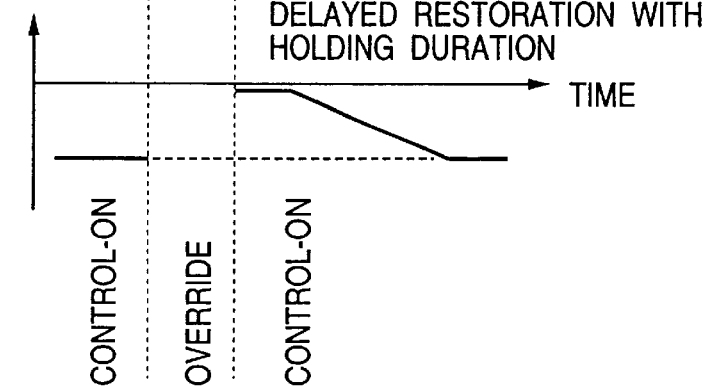

There are various ways to control the restoration of the lower limit of the target acceleration as shown in FIGS. 54A, 54B and 54C.

For example, in a first case, it may be preferable that the lower limit of the target acceleration restores linearly to the standard level as shown in FIG. 54A.

In a second case, it may be preferable that the lower limit of the target acceleration restores curvilinearly to the standard level as shown in FIG. 54B.

In a third case, it may be preferable to provide a holding or dormant duration before the lower limit of the target acceleration restores to the standard level as shown in FIG. 54C.

Regarding the lane change mode, the warning operation in accordance with the present invention can be performed independently from the automatic distance control.

In the above-described embodiment, the warning allowance condition can be variously modified. For example, it is possible to modify the step S2607 in FIG. 35 to add another judgement as to whether the third-speed shift down instruction is sustained or not. In this case, the warning device is activated only when both the braking operation and the third-speed shift down operation are executed. Furthermore, it is possible to modify the step S2607 to add a third judgement as to whether the fuel cut instruction is sustained or not. In this case, the warning device is activated only when the braking operation, the third-speed shift down operation, and the fuel-cut operation are executed simultaneously.

Needless to say, the attainable deceleration level of the vehicle can be increased by adding the total number of deceleration devices. Thus, the obtainable deceleration becomes large when the third-speed shift down operation and the fuel-cut operation are added to the braking operation.

Furthermore, the judgement in the step S2607 or the step S2609 can be modified by combining two judgements performed in these steps S2607 and S2609. Namely, the warning operation is performed only when the braking instruction is sustained and the target acceleration is equal to an available maximum deceleration.

It is also possible to judge that the deceleration level of the succeeding vehicle is higher than the predetermined maximum level when a predetermined combination of deceleration devices capable of generating a largest deceleration is selected to decelerate the succeeding vehicle, or when the control value is equivalent to an available maximum deceleration.

Anyway, the warning allowance condition can be determined according to the driver's preference.

The above-described embodiments are based on an ordinary passenger vehicle which is capable of performing the automatic braking control, the fuel cut control, the O/D cut control, and the shift down control.

However, the present invention can be equally applied to large-scale or heavy vehicles, such as autotrucks. The autotrucks can decelerate strongly by performing the exhaust gas braking control and the exhaust retarder control simultaneously instead of using the braking device. In this respect, the braking device is not always the deceleration device which can attain the maximum deceleration level.

The deceleration means of the present invention can be practically realized by adjusting the hydraulic braking pressure of the braking device (i.e., braking control), by partly or fully cutting the fuel supplied to the internal combustion engine (i.e., fuel cut control), by preventing the transmission from being shifted to the O/D position (i.e., O/D cut control), by causing the transmission to shift to the lower position (i.e., shift down control), by retarding the ignition timing of the internal combustion engine (i.e., ignition timing control), by forcibly connecting the input and output shafts of the torque converter (i.e., lockup control), or by increasing the flow resistance in the exhaust passage of the internal combustion engine (i.e., exhaust gas braking control, and exhaust retarder control).

Moreover, the above-described embodiments use the target acceleration (or deceleration) as the control value of the acceleration/deceleration actuator for controlling the distance between two traveling vehicles. However, the control value of the present invention is not limited to the target acceleration. For example, the target acceleration is replaceable by a target torque or a target vehicle speed.

More specifically, in the step S600 of FIG. 2 and FIG. 22, the target torque or the target vehicle speed is calculated instead of calculating the "target acceleration." In the step S607 of FIG. 10A, the target torque or the target vehicle speed is obtained based on the distance deviation $\Delta d$ and the relative speed $\Delta V$ with reference to the control map shown in FIG. 10B. In this case, the control map of FIG. 10B is modified to obtain the target torque or the target vehicle speed variation (i.e., a required increase or decrease in the vehicle speed). In the step S609 of FIG. 10A, the target torque or the target vehicle speed is obtained considering no presence of any preceding vehicle.

In the steps S711, S721, S723, S731, S737, S741, S747, and S753, the "acceleration deviation $\Delta\alpha$" is replaced by a torque deviation $\Delta\tau$ or a vehicle speed deviation $\Delta S$. The torque deviation $\Delta\tau$ represents a difference between the target torque and the actual (or estimated) torque of the engine. The vehicle speed deviation $\Delta S$ represents a difference between the target vehicle speed and the actual vehicle speed.

In this manner, when the torque of the engine is designated as the control value for controlling the distance between two traveling vehicles, an appropriate target torque is obtained from the control map of FIG. 10B and the vehicle behavior is controlled based on the torque deviation between the target torque and the actual (or estimated) torque.

When the vehicle speed is designated as the control value for controlling the distance between two traveling vehicles, an appropriate vehicle speed variation is obtained from the control map of FIG. 10B. The target vehicle speed is obtained by adding the obtained vehicle speed variation to the actual vehicle speed. The vehicle behavior is controlled based on the vehicle speed deviation between the target vehicle speed and the actual vehicle speed.

The main processing procedure shown in FIGS. 2 and 22 and each subroutine shown in FIGS. 3–7, 10A, 11–17, 23–24, and 26–37 are stored as a control program in a recording medium, such as a memory (ROM, back-up RAM) or a built-in hard disk drive, which is pre-installable in the microcomputer. However, it is possible to store the control program in a portable recording medium, such as a floppy disk, a MO (magneto-optical) disk, a CD-ROM, an external hard disk drive and a DVD (digital versatile disk), so that the control program can be arbitrarily loaded from such a recording medium to the microcomputer.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A distance control apparatus for controlling a distance between two traveling vehicles, said control apparatus comprising:

distance detecting means for detecting a physical quantity directly or indirectly representing an actual distance between said two traveling vehicles;

acceleration/deceleration means for accelerating and decelerating a succeeding vehicle; and distance control means for performing a distance control so as to maintain a target distance between said two traveling vehicles by actuating said acceleration/deceleration means based on said physical quantity detected by said distance detecting means, wherein said distance control means performs a temporary distance control for suppressing a deceleration degree of said succeeding vehicle to a smaller value compared with a deceleration degree attainable during an ordinary distance control when said two traveling vehicles are departing from each other under a condition where the actual distance between said two traveling vehicles is already shorter or will soon become shorter than a standard target distance.

2. The distance control apparatus in accordance with claim 1, wherein distance control means obtains a control value based on a first physical quantity and a second physical quantity, said first physical quantity representing a distance deviation between an actual distance and a target distance between two traveling vehicles, and said second physical quantity representing a relative speed between said two traveling vehicles, said acceleration/deceleration means is actuated based on said control value to adjust the actual distance between said two traveling vehicles, and said distance control means performs said temporary distance control for suppressing the deceleration degree of said succeeding vehicle when said two traveling vehicles are departing from each other under a condition where said actual distance between two traveling vehicles is shorter than the standard target distance.

3. The distance control apparatus in accordance with claim 2, wherein the two traveling vehicles include the succeeding vehicle and a preceding vehicle with respect to which distance is being controlled by said apparatus, the temporary distance control being executed in control analysis cycles, said apparatus further comprising means for judging whether a preceding vehicle based on which control analysis was performed in a previous control analysis cycle is the same as the preceding vehicle based on which control analysis is performed in a current control analysis cycle, and wherein said temporary distance control is performed only when said preceding vehicle based on which control analysis was performed in said previous control analysis cycle is judged to be the same as the preceding vehicle based on which control analysis is performed in the current control analysis cycle.

4. The distance control apparatus in accordance with claim 2, wherein said distance control means temporarily changes said target distance to a provisional target distance to realize said temporary distance control for suppressing the deceleration degree of said succeeding vehicle, and said provisional target distance has an initial value substantially equal to the actual distance between said two traveling vehicles and a transitional value gradually restoring to said standard target distance.

5. The distance control apparatus in accordance with claim 1, wherein said distance control means obtains a control value based on a first physical quantity and a second physical quantity, said first physical quantity representing a distance deviation between an actual distance and a target distance between two traveling vehicles, and said second physical quantity representing a relative speed between said two traveling vehicles, said acceleration/deceleration means is actuated based on said control value to adjust the actual distance between said two traveling vehicles, said distance control means performs said temporary distance control for suppressing the deceleration degree of said succeeding vehicle when said actual distance between said two traveling vehicles is shorter than a predetermined target distance, said distance control means changes said target distance to a provisional target distance to realize said temporary distance control for suppressing the deceleration degree of said succeeding vehicle, and said provisional target distance has an initial value determined in accordance with the relative speed between said two traveling vehicles and a transitional value gradually restoring to said standard target distance.

6. The distance control apparatus in accordance with claim 5, wherein said relative speed is a positive value when said two traveling vehicles are departing from each other and is a negative value when approaching to each other, and said initial value of said provisional target distance is expressed by a decreasing function of said relative speed in a region between a predetermined negative value and a predetermined positive value of said relative speed.

7. The distance control apparatus in accordance with claim 5, wherein said initial value is equal or closer to said standard target distance when said relative speed is smaller than said predetermined negative value.

8. The distance control apparatus in accordance with claim 5, wherein said initial value is equal or closer to said actual distance between said two traveling vehicles when said relative speed is larger than said predetermined positive value.

9. The distance control apparatus in accordance with claim 5, wherein said relative speed is a positive value when said two traveling vehicles are departing from each other and is a negative value when approaching to each other, and said initial value of said provisional target distance is expressed by a decreasing function of said relative speed in a region between a first positive value and a second positive value of said relative speed, where said second positive value is larger than said first positive value.

10. The distance control apparatus in accordance with claim 5, wherein said initial value is equal or closer to said standard target distance when said relative speed is smaller than said first positive value.

11. The distance control apparatus in accordance with claim 5, wherein said initial value is equal or closer to said actual distance between said two traveling vehicles when said relative speed is larger than said second positive value.

12. The distance control apparatus in accordance with claim 1, wherein the physical quantity representing said distance is expressed in terms of time interval which is obtained by dividing the distance between two traveling vehicles by a traveling speed of said succeeding vehicle.

13. The distance control apparatus in accordance with claim 1, wherein said distance control means performs said temporary distance control by setting a target acceleration of said succeeding vehicle, wherein said distance control means temporarily suppresses the deceleration degree of said succeeding vehicle to the smaller value by changing a lower limit of said target acceleration to a provisional level, and said provisional level has an initial value higher than an ordinary level and a transitional value gradually restoring to said ordinary level.

14. The distance control apparatus in accordance with claim 1, wherein said distance control means obtaining a control value based on a first physical quantity and a second physical quantity, said first physical quantity representing a distance deviation between an actual distance and a target distance between said two traveling vehicles, and said second physical quantity representing a relative speed between said two traveling vehicles, said acceleration/deceleration means is actuated based on said control value to adjust the actual distance between said two traveling vehicles, said distance control means performs said temporary distance control for suppressing the deceleration degree of said succeeding vehicle when the actual distance between said two traveling vehicles is already shorter or will soon become shorter than the standard target distance due to an intentional driver's operation of said succeeding vehicle performed to reduce the actual distance between said two traveling vehicles.

15. The distance control apparatus in accordance with claim 14, wherein said intentional driver's operation of said succeeding vehicle is a lane change operation of said succeeding vehicle performed to follow up a new objective traveling on another traffic lane which is faster than said succeeding vehicle.

16. The distance control apparatus in accordance with claim 14, wherein said acceleration/deceleration means is manually operable by the driver of said succeeding vehicle, and said intentional driver's operation of said succeeding vehicle is an override operation performed to manually accelerate the succeeding vehicle so as to approach the preceding vehicle.

17. The distance control apparatus in accordance with claim 14, wherein said international driver's operation of said succeeding vehicle is startup of said distance control.

18. The distance control apparatus in accordance with claim 14, wherein said relative speed is a positive value when said two traveling vehicles are departing from each other and is a negative value when approaching to each other, and said distance control means performs said temporary distance control for suppressing the deceleration degree of said succeeding vehicle when a relative speed is larger than a predetermined value.

19. The distance control apparatus in accordance with claim 14, wherein said distance control means temporarily changes said target distance to a provisional target distance to realize said temporary distance control for suppressing the deceleration degree of said succeeding vehicle, and said provisional target distance has an initial value substantially equal to the actual distance between said two traveling vehicles and a transitional value gradually restoring to said standard target distance.

20. The distance control apparatus in accordance with claim 14, wherein said distance control means temporarily changes said target distance to a provisional target distance to realize said temporary distance control for suppressing the deceleration degree of said succeeding vehicle, and said provisional target distance has an initial value determined in accordance with the relative speed between said two traveling vehicles and a transitional value gradually restoring to said standard target distance.

21. The distance control apparatus in accordance with claim 20, wherein said initial value of said provisional target distance is expressed by a decreasing function of said relative speed in a region from a negative lower value to an upper value equal to or closer to 0.

22. The distance control apparatus in accordance with claim 20, wherein said initial value is equal or closer to said standard target distance when said relative speed is smaller than said negative lower value.

23. The distance control apparatus in accordance with claim 20, wherein said initial value is equal or closer to said actual distance between said two traveling vehicles when said relative speed is larger than said upper value.

24. The distance control apparatus in accordance with claim 21, wherein said upper value is a positive value closer to 0 when said intentional driver's operation of said succeeding vehicle is a lane change operation of said succeeding vehicle performed to follow up a new objective traveling on another traffic lane which is faster than said succeeding vehicle.

25. The distance control apparatus in accordance with claim 21, wherein said upper value is a negative value closer to 0 when said intentional driver's operation of said succeeding vehicle is an override operation performed to manually accelerate the succeeding vehicle so as to approach the preceding vehicle.

26. The distance control apparatus in accordance with claim 21, wherein said upper value is a negative value closer to 0 when said intentional driver's operation of said succeeding vehicle is a control startup operation performed to start said distance control.

27. The distance control apparatus in accordance with claim 14, wherein said distance control means performs said temporary distance control by setting a target acceleration of said succeeding vehicle, wherein said distance control means temporarily suppresses the deceleration degree of said succeeding vehicle to the smaller value by changing a lower limit of said target acceleration to a provisional level, and said provisional level has an initial value higher than an ordinary level and a transitional value gradually restoring to said ordinary level.

28. The distance control apparatus in accordance with claim 14, further comprising a warning control means for performing a warning operation when said actual distance between said two traveling vehicles becomes shorter than a predetermined warning distance, wherein said warning control means performs a temporary warning control for setting a provisional warning distance shorter than an ordinary warning distance when the actual distance between said two traveling vehicles is already shorter or will soon become shorter than said ordinary warning distance due to the intentional driver's operation of said succeeding vehicle performed to reduce the actual distance between said two traveling vehicles.

29. The distance control apparatus in accordance with claim 28, wherein said provisional warning distance has an initial value substantially equal or closer to the actual distance between said two traveling vehicles and a transitional value gradually restoring to said ordinary warning distance.

30. The distance control apparatus in accordance with claim 28, wherein said acceleration/deceleration means comprises a plurality of deceleration devices being independently operable and different from each other in degree of attainable deceleration, wherein said distance control means selects at least one of said plurality of deceleration devices corresponding to a deceleration degree determined to be necessary to decelerate said succeeding vehicle, and wherein a warning prohibiting means is provided for preventing said warning control means from performing said warning operation if the determined deceleration degree is less than a predetermined maximum deceleration degree even if the actual distance between said two traveling vehicles is shorter than said ordinary warning distance.

31. The distance control apparatus in accordance with claim 30, wherein said warning prohibiting means judges that the deceleration level is higher than said predetermined maximum level when a deceleration device capable of generating a largest deceleration is included in said at least one of said deceleration devices selected by said distance control means.

32. The distance control apparatus in accordance with claim 30, wherein said warning prohibiting means judges that the deceleration level is higher than said predetermined maximum level when a predetermined combination of deceleration devices capable of generating a largest deceleration is selected by said distance control means.

33. The distance control apparatus in accordance with claim 30, wherein said warning prohibiting means judges that the deceleration level is higher than said predetermined maximum level when said control value obtained by said distance control means is equivalent to an available maximum deceleration.

34. The distance control apparatus in accordance with claim 28, wherein said intentional driver's operation of said succeeding vehicle is a lane change operation of said succeeding vehicle performed to follow up a new objective traveling on another traffic lane which is faster than said succeeding vehicle.

35. The distance control apparatus in accordance with claim 34, wherein said warning control means cancels said temporary warning control for setting the provisional warning distance when said succeeding vehicle is approaching said new objective.

36. The distance control apparatus in accordance with claim 28, wherein said acceleration/deceleration means is manually operable by the driver of said succeeding vehicle, and said intentional driver's operation of said succeeding vehicle is an override operation performed to manually accelerate the succeeding vehicle so as to approach the preceding vehicle.

37. The distance control apparatus in accordance with claim 28, wherein said intentional driver's operation of said succeeding vehicle is startup of said distance control.

38. A warning apparatus comprising:
a warning device for generating a warning or an alarm when an actual distance between two traveling vehicles becomes shorter than a predetermined warning distance; and
warning control means for activating or deactivating said warning device,
wherein said warning control means performs a temporary warning control for setting a provisional warning distance shorter than an ordinary warning distance when the actual distance between said two traveling vehicles is already shorter or will soon become shorter than said ordinary warning distance due to an intentional driver's operation of a succeeding vehicle performed to follow up a new objective traveling on another traffic lane.

39. The warning apparatus in accordance with claim 38, wherein said provisional warning distance has an initial value substantially equal to the actual distance between said two traveling vehicles and a transitional value gradually restoring to said ordinary warning distance.

40. The warning apparatus in accordance with any claim 38, wherein said new objective traveling on said another traffic lane is faster than said succeeding vehicle.

41. The warning apparatus in accordance with claim 40, wherein said temporary warning control is canceled by said warning control means when said succeeding vehicle approaches said new objective during said temporary warning control.

42. A distance control method for controlling a distance between two traveling vehicles, said control method comprising the steps of:
detecting a physical quantity directly or indirectly representing an actual distance between said two traveling vehicles; and
performing a distance control so as to maintain a target distance between said two traveling vehicles based on said physical quantity, wherein said distance control method further comprises the step of performing a temporary distance control for suppressing a deceleration degree of a succeeding vehicle to a smaller value compared with a deceleration degree attainable during an ordinary distance control when said two traveling vehicles are departing from each other under a condition where the actual distance between said two traveling vehicles is already shorter or will soon become shorter than a standard target distance.

43. The distance control method in accordance with claim 42, wherein
a control value is obtained based on a first physical quantity and a second physical quantity, said first physical quantity representing a distance deviation between an actual distance and a target distance between two traveling vehicles, and said second physical quantity representing a relative speed between said two traveling vehicles,
said succeeding vehicle is accelerated or decelerated based on said control value to adjust the actual distance between said two traveling vehicles, and
said temporary distance control is performed to suppress the deceleration degree of said succeeding vehicle when said two traveling vehicles are departing from each other under a condition where said actual distance between two traveling vehicles is shorter than a standard target distance.

44. The distance control method in accordance with claim 43, wherein the two traveling vehicles include the succeeding vehicle and a preceding vehicle with respect to which distance is being controlled, and wherein the temporary distance control is executed in control analysis cycles,
said method further comprising judging whether a preceding vehicle based on which control analysis was performed in a previous control analysis cycle is the same as the preceding vehicle based on which control analysis is performed in a current control analysis cycle, and
wherein said temporary distance control is performed only when said preceding vehicle based on which control analysis was performed in the previous control analysis cycle is judged to be the same as the preceding vehicle based on which control analysis is performed in the current control analysis cycle.

45. The distance control method in accordance with claim 43, wherein said target distance is temporarily changed to a provisional target distance to realize said temporary distance control for suppressing the deceleration degree of said succeeding vehicle, and said provisional target distance has an initial value substantially equal to the actual distance between said two traveling vehicles and a transitional value gradually restoring to said standard target distance.

46. The distance control method in accordance with claim 42, wherein
a control value is obtained based on a first physical quantity and a second physical quantity, said first physical quantity representing a distance deviation between an actual distance and a target distance between two traveling vehicles, and said second physical quantity representing a relative speed between said two traveling vehicles,
said succeeding vehicle is accelerated or decelerated based on said control value to adjust the actual distance between said two traveling vehicles,
said temporary distance control is performed to suppress the deceleration degree of said succeeding vehicle when said actual distance between said two traveling vehicles is shorter than the standard target distance, said target distance is changed to a provisional target distance to realize said temporary distance control for suppressing the deceleration degree of said succeeding vehicle, and said provisional target distance has an initial value determined in accordance with the relative speed between said two traveling vehicles and a transitional value gradually restoring to said standard target distance.

47. The distance control method in accordance with claim 46, wherein said relative speed is a positive value when said two traveling vehicles are departing from each other and is a negative value when approaching to each other, and said initial value of said provisional target distance is expressed by a decreasing function of said relative speed in a region between a predetermined negative value and a predetermined positive value of said relative speed.

48. The distance control method in accordance with claim 46, wherein said initial value is equal or closer to said standard target distance when said relative speed is smaller than said predetermined negative value.

49. The distance control method in accordance with claim 46, wherein said initial value is equal or closer to said actual distance between said two traveling vehicles when said relative speed is larger than said predetermined positive value.

50. The distance control method in accordance with claim 46, wherein said relative speed is a positive value when said two traveling vehicles are departing from each other and is a negative value when approaching to each other, and said initial value of said provisional target distance is expressed by a decreasing function of said relative speed in a region between a first positive value and a second positive value of said relative speed, where said second positive value is larger than said first positive value.

51. The distance control method in accordance with claim 46, wherein said initial value is equal or closer to said standard target distance when said relative speed is smaller than said first positive value.

52. The distance control method in accordance with claim 46, wherein said initial value is equal or closer to said actual distance between said two traveling vehicles when said relative speed is larger than said second positive value.

53. The distance control method in accordance with claim 42, wherein a control value is obtained based on a first physical quantity and a second physical quantity, said first physical quantity representing a distance deviation between an actual distance and a target distance between said two traveling vehicles, and said second physical quantity representing a relative speed between said two traveling vehicles, said succeeding vehicle is accelerated and/or decelerated based on said control value to adjust the actual distance between said two traveling vehicles, and said temporary distance control is performed to suppress the deceleration degree of said succeeding vehicle when the actual distance between said two traveling vehicles is already shorter or will soon become shorter than the standard target distance due to an intentional driver's operation of said succeeding vehicle performed to reduce the actual distance between said two traveling vehicles.

54. The distance control method in accordance with claim 53, wherein said intentional driver's operation of said succeeding vehicle is a lane change operation of said succeeding vehicle performed to follow up a new objective traveling on another traffic lane which is faster than said succeeding vehicle.

55. The distance control method in accordance with claim 53, wherein said intentional driver's operation of said succeeding vehicle is an override operation performed to manually accelerate the succeeding vehicle so as to approach the preceding vehicle.

56. The distance control method in accordance with claim 53, wherein said intentional driver's operation of said succeeding vehicle is startup of said distance control.

57. The distance control method in accordance with claim 53, wherein said relative speed is a positive value when said two traveling vehicles are departing from each other and is a negative value when approaching to each other, and said temporary distance control for suppressing the deceleration degree of said succeeding vehicle is performed when a relative speed is larger than a predetermined value.

58. The distance control method in accordance with claim 53, wherein said target distance is temporarily changed to a provisional target distance to realize said temporary distance control for suppressing the deceleration degree of said succeeding vehicle, and said provisional target distance has an initial value substantially equal to the actual distance between said two traveling vehicles and a transitional value gradually restoring to said standard target distance.

59. The distance control method in accordance with claim 53, wherein said target distance is temporarily changed to a provisional target distance to realize said temporary distance control for suppressing the deceleration degree of said succeeding vehicle, and said provisional target distance has an initial value determined in accordance with the relative speed between said two traveling vehicles and a transitional value gradually restoring to said standard target distance.

60. The distance control method in accordance with claim 59, wherein said initial value of said provisional target distance is expressed by a decreasing function of said relative speed in a region from a negative lower value to an upper value equal to or closer to 0.

61. The distance control method in accordance with claim 59, wherein said initial value is equal or closer to said standard target distance when said relative speed is smaller than said negative lower value.

62. The distance control method in accordance with claim 59, wherein said initial value is equal or closer to said actual distance between said two traveling vehicles when said relative speed is larger than said upper value.

63. The distance control method in accordance with claim 60, wherein said upper value is a positive value closer to 0 when said intentional driver's operation of said succeeding vehicle is a lane change operation of said succeeding vehicle performed to follow up a new objective traveling on another traffic lane which is faster than said succeeding vehicle.

64. The distance control method in accordance with claim 60, wherein said upper value is a negative value closer to 0 when said intentional driver's operation of said succeeding vehicle is an override operation performed to manually accelerate the succeeding vehicle so as to approach the preceding vehicle.

65. The distance control method in accordance with claim 60, wherein said upper value is a negative value closer to 0 when said intentional driver's operation of said succeeding vehicle is a control startup operation performed to start said distance control.

66. The distance control method in accordance with claim 53, wherein said temporary distance control is performed by setting a target acceleration of said succeeding vehicle,
   wherein the deceleration degree of said succeeding vehicle is temporarily suppressed to the smaller value by changing a lower limit of said target acceleration to a provisional level, and
   said provisional level has an initial value higher than an ordinary level and a transitional value gradually restoring to said ordinary level.

67. The distance control method in accordance with claim 53, wherein a warning operation is performed when said actual distance between said two traveling vehicles becomes shorter than a predetermined warning distance,
   wherein a temporary warning control is performed for setting a provisional warning distance shorter than an ordinary warning distance when the actual distance between said two traveling vehicles is already shorter or will soon become shorter than said ordinary warning distance due to the intentional driver's operation of said succeeding vehicle performed to reduce the actual distance between said two traveling vehicles.

68. The distance control method in accordance with claim 67, wherein said provisional warning distance has an initial value substantially equal to the actual distance between said two traveling vehicles and a transitional value gradually restoring to said ordinary warning distance.

69. The distance control method in accordance with claim 67, wherein at least one of a plurality of deceleration devices is selected to decelerate said succeeding vehicle, said plurality of deceleration devices being independently operable and different from each other in degree of attainable deceleration, and
   said warning operating is prohibited when a deceleration level attainable by said selected one or plurality of deceleration devices is lower than a predetermined maximum level even if the actual distance between said two traveling vehicles is shorter than said ordinary warning distance.

70. The distance control method in accordance with claim 69, wherein the deceleration level of said succeeding vehicle is judged to be higher than said predetermined maximum level when a deceleration device capable of generating a largest deceleration is selected to decelerate said succeeding vehicle.

71. The distance control method in accordance with claim 69, wherein the deceleration level of said succeeding vehicle is judged to be higher than said predetermined maximum level when a predetermined combination of deceleration devices capable of generating a largest deceleration is selected to decelerate said succeeding vehicle.

72. The distance control method in accordance with claim 69, wherein the deceleration level of said succeeding vehicle is judged to be higher than said predetermined maximum level when said control value is equivalent to an available maximum deceleration.

73. The distance control method in accordance with claim 67, wherein said intentional driver's operation of said succeeding vehicle is a lane change operation of said succeeding vehicle performed to follow up a new objective traveling on another traffic lane which is faster than said succeeding vehicle.

74. The distance control method in accordance with claim 73, wherein said temporary warning control for setting the provisional warning distance is canceled when said succeeding vehicle is approaching said new objective.

75. The distance control method in accordance with claim 67, wherein said intentional driver's operation of said succeeding vehicle is an override operation performed to manually accelerate the succeeding vehicle so as to approach the preceding vehicle.

76. The distance control method in accordance with claim 67, wherein said intentional driver's operation of said succeeding vehicle is startup of said distance control.

77. A warning method for controlling a warning device, comprising the steps of:
   judging whether an actual distance between two traveling vehicles becomes shorter than a predetermined warning distance;
   activating or deactivating said warning device to generate a warning or an alarm based on judgement result; and
   performing a temporary warning control for setting a provisional warning distance shorter than an ordinary warning distance when the actual distance between said two traveling vehicles is already shorter or will soon become shorter than said ordinary warning distance due to an intentional driver's operation of a succeeding vehicle performed to follow up a new objective traveling on another traffic lane.

78. The warning method in accordance with claim 77, wherein said provisional warning distance has an initial value substantially equal to the actual distance between said two traveling vehicles and a transitional value gradually restoring to said ordinary warning distance.

79. The warning method in accordance with any claim 77, wherein said new objective traveling on said another traffic lane is faster than said succeeding vehicle.

80. The warning method in accordance with claim 79, wherein said temporary warning control for setting the provisional warning distance is canceled when said succeeding vehicle approaches said new objective during said temporary warning control.

81. A recording medium storing a control program for controlling a distance between two traveling vehicles, said recording medium being installable in a computer system, and said control program comprising the steps of:
   detecting a physical quantity directly or indirectly representing an actual distance between said two traveling vehicles; and
   performing a distance control so as to maintain a target distance between said two traveling vehicles based on said physical quantity,
   wherein said control program further comprises the step of performing a temporary distance control for suppressing a deceleration degree of a succeeding vehicle to a smaller value compared with a deceleration degree attainable during an ordinary distance control when said two traveling vehicles are departing from each other under a condition where the actual distance between said two traveling vehicles is already shorter or will soon become shorter than a standard target distance.

82. The recording medium in accordance with claim 81, wherein
   a control value is obtained based on a first physical quantity and a second physical quantity, said first physical quantity representing a distance deviation between an actual distance and a target distance between two traveling vehicles, and said second physical quantity representing a relative speed between said two traveling vehicles, said succeeding vehicle is accelerated and/or decelerated based on said control value to adjust the actual distance between said two traveling vehicles, and said temporary distance control is performed to suppress the deceleration degree of said succeeding vehicle when said two traveling vehicles are departing from each other under a condition where said actual distance between two traveling vehicles is shorter than the standard target distance.

83. The recording medium in accordance with claim 81, wherein a control value is obtained based on a first physical quantity and a second physical quantity, said first physical quantity representing a distance deviation between an actual distance and a target distance between two traveling vehicles, and said second physical quantity representing a relative speed between said two traveling vehicles, said succeeding vehicle is accelerated and/or decelerated based on said control value to adjust the actual distance between said two traveling vehicles, said temporary distance control is performed to suppress the deceleration degree of said succeeding vehicle when said actual distance between two traveling vehicles is shorter than the standard target distance, said target distance is changed to a provisional target distance to realize said temporary distance control for suppressing the deceleration degree of said succeeding vehicle, and said provisional target distance has an initial value determined in accordance with the relative speed between said two traveling vehicles and a transitional value gradually restoring to said standard target distance.

84. The recording medium in accordance with claim 81, wherein a control value is obtained based on a first physical quantity and a second physical quantity, said first physical quantity representing a distance deviation between an actual distance and a target distance between said two traveling vehicles, and said second physical quantity representing a relative speed between said two traveling vehicles, said succeeding vehicle is accelerated and/or decelerated based on said control value to adjust the actual distance between said two traveling vehicles, and said temporary distance control is performed to suppress the deceleration degree of said succeeding vehicle when the actual distance between said two traveling vehicles is already shorter or will soon become shorter than the standard target distance due to an intentional driver's operation of said succeeding vehicle performed to reduce the actual distance between said two traveling vehicles.

85. A recording medium storing a control program for controlling a warning device, said recording medium being installable in a computer system, and said control program comprising the steps of:

judging whether an actual distance between two traveling vehicles becomes shorter than a predetermined warning distance; and activating or deactivating said warning device to generate a warning or an alarm based on judgement result, wherein said control program further comprises the step of performing a temporary warning control for setting a provisional warning distance shorter than an ordinary warning distance when the actual distance between said two traveling vehicles is already shorter or will soon become shorter than said ordinary warning distance due to an intentional driver's operation of a succeeding vehicle performed to follow up a new objective traveling on another traffic lane.

\* \* \* \* \*